United States Patent
Huysseune et al.

(10) Patent No.: US 12,461,089 B2
(45) Date of Patent: Nov. 4, 2025

(54) OLFACTORY RECEPTOR INVOLVED IN THE PERCEPTION OF MUSK FRAGRANCE AND THE USE THEREOF

(71) Applicant: ChemoSensoryX Biosciences SA, Louvain-la-Neuve (BE)

(72) Inventors: Sandra Huysseune, Brussels (BE); Alex Veithen, Genappe (BE); Yannick Quesnel, Wavre (BE)

(73) Assignee: ChemoSensoryX Biosciences SA, Louvain-la-Neuve (BE)

( * ) Notice: Subject to any disclaimer, the term of this patent is extended or adjusted under 35 U.S.C. 154(b) by 0 days.

(21) Appl. No.: 18/406,031

(22) Filed: May 30, 2024

(65) Prior Publication Data

US 2024/0319168 A1  Sep. 26, 2024

Related U.S. Application Data

(62) Division of application No. 16/770,457, filed as application No. PCT/EP2018/083570 on Dec. 5, 2018, now Pat. No. 11,867,685.

(30) Foreign Application Priority Data

Dec. 5, 2017  (EP) .................................. 17205402

(51) Int. Cl.
G01N 33/50  (2006.01)

(52) U.S. Cl.
CPC ................................ *G01N 33/5008* (2013.01)

(58) Field of Classification Search
None
See application file for complete search history.

(56) References Cited

FOREIGN PATENT DOCUMENTS

| CA | 2401406 A1 | 9/2001 |
|---|---|---|
| EP | 1612222 B1 | 7/2010 |
| EP | 3 721 227 B1 | 2/2023 |
| WO | WO 01/02551 A2 | 1/2001 |
| WO | WO 01/27158 A2 | 4/2001 |
| WO | WO 2006/094704 A2 | 9/2006 |
| WO | WO 2014/191047 A1 | 2/2014 |
| WO | WO 2015/020158 A1 | 2/2015 |
| WO | WO 2016/201152 A1 | 12/2016 |
| WO | WO 2019/110630 A1 | 6/2019 |
| WO | WO 2022/268745 A1 | 12/2022 |

OTHER PUBLICATIONS

Amoore et al., "Specific Anosmias To 5∞- Androst-16-en-3-One and ω- Pentadecalactone: The Urinous and Musky Primary Odors", Chemical Senses and Flavor, vol. 2, 1977, pp. 401-425.
ECRO XXVII Congress, Cambridge—United Kingdom 2.-5. Sep. 2017.
Fus-Kujawa et al., "An Overview of Methods and Tools for Transfection of Eukaryotic Cells in vitro", Frontiers in Bioengineering and Biotechnology, vol. 9, Jul. 2021, 15 pages.
Kato et al., "Amino acids involved in conformational dynamics and G protein coupling of an odorant receptor: targeting gain-of-function mutation", Journal of Neurochemistry, vol. 107, 2008, pp. 1261-1270.
Krautwurst et al., "Identification of Ligands for Olfactory Receptors by Functional Expression of a Receptor Library", Cell, vol. 95, pp. 917-926, Dec. 23, 1998.
Li et al., "From musk to body odor: Decoding olfaction through genetic variation", Plos Genetics, Feb. 3, 2022, 27 pages.
Liu et al., "A New Family of Rigid Dienone Musks Challenges the Perceptive Range of the Human Olfactory Receptor OR5AN1", Synlett, vol. 31, 2020, pp. 972-976.
Mombaerts, "Genes and Ligands for Odorant, Vomeronasal and Taste Receptors", Neuroscience, vol. 5, Apr. 2004, pp. 263-278.
Notice of Opposition mailed on Nov. 6, 2023 in European Patent No. EP3721227.
Office Action issued in U.S. Appl. No. 16/770,457 dated Feb. 16, 2023 in 16 pages.
Amendment to Office Action issued in U.S. Appl. No. 16/770,457 dated May 16, 2023 in 11 pages.
Peterlin et al., "The state of the art of odorant receptor deorphanization: A report from the orphanage", J. Gen. Physiol., vol. 143, No. 5, 2014, pp. 527-542.
Sandra et al., "Human Olfactory Receptors: A journey from cell engineering for efficient in vitro functional assays to effective antagonists in human sensory assay", Brussels Institute for Research and Innovation (Innovlris), 1 page.
S5 Table. Olfactory receptor haplotypes (hg19) tested in the cell-based assay for activation by Galaxolide (OR4D6 Cluster).
Spence et al., "Plenary Lectures", Chem. Senses, 43: e1-e36, 2018.
Trimmer et al., "Genetic variation across the human olfactory receptor repertoire alters odor perception", bioRxiv, Nov. 1, 2017, 22 pages.
Veithen et al., "High-Throughput Receptor Screening Assay", Part C, Analytics, Sensor Technology and Human-Sensory Evaluation, pp. 505-526.
Website CHEMCOM, Sep. 2018.
Yoshikawa et al., "An odorant receptor that senses four classes of musk compounds", Current Biology, vol. 32, pp. 1-8, Dec. 5, 2022.
Zhuang et al., "Evaluating cell-surface expression and measuring activation of mammalian odorant receptors in heterologous cells", Nature Protocols, vol. 3, No. 9, 2008.
Zhuang et al., "Synergism of Accessory Factors in Functional Expression of Mammalian Odorant Receptors", The Journal of Biological Chemistry, vol. 282, No. 20, p. 15284-15293, May 18, 2007.

(Continued)

*Primary Examiner* — Marsha Tsay
(74) *Attorney, Agent, or Firm* — Knobbe, Martens, Olson & Bear, LLP

(57) ABSTRACT

Identification of OR5A2 as an Olfactory Receptor that binds natural musk and synthetic musks and using the interaction of OR5A2 polypeptides and nitromusk, polycyclic musk, macrocyclic musk and alicyclic musks as a basis of screening assays for agents that specifically modulate the activity of the Olfactory Receptor.

18 Claims, 15 Drawing Sheets
Specification includes a Sequence Listing.

(56) References Cited

OTHER PUBLICATIONS

Adipietro et al., Functional Evolution of Mammalian Odorant Receptors, Plos Genetics, vol. 8, Issue 7, pp. 1-14, e1002821, 2012.
Bird, Monitoring Phospholipid Signaling Pathways: Recipes from the Experts, TEM, vol. 9, No. 9, pp. 384-386, 1998.
Detheux et al., Natural Proteolytic Processing of Hemofiltrate CC Chemokine 1 Generates a Potent CC Chemokine Receptor (CCR)1 and CCR5 Agonist with Anti-HIV Properties, J. Exp. Med., vol. 192, No. 10, pp. 1501-1508, 2000.
Fujita et al., Deorphanization of Dresden G Protein-Coupled Receptor for an Odorant Receptor, Journal of Receptors and Signal Transduction, vol. 27, pp. 323-334, 2007.
Hubbard et al., Externally Disposed Plasma Membrane, The Journal of Cell Biology, vol. 64, pp. 461-479, 1975.
Horton et al., Mass Measurements of Cyclic AMP Formation by Radioimmunoassay, Enzyme Immunoassay and Scintillation Proximity Assay, Methods in Molecular Biology, vol. 41, pp. 91-105, 1995.
Jaeger et al., A Mendelian Trait for Olfactory Sensitivity Affects Odor Experience and Food Selection, Current Biology, vol. 23, pp. 1601-1605, 2013.
Keller et al., Genetic variation in a human odorant receptor alters odour perception, Nature, vol. 449, pp. 468-472, 2007.
Kenimer et al., Desensitization of Adenylate Cyclase to Prostaglandin $E_1$ or 2-Chloroadenosine, Molecular Pharmacology, vol. 20, pp. 585-591, 1981.
Kikkawa et al., Calcium-activated, Phospholipid-dependent Protein Kinase from Rat Brain, The Journal of Biological Chemistry, Vo. 257, No. 22, pp. 13341-13348, 1982.
Matarazzo et al., Functional Characterization of Two Human Olfactory Receptors Expressed in the Baculovirus Sf9 Insect Cell System, Chem. Senses, vol. 30, pp. 195-207, 2005.
McClintok et al., In Vivo Identification of Eugenol-Responsive and Muscone-Responsive Mouse Odorant Receptors, The Journal of Neuroscience, vol. 34, No. 47, pp. 15669-15678, 2014.
Mirzabekov et al., Paramagnetic proteoliposomes containing a pure, native, and oriented seven-transmembrane segment protein, CCR5, Nature Biotechnology, vol. 18, pp. 649-654, 2000.
Office Action mailed on Dec. 6, 2022 in Japanese Application No. 530474-2020.
Pinna et al., How do protein Kinases recognize their substrates?, Biochemicia et Biophyica Acta, vol. 1314, pp. 191-225, 1996.
Rudolph et al., Expression, Characterization, and Mutagenesis of the *Yersinia pestis* Murine Toxin, a Phospholipase D Superfamily Member, The Journal of Biological Chemistry, vol. 274, No. 17, pp. 11824-11831, 1999.
Sanz et al., Comparison of Odorant Specificity of Two Human Olfactory Receptors from Different Phylogenetic Classes and Evidence for Antagonism, Chem. Senses, vol. 30, pp. 69-80, 2005.
Saito et al., RTP Family Members Induce Functional Expression of Mammalian Odorant Receptors, Cell, vol. 119, pp. 679-691, 2004.
Saito et al., Odor Coding by a Mammalian Receptor Repertoire, Sci Signal, vol. 2, No. 60, pp. 1-14, 2009.
Salamon et al., Surface Plasmon Resonance Spectroscopy Studies of Membrane Proteins: Transducin Binding and Activation by Rhodopsin Monitored in Thin Membrane Films, Biophysical Journal, vol. 71, pp. 283-294, 1996.
Salamon et al., Plasmon resonance spectroscopy: probing molecular interactions within membranes, TIBS 24, pp. 213-219, 1999.
Salamon et al., Optical Anisotropy in Lipid Bilayer Membranes: Coupled Plasmon-Waveguide Resonance Measurements of Molecular Orientation, Polarizability, and Shape, Biophysical Journal, vol. 80, pp. 1557-1567, 2001.
Sarrio et al., The Heat Shock Cognate Protein hsc73 Assembles with A1 Adenosine Receptors To Form Functional Modules in the Cell Membrane, Mol. Cell. Biol., vol. 20, No. 14, pp. 5164-5174, 2000.
Shirasu et al., Olfactory Receptor and Neural Pathway Responsible for Highly Selective Sensing of Musk Odors, Neuron, vol. 81, pp. 165-178, 2014.
Shirokova et al., Identification of Specific Ligands for Orphan Olfactory Receptors G Protein-Dependent Agonism and Antagonism of Odorants*, The Journal of Biological Chemistry, vol. 280, No. 12, pp. 11807-11815, 2005.
Schmeideberg et al., Structural determinants of odorant recognition by the human olfactory receptors OR1A1 and OR1A2, Journal of Structural Biology, vol. 159, pp. 400-412, 2007.
Spehr et al., Identification of a Testicular Odorant Receptor Mediating Human Sperm Chemotaxis, Science, vol. 299, 2054-2058, 2003.
Stables et al., A Bioluminescent Assay for Agonist Activity at Potentially Any G-Protein-Coupled Receptor, Analytical Biochemistry, vol. 252, pp. 115-126, 1997.
The Human Olfactory Data Explorer, https://genome.weizmann.ac.ll/horde/, retrieved on Nov. 15, 2022.
Wetzel et al., Specificity and Sensitivity of a Human Olfactory Receptor Functionally Expressed in Human Embryonic Kidney 293 Cells and *Xenopus laevis* Oocytes, The Journal of Neuroscience, vol. 19, No. 17, pp. 7426-7433, 1999.
Yoshikawa et al., Diverse yet selective tuning of an odorant receptor for sensing four classes of musk compounds, Research Square, pp. 1-22, doi: https//doi.org/10.21203/rs.3.rs-1916850/v1, 2022.

Phantolide  Cashmeran  Sylkolide

Moskene  Cervolide  Oxalide T

Distance Matrix

```
CLUSTAL O(1.2.4) multiple sequence alignment

OR5A2_variant_1_P172        MAVGRNNTIVTKFILLGLSDHPQMKIFLFMLFLGLYLLTLAWNLSLIALIKMDSHLHMPM  60
OR5A2_variant_2_P172L       MAVGRNNTIVTKFILLGLSDHPQMKIFLFMLFLGLYLLTLAWNLSLIALIKMDSHLHMPM  60
                            ************************************************************

OR5A2_variant_1_P172        YFFLSNLSFLDICYVSSTAPKMLSDIITEQKTISFVGCATQYFVFCGMGLTECFLLAAMA 120
OR5A2_variant_2_P172L       YFFLSNLSFLDICYVSSTAPKMLSDIITEQKTISFVGCATQYFVFCGMGLTECFLLAAMA 120
                            ************************************************************

OR5A2_variant_1_P172        YDRYAAICNPLLYTVLISHTLCLKMVVGAYVGGFLSSFIETYSVYQHDFCGPYMINHFFC 180
OR5A2_variant_2_P172L       YDRYAAICNPLLYTVLISHTLCLKMVVGAYVGGFLSSFIETYSVYQHDFCGLYMINHFFC 180
                            ************************************************** *********

OR5A2_variant_1_P172        DLPPVLALSCSDTFTSEVVTFIVSVVVGIVSVLVVLISYGYIVAAVVKISSATGRTKAFS 240
OR5A2_variant_2_P172L       DLPPVLALSCSDTFTSEVVTFIVSVVVGIVSVLVVLISYGYIVAAVVKISSATGRTKAFS 240
                            ************************************************************

OR5A2_variant_1_P172        TCASHLTAVTLFYGSGFFMYMRPSSSYSLNRDKVVSIFYALVIPVVNPIIYSFRNKEIKN 300
OR5A2_variant_2_P172L       TCASHLTAVTLFYGSGFFMYMRPSSSYSLNRDKVVSIFYALVIPVVNPIIYSFRNKEIKN 300
                            ************************************************************

OR5A2_variant_1_P172        AMRKAMERDPGISHGGPFIFMTLG 324
OR5A2_variant_2_P172L       AMRKAMERDPGISHGGPFIFMTLG 324
```

Figure 6A

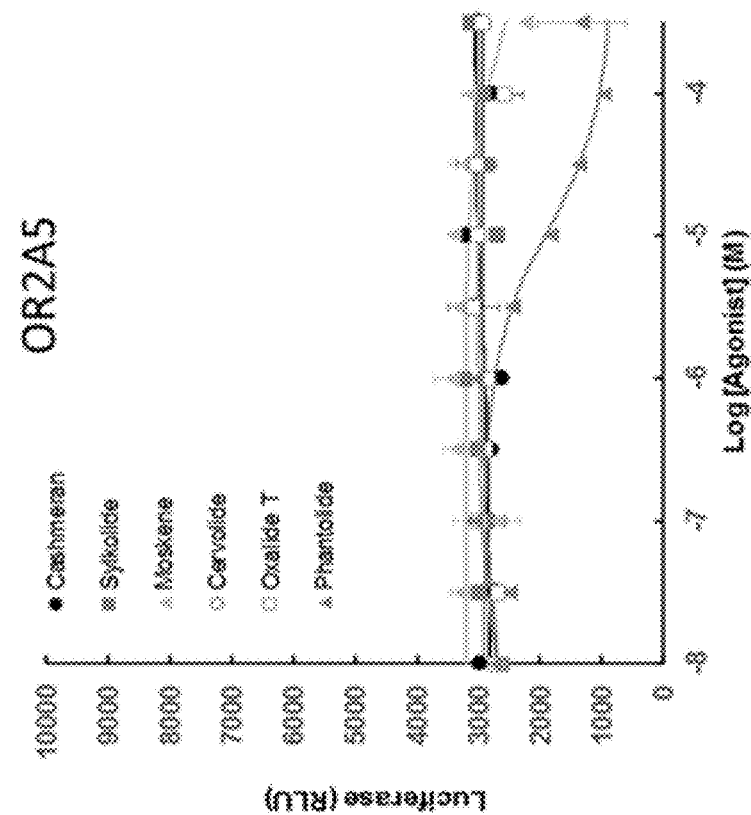
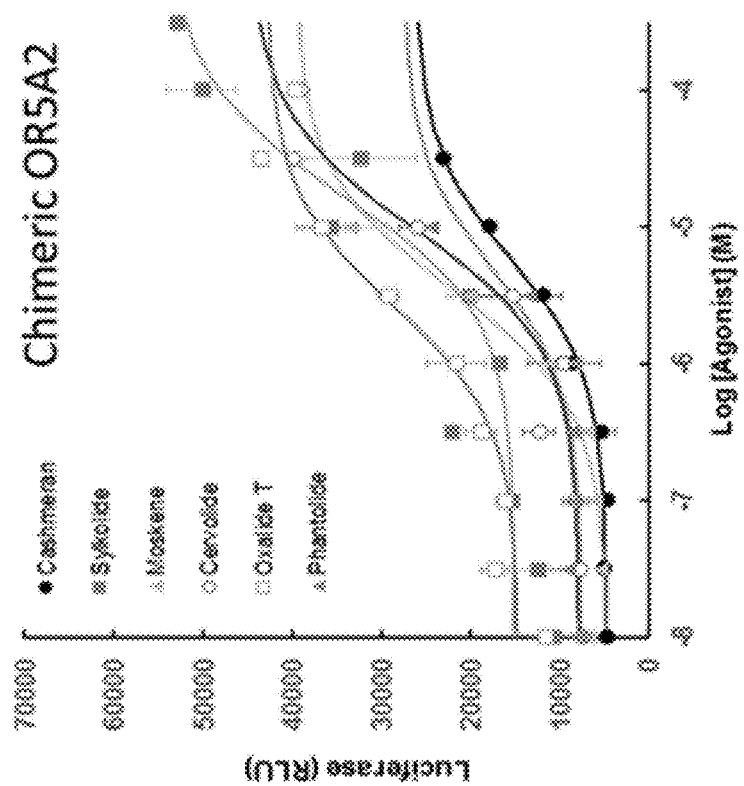
Figure 6B

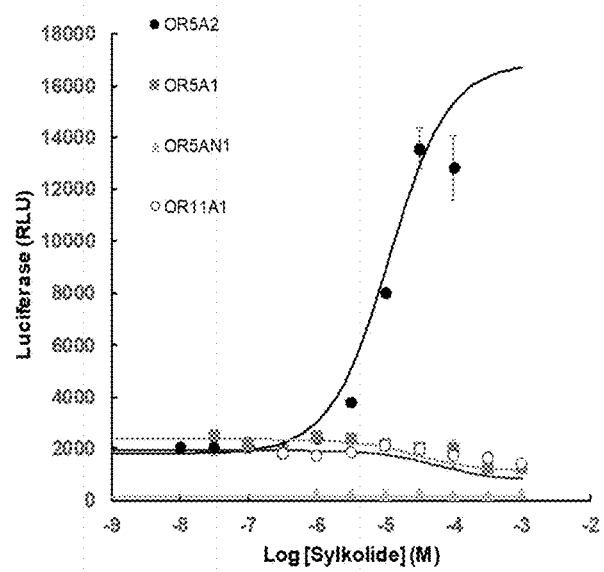

Figure 10A
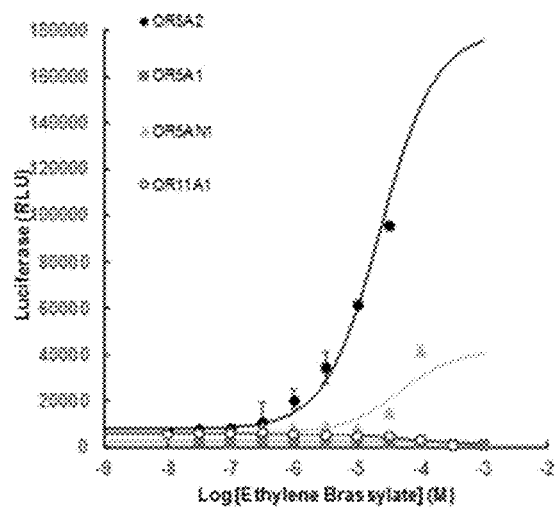
Figue 10 B
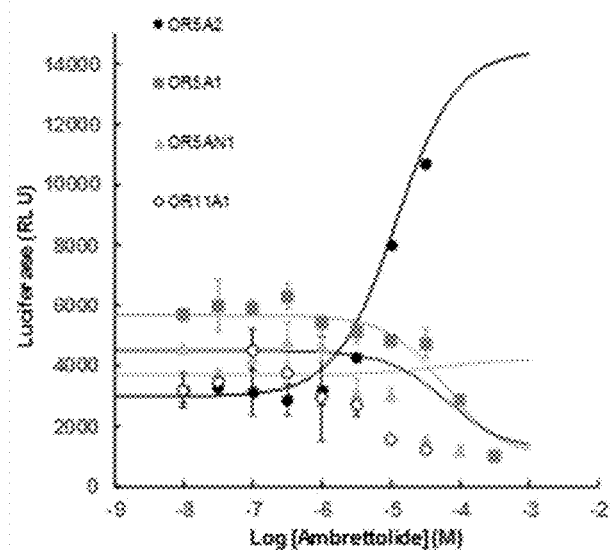
Figure 10C
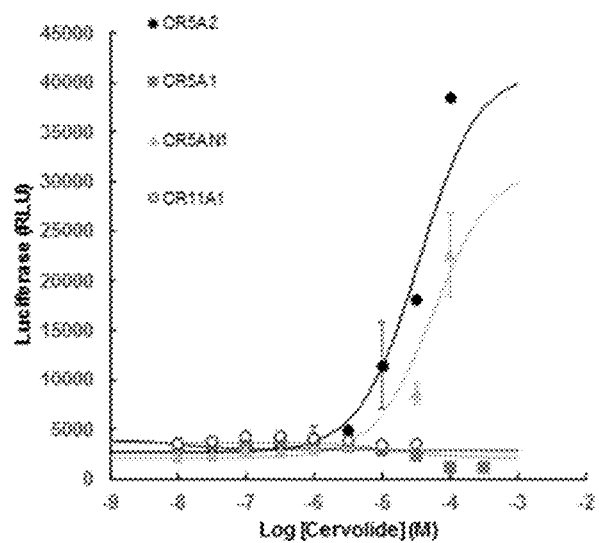

SEQUENCE LISTING

Sequence total quantity: 12
SEQ ID NO: 1             moltype = DNA   length = 975
FEATURE                  Location/Qualifiers
source                   1..975
                         mol_type = other DNA
                         organism = Homo sapiens
SEQUENCE: 1
atggctgtag gaaggaacaa cacaattgtg acaaaattca ttctcctggg actttcagac    60
catcctcaaa tgaagatttt ccttttcatg ttatttctgg ggctctacct cctgacgttg   120
gcctggaact taagcctcat tgccctcatt aagatggact ctcacctgca catgcccatg   180
tacttcttcc tcagtaacct gtccttcctg gacatctgct atgtgtcctc caccgcccct   240
aagatgctgt ctgacatcat cacagagcag aaaaccattt cctttgttgg ctgtgccact   300
cagtactttg tcttctgtgg gatggggctg actgaatgct ttctcctggc agctatggcc   360
tatgaccggt atgctgcaat ctgcaaccc ttgctttaca cagtcctcat atcccataca    420
ctttgtttaa agatggtggt tggcgcctat gtgggtggat ccttagttc tttcattgaa    480
acatactctg tctatcagca tgatttctgt gggcctata tgatcaacca cttttttctgt   540
gacctccctc cagtcctggc tctgtcctgc tctgatacct tcaccagcga ggtggtgacc   600
ttcatagtca gtgttgtcgt tggaatagtg tctgtgctag tggtcctcat ctcttatggt   660
tacattgttg ctgctgttgt gaagatcagc tcagctacag gtaggacaaa ggccttcagc   720
acttgtgcct ctcacctgac tgctgtgacc ctcttctatg gttctggatt cttcatgtac   780
atgcgaccca gttccagcta ctccctaaac agggacaagg tggtgtccat attctatgcc   840
ttggtgatcc ccgtggtgaa tcccatcatc tacagtttta ggaataagga gattaaaaat   900
gccatgagga aagccatgga aagggacccc gggatttctc acggtggacc attcattttt   960
atgaccttgg gctaa                                                    975

SEQ ID NO: 2             moltype = AA   length = 324
FEATURE                  Location/Qualifiers
source                   1..324
                         mol_type = protein
                         organism = Homo sapiens
SEQUENCE: 2
MAVGRNNTIV TKFILLGLSD HPQMKIFLFM LFLGLYLLTL AWNLSLIALI KMDSHLHMPM    60
YFFLSNLSFL DICYVSSTAP KMLSDIITEQ KTISFVGCAT QYFVFCGMGL TECFLLAAMA   120
YDRYAAICNP LLYTVLISHT LCLKMVVGAY VGGFLSSFIE TYSVYQHDFC GPYMINHFFC   180
DLPPVLALSC SDTFTSEVVT FIVSVVVGIV SVLVVLISYG YIVAAVVKIS SATGRTKAFS   240
TCASHLTAVT LFYGSGFFMY MRPSSSYSLN RDKVVSIFYA LVIPVVNPII YSFRNKEIKN   300
AMRKAMERDP GISHGGPFIF MTLG                                          324

SEQ ID NO: 3             moltype = DNA   length = 975
FEATURE                  Location/Qualifiers
source                   1..975
                         mol_type = other DNA
                         organism = Homo sapiens
SEQUENCE: 3
atggctgtag gaaggaacaa cacaattgtg acaaaattca ttctcctggg actttcagac    60
catcctcaaa tgaagatttt ccttttcatg ttatttctgg ggctctacct cctgacgttg   120
gcctggaact taagcctcat tgccctcatt aagatggact ctcacctgca catgcccatg   180
tacttcttcc tcagtaacct gtccttcctg gacatctgct atgtgtcctc caccgcccct   240
aagatgctgt ctgacatcat cacagagcag aaaccattt cctttgttgg ctgtgccact    300
cagtactttg tcttctgtgg gatggggctg actgaatgct ttctcctggc agctatggcc   360
tatgaccggt atgctgcaat ctgcaaccc ttgctttaca cagtcctcat atcccataca    420
ctttgtttaa agatggtggt tggcgcctat gtgggtggat ccttagttc tttcattgaa    480
acatactctg tctatcagca tgatttctgt gggctctata tgatcaacca cttttttctgt   540
gacctccctc cagtcctggc tctgtcctgc tctgatacct tcaccagcga ggtggtgacc   600

-continued

```
ttcatagtca gtgttgtcgt tggaatagtg tctgtgctag tggtcctcat ctcttatggt    660
tacattgttg ctgctgttgt gaagatcagc tcagctacag gtaggacaaa ggccttcagc    720
acttgtgcct ctcacctgac tgctgtgacc ctcttctatg gttctggatt cttcatgtac    780
atgcgaccca gttccagcta ctccctaaac agggacaagg tggtgtccat attctatgcc    840
ttggtgatcc ccgtggtgaa tcccatcatc tacagtttta ggaataagga gattaaaaat    900
gccatgagga aagccatgga aagggacccc gggatttctc acggtggacc attcattttt    960
atgaccttgg gctaa                                                     975
```

```
SEQ ID NO: 4              moltype = AA   length = 324
FEATURE                   Location/Qualifiers
source                    1..324
                          mol_type = protein
                          organism = Homo sapiens
SEQUENCE: 4
MAVGRNNTIV TKFILLGLSD HPQMKIFLFM LFLGLYLLTL AWNLSLIALI KMDSHLHMPM     60
YFFLSNLSFL DICYVSSTAP KMLSDIITEQ KTISFVGCAT QYFVFCGMGL TECFLLAAMA    120
YDRYAAICNP LLYTVLISHT LCLKMVVGAY VGGFLSSFIE TYSVYQHDFC GLYMINHFFC    180
DLPPVLALSC SDTFTSEVVT FIVSVVVGIV SVLVVLISYG YIVAAVVKIS SATGRTKAFS    240
TCASHLTAVT LFYGSGFFMY MRPSSSYSLN RDKVVSIFYA LVIPVVNPII YSFRNKEIKN    300
AMRKAMERDP GISHGGPFIF MTLG                                           324

SEQ ID NO: 5              moltype = AA   length = 7
FEATURE                   Location/Qualifiers
REGION                    1..7
                          note = MARCKS peptide
MOD_RES                   1
                          note = ACETYLATION
MOD_RES                   6
                          note = AMIDATION
source                    1..7
                          mol_type = protein
                          organism = synthetic construct
SEQUENCE: 5
FKKSFKL                                                                7

SEQ ID NO: 6              moltype = AA   length = 13
FEATURE                   Location/Qualifiers
REGION                    1..13
                          note = Src-related peptide
source                    1..13
                          mol_type = protein
                          organism = synthetic construct
SEQUENCE: 6
RRLIEDAEYA ARG                                                        13

SEQ ID NO: 7              moltype = AA   length = 311
FEATURE                   Location/Qualifiers
source                    1..311
                          mol_type = protein
                          organism = Homo sapiens
SEQUENCE: 7
MTGGGNITEI TYFILLGFSD FPRIIKVLFT IFLVIYITSL AWNLSLIVLI RMDSHLHTPM     60
YFFLSNLSFI DVCYISSTVP KMLSNLLQGQ QTITFVGCII QYFIFSTMGL SESCLMTAMA    120
YDRYAAICNP LLYSSIMSPT LCVWMVLGAY MTGLTASLFQ IGALLQLHFC GSNVIRHFFC    180
DMPQLLILSC TDTFFVQVMT AILTMFFGIA SALVIMISYG YIGISIMKIT SAKGRSKAFN    240
TCASHLTAVS LFYTSGIFVY LSSSSGGSSS FDRFASVFYT VVIPMLNPLI YSLRNKEIKD    300
ALKRLQKRKC C                                                         311

SEQ ID NO: 8              moltype = AA   length = 315
FEATURE                   Location/Qualifiers
source                    1..315
                          mol_type = protein
                          organism = Homo sapiens
SEQUENCE: 8
MEIVSTGNET ITEFVLLGFY DIPELHFLFF IVFTAVYVFI IGNMLIIVA VVSSQRLHKP      60
MYIFLANLSF LDILYTSAVM PKMLEGFLQE ATISVAGCLL QFFIFGSLAT AECLLLAVMA    120
YDRYLAICYP LHYPLLMGPR RYMGLVVTTW LSGFVVDGLV VALVAQLRFC GPNHIDQFYC    180
DPMLFVGLAC SDPRVAQVTT LILSVFCLTI PFGLILTSYA RIVVAVLRVP AGASRRRAFS    240
TCSSHLAVVT TFYGTLMIFY VAPSAVHSQL LSKVFSLLYT VVTPLFNPVI YTMRNKEVHQ    300
ALRKILCIKQ TETLD                                                     315

SEQ ID NO: 9              moltype = AA   length = 315
FEATURE                   Location/Qualifiers
source                    1..315
                          mol_type = protein
                          organism = Homo sapiens
SEQUENCE: 9
MSITKAWNSS SVTMFILLGF TDHPELQALL FVTFLGIYLT TLAWNLALIF LIRGDTHLHT     60
PMYFFLSNLS FIDICYSSAV APNMLTDFFW EQKTISFVGC AAQFFFFVGM GLSECLLLTA    120
```

```
MAYDRYAAIS SPLLYPTIMT QGLCTRMVVG AYVGGFLSSL IQASSIFRLH FCGPNIINHF    180
FCDLPPVLAL SCSDTFLSQV VNFLVVVTVG GTSFLQLLIS YGYIVSAVLK IPSAEGRWKA    240
CNTCASHLMV VTLLFGTALF VYLRPSSSYL LGRDKVVSVF YSLVIPMLNP LIYSLRNKEI    300
KDALWKVLER KKVFS                                                    315

SEQ ID NO: 10           moltype = AA  length = 310
FEATURE                 Location/Qualifiers
REGION                  1..310
                        note = chimeric receptor OR5A2_variant 1
source                  1..310
                        mol_type = protein
                        organism = synthetic construct
SEQUENCE: 10
MTKNQTWVTE FILLGFPLSL RIQMLLSGLF SLLYVFTLLG NGAILGLIWL DSRLHTPMYF     60
FLSNLSFLDI CYVSSTAPKM LSDIITEQKT ISFVGCATQY FVFCGMGLTE CFLLAAMAYD   120
RYAAICNPLL YTVLISHTLC LKMVVGAYVG GFLSSFIETY SVYQHDFCGP YMINHFFCDL   180
PPVLALSCSD TFTSEVVTFI VSVVVGIVSV LVVLISYGYI VAAVVKISSA TGRTKAFSTC   240
ASHLTAVTLF YGSGFFMYMR PSSSYSLNRD KVVSIFYALV IPVVNPLIYS LRNAEVKGAL   300
KRVLWKQRSK                                                          310

SEQ ID NO: 11           moltype = AA  length = 228
FEATURE                 Location/Qualifiers
source                  1..228
                        mol_type = protein
                        organism = Homo sapiens
SEQUENCE: 11
PMYFFLSNLS FLDICYVSST APKMLSDIIT EQKTISFVGC ATQYFVFCGM GLTECFLLAA    60
MAYDRYAAIC NPLLYTVLIS HTLCLKMVVG AYVGGFLSSF IETYSVYQHD FCGPYMINHF   120
FCDLPPVLAL SCSDTFTSEV VTFIVSVVVG IVSVLVVLIS YGYIVAAVVK ISSATGRTKA   180
FSTCASHLTA VTLFYGSGFF MYMRPSSSYS LNRDKVVSIF YALVIPVV               228

SEQ ID NO: 12           moltype = AA  length = 311
FEATURE                 Location/Qualifiers
source                  1..311
                        mol_type = protein
                        organism = Homo sapiens
SEQUENCE: 12
MTKNQTWVTE FILLGFPLSL RIQMLLSGLF SLLYVFTLLG NGAILGLIWL DSRLHTPMYF    60
FLSHLAIIDI SYASNNVPKM LTNLGLNKRK TISFVPCTMQ TFLYMAFAHT ECLILVMMSY   120
DRYMAVCHPL QYSVIMRWGV CTVLAVTSWA CGSLLALVHV VLILRLPFCG PHEINHFFCE   180
ILSVLKLACA DTWLNQVVIF ASSVFILVGP LCLVLVSYSR ILAAILRIQS GEGRRKAFST   240
CSSHLCMVGL FFGSTIVMYM APKSRHPEEQ QKVLSLFYSL FNPMLNPLIY SLRNAEVKGA   300
LKRVLWKQRS K                                                        311
```

OLFACTORY RECEPTOR INVOLVED IN THE PERCEPTION OF MUSK FRAGRANCE AND THE USE THEREOF

PRIORITY AND CROSS REFERENCE TO RELATED APPLICATIONS

This application is a Divisional Application of U.S. application Ser. No. 16/770,457, filed Jun. 5, 2020, and issued as U.S. Pat. No. 11,867,685, which is the U.S. National Stage Application under 35 U.S.C. § 371 of International Application No. PCT/EP2018/083570, filed Dec. 5, 2018, designating the U.S. and published in English as WO 2019/110630 A1 on Jun. 13, 2019, which claims the benefit of European Patent Application No. EP 17205402.5, filed Dec. 5, 2017. Any and all applications for which a foreign or a domestic priority is claimed is/are identified in the Application Data Sheet filed herewith and is/are hereby incorporated by reference in their entirety under 37 C.F.R. § 1.57.

SEQUENCE LISTING IN ELECTRONIC FORMAT

The parent of present application was filed along with an Electronic Sequence Listing as an ASCII text file via EFS-Web. The Electronic Sequence Listing was provided as a file entitled DECLE242001APCSEQLIST.txt, created on Jun. 3, 2020, and last modified on Jun. 4, 2020, which is 25,019 bytes in size. The present application is filed along with an Electronic Sequence Listing via Patent Center. The Electronic Sequence Listing is provided as a file entitled DECLE242001APCSEQLIST.xml, created on Jan. 5, 2024, which is 17,560 bytes in size, which is replaced by a Replacement Electronic Sequence Listing submitted herewith as a file entitled DECLE242001D1REPLACEMENTSEQLIST.xml, which is 17,624 bytes in size and was created on Apr. 1, 2024. The information in the Electronic Sequence Listing is incorporated herein by reference in its entirety.

FIELD OF THE INVENTION

The technical field refers to the characterization of olfactory receptors. In particular, the present invention relates to the olfactory receptor five subfamily A member two, i.e. OR5A2 and the identification of its ligands corresponding to natural musk or synthetic musks. The present invention provides assays and methods of screening that can be used to identify compounds able to activate, mimic, block, inhibit, modulate and/or enhance the activity of this receptor (OR5A2).

BACKGROUND OF THE INVENTION

Olfactory Receptors

The genes coding for olfactory receptors (ORs) represent the largest family of genes (3% of the whole genome) in the human body dedicated to a single physiological function. These ORs belong to the superfamily of G protein coupled receptors (GPCRs). GPCRs are membrane receptors usually located at the surface of many different cell types. The common features of these receptors consist in seven transmembrane spans that form a barrel within the cell membrane and in their capacity to interact with heterotrimeric GTPase and thereby transducing a signal upon binding of their activators.

In the human genome, about 1.000 sequences containing characteristic signatures of olfactory receptors have been found. However, 60% of these appear to encode non-functional pseudogenes, thereby leaving humans with about 400 different functional OR proteins.

Based on phylogenetic analyses, the mammalian ORs can be classified into two different groups: class I and class II. The class 1 ORs, also called "fish-like receptors", forms a homogenous group that is more closely related to ORs found in fish and are therefore assumed to represent a conserved relic maintained throughout the evolution of the vertebrates. The persistence of this group of ancestral ORs suggests that they play an important role in mammalian chemical perception. In contrast to the fish-like ORs, the class 2 ORs first appeared in tetrapode vertebrates and expanded to form the majority of the OR repertoire presently known in humans. The class 2 ORs probably represents an adaptation to the terrestrial life where the detection of airborne odorant is required. In mammals the majority of the ORs belong to class II, but mammals do also have class I ORs.

Mechanisms of Odor Perception

Odorant receptors are expressed in specialized olfactory sensory neurons (OSNs) located at the top of the nasal cavity in a small area that constitutes the olfactory epithelium. Filiform extensions at one end of these cells contain the ORs on their surface and float in the nasal mucus where the odorants are dissolved. At the opposite end, the OSN extends its axon across the ethmoid bone at the base of the cranium to connect to the olfactory bulb a small region of the brain dedicated to the integration of the olfactory stimuli. An outstanding feature of the tens of millions of OSN scattered throughout the olfactory epithelium is that each one expresses only one of the about 400 OR genes available in the human genome. In OSN, triggering of the OR promotes the activation of an olfactory-specific G protein (Galpha-olf) that stimulates a type III adenylate cyclase to produce cyclic AMP; this plays the role of a second messenger. Upon binding to a cAMP-gated cation channel, this messenger induces the entry of calcium into the cell. Calcium causes the opening of another channel that promotes the exit of chloride ions, and hence triggers an action potential of the neuron leading to a signal to the respective brain area. Each OR is able to interact with different molecules, and each odorant molecule can activate more than one OR. Thus, odor perception does not rely on the simple activation of a single OR, but rather on multiple activations of several ORs. With a pool of roughly 400 ORs, the number of possible combinations is almost infinite, thus explaining the outstanding discrimination properties of the olfactory system.

Characterization of Odorant Molecules with ORs

Cultured cell lines have been widely used to characterize and study receptors of interest in both academic and industrial contexts. This approach involves introduction of the corresponding gene into the cells, and subsequent promotion of its stable or transient overexpression. The activity of the receptor can be monitored using a functional assay. The use of easy-to-culture cell lines along with easy-to perform functional assays facilitates several thousand measurements per day. Typically, in the pharmaceutical industry, it is common to test libraries of million compounds per day on non-olfactory receptors. The production of cAMP arising in the cell upon activation of the OR by its odorant molecules may be detected by an indirect approach that consists of the use of a reporter gene, as described in (Saito et al., 2004 Cell Vol. 119, 679-691). This gene is placed under the control of a cAMP inducible promoter and is expressed only upon induction by cAMP. Different genes can be used for this purpose, but one of the most popular encodes the light-producing protein luciferase. While cleaving its substrate, luciferin, this enzyme releases light that is readily detected and quantified. The intensity of light emitted reflects the amount of luciferase produced, which is proportional to the cAMP increase and therefore directly related to the activity of the receptor. One of the advantages of reporter gene assays is dependent upon the signal amplification between receptor activation and reporter production. This makes the assay particularly sensitive to weak responses that can hardly be detected by other functional assays.

Other functional assays have also been used to demonstrate the activation of an OR by its odorant ligand. One of these assays consists in monitoring the increase in cytosolic calcium that occurs upon activation of the receptor (Krautwurtz D. et al. 1998. *Cell* 95, 917-26).

Identifications of human OR activators have also been reported. Examples of deorphanized human OR are given in Fujita Y et al. 2007. *J. Recept. Signal. Transduct. Res.* 27, 323-34; Keller A. et al. 2007. *Nature* 449, 468-72; Matarazzo V. et al. 2005. *Chem. Senses* 30, 195-207; Saito H. et al. 2009. *Sci. Signal.* 2, 1-14; Sanz G. et al. 2005. *Chem. Senses* 30, 69-80; Schmiedeberg K. et al. 2007. *J Struct. Biol.* 159, 400-12.; Shirokova E. et al. 2004. *J. Biol. Chem.* 280, 11807-15.; Spehr M. et al. 2003. *Science* 299, 2054-58.; Wetzel, K. et al. 1999. *J. Neurosci.* 19, 7426-33.; WO 2006/094704; Shirasu et al. 2014 *Neuron* 81, 165-78.

For several of the receptors, more than one ligand has been identified. Odorant activating the same OR can belong to different odorant families such as alcohol, aldehyde, esters, etc (Sanz G. et al. 2005. *Chem. Senses* 30, 69-80; Saito H. et al. 2009. *Sci. Signal.* 2, 1-14).

Musks

Musks are known to have been used in medicine and as fragrance for over 5000 years because of their fascinating scent and physiological effects. Nowadays, musk odors are widely used in cosmetic and perfume industry because of their warmth, elegance and animal scent as well as for their fixative properties. The first natural musk compound, Muscone, was reported in 1906 by Walbaum as the major fragrant present in secretions of musk deer. Muscone presents a unique macrocyclic ketone structure with a 15-membered ring and has female attractive properties suggesting that it's male pheromone in musk deer. Since then, numerous compounds with a musky-like aroma have been purified from plants and animals like civet cat, musk shrew and muskarat. However, their physiological functions in these species have not been investigated.

In the past, musk deer was the principal source of natural musk used in the manufacturing of aromatic substances. Its rarity and high price presented an incentive for replacing natural musks with synthetic musks long before the issue of musk deer species conservation; which has later become a priority concern. The first synthetic musk compound, the "nitromusk", appeared in the 19th century by accident: Albert Baur, who wanted to find a way to get a powerful and safe explosive such as trinitrotoluene (TNT), obtained, instead, a strong musk-smelling substance. Since then, many compounds that mimic the aroma of Muscone have been synthetized and used in perfumery as base notes of many commercial formulations. These compounds are part of four structurally diverse groups of chemicals: nitromusks, polycyclic musks, macrocyclic musks, and linear/alicyclic musks.

Nitromusks belong to the nitrophenyl derivatives, which are technically easy to manufacture. They were the first generation of synthetic musks, and were massively used in perfumery until the 1950s. Nitromusks generally refer to the five most commercially relevant fragrant compounds: musk ketone (4-tert-butyl-2,6-dimethyl-3,5-dinitroacetophenone), musk ambrette (2,6-dinitro-3-methoxy-4-tert-butyltoluene), musk moskene (1,1,3,3,5-pentamethyl-4,6-dinitro-2H-indene), musk tibetene (1-tert-butyl-3,4,5-trimethyl-2,6-dinitrobenzene) and musk xylene (1-tert-butyl-3,5-dimethyl-2,4,6-trinitrobenzene). In this family, musk ketone was used in famous expensive perfumes such as Chanel n° 5 and was considered as the benchmark smell of musk, since it closely resembles muscone. Since 1995, musk ambrette was banned by law in cosmetics by the European Union because of its photo-allergenic, carcinogenic and neurotoxic effects. Musk tibetene and musk moskene production has decreased in recent years due to concerns about their toxicity, bioaccumulation and persistence in the environment, and the resulting European Union ban on use of these musks in cosmetics. Musk Ketone and musk xylene continue to be used as additives in detergents, housecleaning products and other fragrant non-cosmetic products. Due to the fact that consumers did like the sweet powdery nitromusk smell and that some legendary fragrances were built upon nitromusks, scientists had to find some replacement for nitromusks.

In the 1950s, polycyclic musks were developed based on petrochemical-based materials. Structurally, they are formed by a bi-cyclic core structure such as indane or tetraline type, which is substituted with a combination of an acetyl group or a pyran ring in combination with methyl, isopropyl and/or t-butyl groups. The big advantages of this family are to be more stable, less reactive for functional use in perfumery and cheaper than nitromusks. Their high fixative effect as well as strong musky smell, sweet, with dry powdery and amber odor contribute to their success. The most widely used polycyclic musk is Galaxolide® followed by Tonalide®, are the two largest volume products in the group of polycyclic musks, representing about 95% of the EU market. Due to these high amounts produced and consumed as well as to their high bio-persistence, these substances are, nowadays, ubiquitous. Indeed, they can be detected in various environmental and human samples such as water, blood, breast milk, sediments and organisms such as various fish species. Moreover, they present a high level of lipophilicity and accumulate easily in fatty tissues causing modification of the chain food. As for nitromusks, the safety of the intake of these substances, not only via dermal contact, is under discussion, even although some animal studies and bio assays suggest yet that Galaxolide® may have hormone disrupting effects.

A third group of synthetic musk substitutes, macrocyclic musks, was synthetized in 1926. These molecules are very similar to those of natural musk and are clearly superior, in terms of odor characteristics, to other artificial musks. All members of this class possess at least a single ring composed of more than 6 carbons (often 10-15). In the past, owing to the relatively high cost of production, they were less extensively used in perfume formulation except for very exclusive composition. Although there remains very little information available on macrocyclic musks, these compounds appear to be more environment friendly. Moreover, up to now, no reports have demonstrated any adverse effect of macrocyclic musk on human health. For these reasons, we observe that the worldwide production of synthetic macrocyclic musks tends to increase currently.

Alicyclic musks, otherwise known as cycloalkyl ester or linear musks, are a relatively novel class of musk compounds with a structure dramatically different (modified alkyl esters) with respect to others musks previously described. The first compound of this class was introduced 1975 with Cyclomusk, having a warm, powdery, musky smell with hints of fruit and strawberries. This compound never entered on the market due to its uncompetitive price. Some 15 years later Helvetolide a new compound of this class was produced at a commercial scale. Romandolide, a more ambrette and less fruity alicyclic musk compared to Helvetolide was introduced ten years later. The use of these musks is still very limited and they have been detected in some surface water. In general, little is known about these musks and considerations similar to those at polycyclic musks can be drawn. However, according different studies, Romandolide is readily biodegradable, therefore it is currently not expected to find linear musks at detectable levels in the environment.

Musk is a whole class of fragrant substances used as base notes in perfumery. Since the use of synthetic nitro-and polycyclic musks was reduced in recent years because of their health and environment damaging properties, it remains the most commonly used raw material present in almost all fragrant compositions. Its unique properties to balance the composition, to add a subtle touch of sensuality and warmth and to reduce the evaporation rate, make it a crucial, indispensable component in perfume industry. Hence, there is a real need for the development and the identification of new biodegradable, non-toxic musks or compounds that enhance the perception of these. Different strategies/methods have been developed in the past to find the musk fragrance or compound that activates, mimics, bloks, inhibits, modulates or enhances musk perception (Akuhara et al. 2016 *J Neurosci.* 36(16), 4482-91; Shirasu et al. 2014 *Neuron* 81, 165-78; WO 2016/201152A1 ; WO 2015/020158 A1). They are all based on the use of the two identified olfactory receptors in mice, olfr1440 (MOR215-1) or olfr96 (MOR221-1) and their human orthologs OR11A1 or OR5AN1 as musk-specific receptors.

SUMMARY OF THE INVENTION

In the present invention, it has surprisingly been discovered that an olfactory receptor, belonging to class 2 of OR, is activated by the four different structurally diverse groups of musks previously described. So far, none of the formerly identified musk-receptors showed such levels of responsiveness for the all four groups. Given the importance of musk in our everyday life, this unexpected discovery would allow the identification of musk compounds more safe, ecologically benign and useful for the perfumer and flavors companies.

The present invention relates to the identification of a new Olfactory Receptor (OR) belonging to class 2 of OR, namely, OR5A2 (the OR of the invention), as natural receptor for all structurally diverse group of chemicals comprising nitromusks, polycyclic musks, macrocyclic musks and linear musks. Preferably, the OR5A2 is defined herein by the amino acid sequence of SEQ ID NO:2 or polypeptide sequences having at least 80, preferably at least 85% or 86% amino acid identity, and more preferably 90%, 95%, 96%, 97%, 98%, 99% or higher, including 100% amino acid identity to SEQ ID NO:2, that are able to be activated by musk compounds. The invention encompasses the use of the interaction of these OR polypeptides and musk compounds as the basis of screening assays for agents that activate, mimic, block, inhibits, modulate or enhance the activity of the OR5A2 receptor as defined herein.

The invention further provides a chimeric receptor that comprises the central region of OR5A2, encompassing the transmembrane domains 2 to 7, defined by amino acid SEQ ID NO: 11, which is fused at its N-terminus to the N-terminal extracellular moiety, the transmembrane domain 1 and the intracellular loop 1, of a G protein coupled receptor; and which is fused at its C-terminus to the intracellular C-terminal end of a G protein receptor. In preferred embodiments, said G protein coupled receptor is an olfactory receptor or the OR2A5 receptor defined by SEQ ID NO: 12. Also provided is the use of such a chimeric receptor for identifying modulators of OR5A2 and the use of the central region of OR5A2, encompassing the transmembrane domains 2 to 7, defined by amino acid SEQ ID NO:11 or a polypeptide sequence having at least 95% amino acid identity, and preferably 96%, 97%, 98%, 99%or higher, including 100% amino acid identity, to SEQ ID NO:11, for identifying agents that interfere with the binding between said OR5A2 receptor and musk compounds.

The invention also encompasses kits for performing screening methods based upon the interaction of the OR5A2 receptor (SEQ ID NO:2) or the central region (transmembrane region 2 to 7—SEQ ID NO:11) of the OR5A2 receptor as defined herein with musk compounds.

The invention encompasses a method of identifying an agent or a sample, containing one or more agents, that modulates the activity of OR5A2 receptor as defined herein, said method comprising: a) contacting the OR polypeptide as defined herein, which can either be the OR5A2 receptor as defined herein (SEQ ID NO:2), its central region (SEQ ID NO:11), or a chimeric receptor comprising said central region (cf. for example SEQ ID NO:10), with an agent or a sample; b) measuring a signaling activity of said OR polypeptide in the presence of said agent or sample; and c) comparing the activity measured in the presence of said agent or sample to the activity measured in a reaction in which said OR polypeptide is contacted with one or more musk compound(s) at its/their $EC_{50}$, wherein said agent or sample is identified as an agent or a sample, that modulates the activity of the OR5A2 receptor as defined herein when the amount of the activity measured in the presence of the agent or sample is at least 10% of the amount induced by said musk compound(s) at its/their $EC_{50}$.

The invention further encompasses a method of identifying an agent or a sample, containing one or more agents, that modulates the activity of the OR5A2 receptor as defined herein, said method comprising: a) contacting said OR polypeptide with one or more musk compound(s) as defined herein in the presence and in the absence of an agent or sample; and b) measuring a signaling activity of the OR polypeptide as defined herein, which can either be the OR5A2 receptor as defined herein (SEQ ID NO:2), its central region (SEQ ID NO:11), or a chimeric receptor comprising said central region, and c) comparing the amount of said activity measured in a reaction containing said OR polypeptide and musk compound(s) without the agent or sample to the amount of said activity measured in a reaction containing said OR polypeptide, musk compound and said agent or sample, wherein a change in the activity in the presence of the agent or sample relative to the activity in the absence of the agent or sample, identifies said agent or sample as an agent or sample, that modulates the activity of the OR5A2 receptor as defined herein.

The invention further encompasses a method of identifying an agent or a sample, containing one or more agents, that increases the activity of the OR5A2 receptor as defined herein, said method comprising: a) contacting the OR polypeptide as defined herein, which can either be the OR5A2 receptor as defined herein (SEQ ID NO:2), its central region (SEQ ID NO:11), or a chimeric receptor comprising said central region, with one or more musk compound(s) as defined herein in the presence and in the absence of an agent or sample, under conditions permitting activation of said OR polypeptide by said musk compound(s); and b) measuring a signaling activity of said OR polypeptide, wherein a change in the activity in the presence of said agent or sample relative to the activity in the absence of said agent or sample identifies said agent or sample as an agent or sample, that increases the activity of the OR5A2 receptor as defined herein.

The invention further encompasses a method of identifying an agent or a sample, containing one or more agents, that decreases the activity of the OR5A2 receptor as defined herein, said method comprising: a) contacting the OR polypeptide as defined herein, which can either be the OR5A2 receptor as defined herein (SEQ ID NO:2), its central region (SEQ ID NO:11), or a chimeric receptor comprising said central region, with one or more musk compound(s) as defined herein in the presence and in the absence of an agent or sample, under conditions permitting activation of said OR polypeptide by said musk compound(s); and b) measuring a signaling activity of said OR polypeptide, wherein a change in the activity in the presence of said agent or sample relative to the activity in the absence of said agent or sample identifies said agent or sample as an agent or a sample that decreases the activity of the OR5A2 receptor as defined herein.

The invention encompasses a method of identifying an agent or a sample, containing one or more agents, that modulates the activity of the OR5A2 receptor as defined herein, said method comprising: a) contacting the OR polypeptide as defined herein, which can either be the OR5A2 receptor as defined herein (SEQ ID NO:2), its central region (SEQ ID NO:11), or a chimeric receptor comprising said central region, with an agent or sample; b) measuring the binding the said agent or sample to the said OR polypeptide; and c) comparing the binding of the said agent or sample to the binding of the said OR polypeptide to one or more musk compound(s) as defined herein at its/their $EC_{50}$, wherein said agent or sample is identified as an agent or a sample that modulates the activity of the OR5A2 receptor as defined herein when the amount of the binding of said agent or sample is at least 10% of the amount binding of said musk compound(s) present at its/their $EC_{50}$.

The invention further encompasses a method of identifying an agent, or a sample containing one or more agents, that modulates the interaction between one or more musk compound(s) as defined herein and the OR5A2 receptor as defined herein, said method comprising: a) contacting the OR polypeptide as defined herein, which can either be the OR5A2 receptor as defined herein (SEQ ID NO:2), its central region (SEQ ID NO:11), or a chimeric receptor comprising said central region, with said musk compound(s) in the presence and absence of an agent or sample under conditions permitting the binding of said musk compound(s) to said OR polypeptide; and b) measuring the binding of the OR polypeptide to said musk compound(s), wherein a modulation in binding in the presence of the agent or sample, relative to the binding in the absence of the agent or sample, identifies said agent or sample as an agent or a sample that modulates the interaction between one or more musk compound(s) as defined herein and the OR5A2 receptor as defined herein.

According to the present invention, when using binding methods, the one or more musk compound(s) may be detectably labeled. In said methods, the musk compound(s) may be detectably labeled with a moiety selected from the group consisting of a radioisotope, a fluorophore, and a quencher of fluorescence.

In one embodiment of any one of the preceding methods, the contacting is performed in or on a cell expressing the OR polypeptide as defined herein, which can either be the OR5A2 receptor as defined herein (SEQ ID NO:2), its central region (SEQ ID NO: 11), or a chimeric receptor comprising said central region. According to the present invention, said cell may be, but is not limited to, Human embryonic kidney cells (HEK293), Chinese hamster cells (CHO), Monkey cells (COS), primary olfactory cells, Xenopus cells, insect cells, yeast or bacteria.

In another embodiment of any one of the preceding methods, the contacting is performed in or on synthetic liposomes (see Tajib et al., 2000, Nature Biotechnology 18: 649-654, which is incorporated herein by reference) or virus-induced budding membranes containing the OR polypeptide as defined herein, which can either be the OR5A2 receptor as defined herein (SEQ ID NO:2), its central region (SEQ ID NO:11), or a chimeric receptor comprising said central region (see WO0102551, 2001, incorporated herein by reference).

In another embodiment of any one of the preceding methods, the method is performed using a membrane fraction from cells expressing the OR polypeptide as defined herein, which can either be the OR5A2 receptor as defined herein (SEQ ID NO:2), its central region (SEQ ID NO:11), or a chimeric receptor comprising said central region. In a preferred embodiment of either one of the preceding methods, the method is performed on a protein chip. In another preferred embodiment of either one of the preceding methods, the measuring is performed using a method selected from label displacement, surface plasmon resonance, fluorescence resonance energy transfer, fluorescence quenching, and fluorescence polarization.

In another embodiment of either one of the preceding methods, the agent is selected from the group consisting of a peptide, a polypeptide, an antibody or antigen-binding fragment thereof, a lipid, a carbohydrate, a nucleic acid, and a small organic molecule.

According to the present invention, when a functional assay is used, the step of measuring a signaling activity of the OR5A2 receptor as defined herein may comprise detecting a change in the level of a second messenger.

In another embodiment, the step of measuring a signaling activity comprises measurement of guanine nucleotide binding/coupling or exchange, adenylate cyclase activity, cAMP, Protein Kinase C activity, Protein Kinase A activity phosphatidylinositol breakdown, diacylglycerol, inositol triphosphate, intracellular calcium, calcium flux, arachidonic acid, MAP kinase activity, tyrosine kinase activity, melanophore assay, receptor initialization assay, or reporter gene expression. When the G-protein binding/coupling or exchange is measured, of all G□ subunits possible preferably the behaviors of GTP-binding protein G protein alpha-olf subunit (olfactory), also G-olf, is studied. The sequence of the human G-olf subunit has been deposited previously at the Genebank under accession number L10665. However, G-olf subunits of other species may be used and studied.

In a preferred embodiment, the measuring of the signaling activity comprises using a fluorescence or luminescence assay. Fluorescence and luminescence assays may comprise the use of $Ca^{2+}$ sensitive fluorophores including fluo3, Fluo4 or Fura, (Molecular probes); Ca3-and Ca6-kit family (Molecular Device) and aequorin. Furthermore, said assays may apply an automated fluorometric or luminescent reader such as FDSS (Hammamatsu) or FLIPR (Molecular Device).

The invention further encompasses a method of modulating the activity of the OR5A2 receptor as defined herein in a cell, said method comprising the step of delivering to said cell, a musk compound as defined herein or an agent that modulates the activity of the OR polypeptide as defined herein, which can either be the OR5A2 receptor as defined herein (SEQ ID NO:2), its central region (SEQ ID NO: 11), or a chimeric receptor comprising said central region, such that the activity of the OR is modulated.

In another embodiment of any one of the preceding methods, the method is a high throughput screening method.

In another embodiment of any one of the preceding methods, the agent is part of a chemical library or animal organ extracts.

According to the present invention, the agent identified or detected by any of the preceding methods, or the composition comprising said agent, may be used to find new musk compounds. Alternatively, these may be used for the preparation of odorant activators or odorant enhancer. For instance, an OR activator or enhancer may be used as a deodorant. An OR activator or enhancer may be added to a fragrance or perfume formulation already used as a deodorant to reinforce its efficacy.

The present invention also encompasses a composition comprising the isolated OR polypeptide and a musk compound.

The present invention further relates to the use of musk compounds for the production of a kit for screening agents that modulate the signaling of the OR5A2 receptor as defined herein, or in combination with the OR5A2 receptor as defined herein for the production of a kit to screen odorant activators or odorant enhancers.

In addition, the present invention encompasses the use of a commercially or non-commercial available musk compound as a ligand for the OR5A2 receptor as defined herein.

The invention further encompasses a kit comprising the isolated OR5A2 polypeptide, one or more musk compound(s) as defined herein and packaging materials therefore; an isolated polynucleotide encoding the OR polypeptide as defined herein, which can either be the OR5A2 receptor as defined herein (SEQ ID NO:2), its central region (SEQ ID NO:11), or a chimeric receptor comprising said central region, one or more musk compound(s), and packaging materials therefore; a kit comprising a cell expressing said OR polypeptide or membranes thereof or several cells expressing said OR polypeptide or membranes thereof, one or more musk compound(s) as defined herein and packaging materials therefore. Said cell(s) may be transformed with a polynucleotide encoding said OR. In a preferred embodiment, said kit encompasses the OR5A2 receptor as defined herein, or any variant of said OR and one or more musk compound(s) as defined herein.

The invention hence provides for the following aspects:

Aspect 1. Use of the OR5A2 polypeptide defined by the amino acid sequence of SEQ ID NO. 2 or a polypeptide sequence having at least 80% amino acid identity, and preferably 90%, 95%, 96%, 97%, 98%, 99% or higher, including 100% amino acid identity, to SEQ ID NO. 2, for identifying agents that interfere with the binding between said OR5A2 receptor and one or more musk compounds.

Aspect 2. A method of identifying an agent or a sample containing one or more agent(s) that modulate(s) the activity of the OR5A2 polypeptide, said method comprising:
  a) contacting the OR5A2 polypeptide with said agent or sample;
  b) measuring a signaling activity of said OR5A2 polypeptide in the presence of said agent or sample; and
  c) comparing the activity measured in the presence of said agent or sample to the activity measured in a reaction in which said OR5A2 polypeptide is contacted with one or more musk compound(s) at its/their $EC_{50}$, wherein said agent or sample is identified as an agent or a sample, that modulates the activity of the OR5A2 receptor as defined herein when the amount of the activity measured in the presence of the agent or sample is at least 10% of the amount induced by said musk compound(s) at its/their $EC_{50}$.

Aspect 3. A method of identifying an agent or a sample, containing one or more agents, that modulates the activity of the OR5A2 receptor as defined herein, said method comprising: a) contacting said OR5A2 polypeptide with one or more musk compound(s) as defined herein in the presence and in the absence of an agent or sample; and b) measuring a signaling activity of said OR5A2 polypeptide, and c) comparing the amount of said activity measured in a reaction containing said OR5A2 polypeptide and musk compound(s) without the agent or sample to the amount of said activity measured in a reaction containing said OR5A2 polypeptide, musk compound and said agent or sample, wherein a change in the activity in the presence of the agent or sample relative to the activity in the absence of the agent or sample, identifies said agent or sample as an agent or sample, that modulates the activity of the OR5A2 receptor as defined herein.

Aspect 4. The method according to aspect 3, wherein an increase in the activity in the presence of said agent or sample relative to the activity in the absence of said agent or sample identifies said agent or sample as an agent or sample, that increases the activity of the OR5A2 receptor as defined herein.

Aspect 5. The method according to aspect 3, wherein a decrease in the activity in the presence of said agent or sample relative to the activity in the absence of said agent or sample identifies said agent or sample as an agent or a sample that decreases the activity of the OR5A2 receptor as defined herein.

Aspect 6. A method of identifying an agent or a sample, containing one or more agents, that modulates the activity of the ORSA2 receptor as defined herein, said method comprising: a) contacting said OR5A2 polypeptide with an agent or sample; b) measuring the binding the said agent or sample to the said OR5A2 polypeptide; and c) comparing the binding of the said agent or sample to the binding of the said OR5A2 polypeptide to one or more musk compound(s) as defined herein at its/their $EC_{50}$, wherein said agent or sample is identified as an agent or a sample that modulates the activity of the OR5A2 receptor as defined herein when the amount of the binding of said agent or sample is at least 10% of the amount binding of said musk compound(s) present at its/their $EC_{50}$.

Aspect 7. A method of identifying an agent, or a sample containing one or more agents, that modulates the interaction between one or more musk compound(s) as defined herein and the OR5A2 receptor as defined herein, said method comprising: a) contacting said OR5A2 polypeptide with said musk compound(s) in the presence and absence of an agent or sample under conditions permitting the binding of said musk compound(s) to said OR5A2 polypeptide; and b) measuring the binding of OR5A2 polypeptide to said musk compound(s), wherein a modulation in binding in the presence of the agent or sample, relative to the binding in the absence of the agent or sample, identifies said agent or sample as an agent or a sample that modulates the interaction between one or more musk compound(s) as defined herein and the OR5A2 receptor as defined herein.

Aspect 8. The method according to aspect 7, wherein an increase in the binding in the presence of said agent or sample relative to the binding in the absence of said agent or sample identifies said agent or sample as an agent or sample, that increases the binding of the OR5A2 receptor as defined herein.

Aspect 9. The method according to aspect 7, wherein a decrease in the binding in the presence of said agent or sample relative to the binding in the absence of said agent or sample identifies said agent or sample as an agent or a sample that decreases the binding of the OR5A2 receptor as defined herein.

Aspect 10. The method according to any one of aspects 2 to 9, wherein the one or more musk compound(s) is detectably labeled, preferably with a moiety selected from the group consisting of a radioisotope, a fluorophore, and a quencher of fluorescence.

Aspect 11. The method according to any one of aspects 2 to 10, wherein the contacting is performed in, or on a cell expressing said OR5A2 polypeptide, preferably wherein said cell is selected from: Human embryonic kidney cells (HEK293), Chinese hamster cells (CHO), Monkey cells (COS), primary olfactory cells, Xenopus cells, insect cells, yeast or bacteria.

Aspect 12. The method according to any one of aspects 2 to 11, wherein the contacting is performed in or on synthetic liposomes or virus-induced budding membranes containing an OR5A2 polypeptide.

Aspect 13. The method according to any one of aspects 2 to 12, wherein the method is performed using a membrane fraction from cells expressing said OR5A2 polypeptide or on a protein chip.

Aspect 14. The method according to any one of aspects 2 to 13, wherein the measuring is performed using a method selected from label displacement, surface plasmon resonance, fluorescence resonance energy transfer, fluorescence quenching, and fluorescence polarization.

Aspect 15. The method according to any one of aspects 2 to 14, wherein the agent is selected from the group comprising: a peptide, a polypeptide, an antibody or antigen-binding fragment thereof, a lipid, a carbohydrate, a nucleic acid, and a small organic molecule.

Aspect 16. The method according to any one of aspects 2 to 15, wherein the step of measuring a signaling activity of the OR5A2 receptor as defined herein comprises detecting a change in the level of a second messenger. Aspect 17. The method according to any one of aspects 2 to 16, wherein measuring the signaling activity comprises using a fluorescence or luminescence assay, preferably the use of $Ca^{2+}$ sensitive fluorophores including fluo3, Fluo4 or Fura,; Ca3- and Ca6-kit family or aequorin, or wherein said assays apply an automated fluorometric or luminescent reader such as FDSS or FLIPR.

Aspect 18. The method according to any one of aspects 2 to 17, wherein the method is a high throughput screening method.

Aspect 19. The method according to any one of aspects 2 to 18, wherein the agent is part of a chemical library or animal organ extracts.

Aspect 20. A method of modulating the activity of the OR5A2 receptor as defined herein in a cell, said method comprising the step of delivering to said cell, a musk compound or an agent that modulates the activity of said OR5A2 polypeptide, such that the activity of the OR5A2 is modulated.

Aspect 21. A method for the preparation of an odorant activator, odorant enhancer or a deodorant, comprising the steps of:
  a) identifying a candidate agent according to any one of the methods of aspects 3 to 20, and
  b) adding said agent to a composition for use as odorant activator, odorant enhancer or a deodorant.

Aspect 22. A kit comprising an isolated OR5A2 polypeptide, one or more musk compound(s) and packaging materials therefore.

Aspect 23. A kit comprising an isolated polynucleotide encoding the OR5A2 polypeptide, one or more musk compound(s), and packaging materials therefore.

Aspect 24. A kit comprising a cell expressing said the OR5A2 polypeptide, or membranes thereof or several cells expressing the OR5A2 polypeptide, or membranes thereof; one or more musk compound(s) as defined herein and packaging materials therefore.

Aspect 25. Use of the kit according to any one of aspects 22 to 24, for screening agents that modulate the signaling of the OR5A2 receptor, preferably for screening agents that can be used as odorant activators, odorant enhancers or deodorants.

Aspect 26. Use of a musk compound as a ligand for the OR5A2 receptor.

Aspect 27. Use of the kits according to any one of aspects 22 to 26, for performing screening methods based upon the interaction of the OR5A2 receptor with one or more musk compounds.

Aspect 28. Use or method according to any of the preceding aspects, wherein said musk compounds are selected from the group comprising: nitromusk compounds, linear musk compounds, polycyclic musk compounds and macrocyclic musk compounds.

Aspect 29. Use or method according to aspect 28, wherein said nitromusk compounds and/or said linear musk compounds and/or said polycyclic musk compounds and/or said macrocyclic musk compounds are selected from the group of molecules depicted in Table 2.

BRIEF DESCRIPTION OF THE DRAWINGS

FIG. 2A. ClustalW2 is used for polypeptide sequences alignment of OR5A2 variant_1 (SEQ ID NO°2), OR5A2 variant_2 (SEQ ID NO°4), OR5AN1 (SEQ ID NO°7), OR11A1 (SEQ ID NO°8) and OR5A1 (SEQ ID NO°9)

proteins. The black boxes represent identical nucleotides and conserved motifs in the five different ORs. FIG. 2B. Distance matrix showing that the OR5A2 is closer to OR5A1, a receptor activated by beta-ionone, than to OR5AN1 or OR11A1, two receptors known to respond to some musk subfamilies.

FIG. 4: BLASTP is used for polypeptide sequence alignment of OR5A2 variant_1 (SEQ ID NO:2) and OR5A2 variant 2 (SEQ ID NO:4). The protein sequence alignment shows one amino acid substitution (bold, underlined): proline (P) is substituted by leucine (L) at position 172.

FIG. 6A. ClustalW2 is used for polypeptide sequences alignment of OR5A2 variant_1 (OR5A2) (SEQ ID NO:2) and the chimeric OR5A2_variant 1 (SEQ ID NO:2) proteins. The black boxes represent identical nucleotides and conserved motifs in the different ORs. FIG. 6B. Concentration-response analysis of the chimeric OR5A2_variant 1 and the OR2A5 with different activators corresponding to 6 different musks representative of the four structurally diverse groups of musk (Musk Xylene, Serenolide, Galaxolide®, Velvione, Cashmeran, Musk Ketone). Only the chimeric OR5A2_variant 1 (left panel), but not the OR2A5 (right panel) shows dose response curves to the different musks tested.

FIGS. 8A-B: Dose response curves of Sylkolide (FIG. 8A) and Serenolide (FIG. 8B) on receptors OR5A2, OR5A1, OR5AN1 and OR11A1.

FIGS. 10A-C: Dose response curves of Ethylene Brassylate (FIG. 10A), Ambrettolide (FIG. 10B) and Cervolide (FIG. 10C) on receptors OR5A2, OR5A1, OR5AN1 and OR11A1.

DETAILED DESCRIPTION OF THE INVENTION

Definitions

Figure 1A:
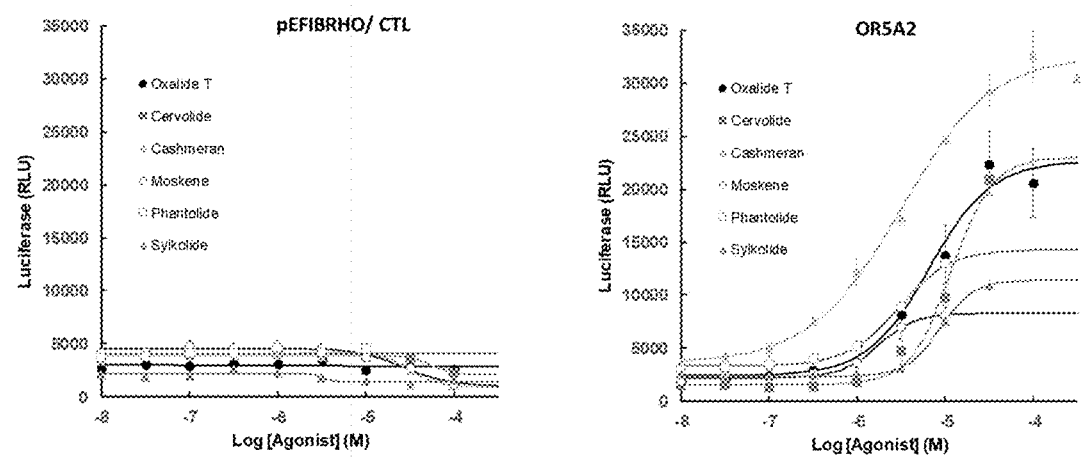
FIG. 1A. Concentration-response analysis of the OR of the invention (namely OR5A2, OR5A2 variant_1) with different activators corresponding to six different musks representative of the four structurally diverse groups of musk (macrocyclic musks: Oxalide T and Cervolide; polycyclic musks: Cashmeran and Phantolide; nitro musk: Moskene, alicyclic musks: Sylkolide). These analyses have been performed according to the procedure described in "Experimental procedure". pEFIBRHO corresponds to the empty vector and is used as control.

As used herein the term "Olfactory Receptor polypeptides (ORs)" in general refers to polypeptides from the G protein coupled receptor family mainly expressed by olfactory neurons. ORs may have the ability to interact with odorant molecules and to transduce the odorant signal.

The terms "Olfactory Receptor (OR) according to the invention" or "Olfactory Receptor polypeptides according to the invention" or "OR of the invention" or "OR5A2 receptor as defined herein" or "said OR polypeptide" denote the olfactory receptor family five subfamily A member two including haplotype variants such as, but not limited to, "OR5A2_variant_1" and "OR5A2_variant_2". corresponding to the polypeptide sequences referred in the "sequences list" SEQ ID NO:2 and 4 respectively, that are able to be activated by Musk compound(s) as defined herein. Examples of the OR5A2 receptor as defined herein include, but are not limited to polypeptides having at least 80%, at least 85%, or 86% amino acid identity, and preferably 90%, 95%, 96%, 97%, 98%, 99% or higher, including 100% amino acid identity, to the sequence represented in "sequences list" (SEQ ID NO:2) which maintain the ability to be activated by Musk compound(s) as defined herein. Said homology may relate to the whole polypeptide or only part of the polypeptide such as CDR domain (ligand-binding domain of the receptor). According to Pilpel and Lancet (Protein Science 8:969-977, 1999) the CDR domain of a GPCR may be defined following the indications published: TM3-#4, TM3-#8, TM3-#11, TM3-#12, TM3-#15, TM4-#11, TM4-#15, TM4-#19, TM4-#22, TM4-#23, TM4-#26, TM5-#3, TM5-#6, TM5-#7, TM5-#10, TM5-#11 and TM5-#13, wherein TMx indicates the transmembrane region of said receptor, and #indicates the amino acid position within said region. More specifically, the inventors have identified the region covering TM2 to 7 of the OR as being particularly important for the specificity for musk compounds as defined herein. Said region is defined by SEQ ID NO:11. A specific example of a variant having a high degree of identity to the OR5A2 polypeptide of the invention is represented by SEQ ID NO:4 and denoted as OR5A2_variant_2. Said term OR polypeptide of the invention also encompasses "OR5A2 chimeric receptors or polypeptides" as defined herein.

As used herein. the term "OR5A2 polynucleotide" refers to a polynucleotide that encodes the OR5A2 polypeptides as defined herein. Preferably, said polynucleotide has an identity of at least 86% or more, preferably 90%, 95%, 96%, 97%, 98%, 99% or higher, including 100% nucleic acid identity, to the sequence represented by SEQ ID NO: 1 (encoding OR5A2 variant 1) or SEQ ID NO:3 (encoding OR5A2 variant 2).

As used herein. the term "OR5A2 chimeric receptor or polypeptide" refers to a receptor that comprises the central region of the OR5A2 receptor, encompassing the transmembrane domains 2 to 7 defined by amino acid sequence ID NO:11 or a sequence having at least 95%, 96%, 97%, 98%, 99% or higher sequence identity, including 100% identity. Such chimeric receptors can further comprise the backbone of a G protein coupled receptor, more preferably of an olfactory receptor. More particularly, such a chimeric OR5A2 receptor comprises the TM2 to TM7 central region of the OR5A2 receptor (SEQ ID NO: 11), fused at its N-terminus to the N-terminal extracellular moiety, the transmembrane domain 1 and the intracellular loop 1, of a G protein coupled receptor and fused at its C-terminus to the intracellular C-terminal end of a G protein receptor. Said G protein coupled receptor preferably is an olfactory receptor. A particular example of such a chimeric OR5A2 receptor is defined by SEQ ID NO:10.

As used herein. the term "OR binding" refers to specific binding of an odorant molecule by an OR polypeptide as defined herein. Examples of odorant molecules include, but are not limited to musk compounds from the four different subfamilies: nitromusks, macrocyclic musks, linear musks, polycyclic musks.

As used herein. the term "OR signaling activity" refers to the initiation or propagation of signaling by an OR polypeptide as defined herein. OR signaling activity is monitored by measuring a detectable step in a signaling cascade by assaying one or more of the following: stimulation of GDP for GTP exchange on a G protein and most particularly G-olf; alteration of adenylate cyclase activity; protein kinase C modulation; protein kinase A modulation; phosphatidylinositol breakdown (generating second messengers diacylglycerol, and inositol triphosphate); intracellular calcium flux; activation of MAP kinases; modulation of tyrosine kinases; internalization assay; modulation of gene or reporter gene activity; or melanophore assay. A detectable step in a signaling cascade is considered initiated or mediated if the measurable activity is altered by 10% or more above or below a baseline established in the substantial absence of a musk compound relative to any of the OR activity assays described herein. The measurable activity can be measured directly, as in, for example, measurement of cAMP or diacylglycerol levels. Alternatively, the measurable activity can be measured indirectly, as in, for example, a reporter gene assay.

For most of these assays, kits are commercially available.

As used herein the term "Musk compound(s)" refers to one or more compound(s) that has/have an organoleptic description reminiscent of the smell of the strong-smelling substance secreted by the male musk deer. Said compounds are a class of fragrant substances that could be used a bases note in perfumery.

Preferably, Musk compounds as defined herein encompass synthetic musk compounds or natural musk compounds or commercially or not yet commercially available musk compounds falling within or not into the four structurally diverse groups of following chemicals: nitromusks, polycyclic musks, macrocyclic musks, and linear/alicyclic musks.

More preferably Musk compounds as defined herein encompass synthetic musk compounds or natural musk compounds or commercially or not yet commercially available musk compounds falling within the four structurally diverse groups of following chemicals: nitromusks, polycyclic musks, macrocyclic musks, and linear/alicyclic musks.

As used herein. the "Nitromusks" belong to the nitrophenyl derivatives. Preferably. Nitromusks generally refer to the five most commercially relevant fragrant compounds: musk ketone (4-tert-butyl-2,6-dimethyl-3,5-dinitroacetophenone), musk ambrette (2,6-dinitro-3-methoxy-4-tert-butyltoluene), musk moskene (1,1,3,3,5-pentamethyl-4,6-dinitro-2H-indene), musk tibetene (1-tert-butyl-3,4,5-trimethyl-2,6-dinitrobenzene) and musk xylene (1-tert-butyl-3,5-dimethyl-2,4,6-trinitrobenzene). More preferably, Nitromusks refer to musk ketone (4-tert-butyl-2,6-dimethyl-3,5-dinitroacetophenone), musk ambrette (2,6-dinitro-3-methoxy-4-tert-butyltoluene), musk moskene (1,1,3,3,5-pentamethyl-4,6-dinitro-2H-indene), and musk xylol (1-tert-butyl-3,5-dimethyl-2,4,6-trinitrobenzene).

As used herein. the "Polycyclic musks" are formed by a bi-cyclic core structure such as indane or tetraline type, which is substituted with a combination of an acetyl group or a pyran ring in combination with methyl, isopropyl and/or t-butyl groups. Preferably, Polycyclic musks refer to crysolide, tonalide®, phantolide, cashmeran, galaxolide®, traseolide, moxalone, vernolide and fixal.

As used herein, the term "Macrocyclic musks" possess at least a single ring composed of more than 6 carbons (often 10-15). Preferably, Macrocyclic musks refer to ethylene brassylate, thibetolide also known as exaltolide, 1,16-hexadecalactone, exaltenone, globanone also known as animusk, musk R1, velvione, cyclopentadecanone, muscone, civetone, musk MC4, cervolide, ⊐-6-hexadecenlactone, nirvanolide, isoambrettolide, habanolide, musk 77 and oxalide T.

As used herein, the "linear/alicyclic musks" otherwise known as cycloalkyl ester, are a class of musk compounds with a structure corresponding to modified alkyl esters. Preferably, linear musks refer to cyclopentenyl propionate musk, serenolide, sylkolide and helvetolide.

An "enhancer" as defined herein is a molecule that modulates or enhances the perception of an odor elicited by one or more odorant molecules. An enhancer may act by interacting with an OR that transduces the said odor or by interacting with the natural ligand for the receptor. A "enhancer" of the invention can increase the intracellular response induced by an agonist, for example a musk present in a perfume, by at least 10%, preferably 15-25%, more preferably 25-50% and most preferably, 50-100%. An enhancer, useful according to the present invention, includes, but is not limited to, small molecules, aptamer, photoaptamer, modified natural ligand, etc. that specifically binds to at least a portion of an OR which is required for signal transduction through musk compounds (such as the ligand binding site). Preferably, the activator agent is volatile, or can be made volatile in combination with appropriate solvents or additives.

As used herein, an "agonist" is a ligand which binds to a receptor and mimic the intracellular response induced by a natural ligand or another identify agonist, for example a new compound present in library.

As used herein, a "modulator" refers to a compound that increases or decreases the cell surface expression of a receptor of the invention, increases or decreases the binding of a ligand to the OR5A2 as defined herein, or any compound that increases or decreases the intracellular response initiated by an active form of the OR5A2 as defined herein, either in the presence or absence of a ligand for the receptor, for example a musk compound present in a perfume. A modulator includes an agonist, or enhancer, as defined herein. A modulator can be for example, a small molecule, a polypeptide, a peptide, an antibody or antigen-binding fragment thereof, a lipid, a carbohydrate, a nucleic acid, an aptamer, a photoaptamer, or a small chemical compound or small organic molecule. Candidate modulators can be natural or synthetic compounds, including, for example, synthetic small molecules, compounds contained in extracts of animal, plant, bacterial or fungal cells, as well as conditioned medium from such cells.

As used herein. the terms "increase" and "decrease" refer to a change in amount of ligand binding to the OR5A2 as defined herein and/or cell signaling through ORs of the invention of at least 10%. An "increase" or "decrease" in binding or signaling is preferably measured in response to contacting the OR5A2 as defined herein with a ligand in the presence of a candidate modulator, wherein the change in binding or signaling is relative to the binding or signaling in the absence of the candidate modulator.

As used herein, the term "small molecule" refers to a compound having a molecular mass of less than 3000 Daltons, preferably less than 2000 or 1500, still more preferably less than 1000, and most preferably less than 600 Daltons. A "small organic molecule" is a small molecule that comprises carbon.

As used herein, the terms "change", "difference", "decrease", or "increase" as applied to e.g., binding or signaling activity or amount of a substance refer to an at least 10% increase or decrease in binding, signaling activity, or for example, level of mRNA, polypeptide or ligand relative to a standard in a given assay.

As used herein, the term "conditions permitting the binding of musk compound to the OR5A2 as defined herein" refers to conditions of, for example, temperature, salt concentration, pH and protein concentration under which said OR binds a musk compound. Exact binding conditions will vary depending upon the nature of the assay, for example, whether the assay uses viable cells or only a membrane fraction of cells.

As used herein, the term "agent" refers to molecules selected from the group comprising: a peptide, a polypeptide, an antibody or antigen-binding fragment thereof, a lipid, a carbohydrate, a nucleic acid, and a small organic molecule.

As used herein, the term "sample" refers to the source of molecules being tested for the presence of an agent or modulator compound that modulates binding to or signaling activity of the OR5A2 as defined herein. A sample can be an environmental sample, a natural extract of animal, plant, yeast or bacterial cells, a clinical sample, a synthetic sample, or a conditioned medium from recombinant cells or from a fermentation process.

As used herein, the term "membrane fraction" refers to a preparation of cellular lipid membranes containing the OR5A2 as defined herein. As the term is used herein, a "membrane fraction" is distinct from a cellular homogenate, in that at least a portion (i.e., at least 10%, and preferably more) of non-membrane-associated cellular constituents has been removed. The term "membrane associated" refers to those cellular constituents that are either integrated into a lipid membrane or are physically associated with a component that is integrated to a lipid membrane.

As used herein, the term "second messenger assay" preferably comprises the measurement of guanine nucleotide binding or exchange, adenylate cyclase, intra-cellular CAMP, intracellular inositol phosphate, intra-cellular diacylglycerol concentration, arachidonic acid concentration, MAP kinase(s) or tyrosine kinase(s), protein kinase C activity, or reporter gene expression or an aequorin-based assay according to methods known in the art and defined herein.

As used herein, the term "second messenger" refers to a molecule, generated or caused to vary in concentration by the activation of a G-Protein Coupled Receptor that participates in the transduction of a signal from that GPCR. Non-limiting examples of second messengers include cAMP, diacylglycerol, inositol triphosphate, arachidonic acid release, inositol triphosphate and intracellular calcium. The term "change in the level of a second messenger" refers to an increase or decrease of at least 10% in the detected level of a given second messenger relative to the amount detected in an assay performed in the absence of a candidate modulator.

As used herein, the term "aequorin-based assay" refers to an assay for GPCR activity that measures intracellular calcium flux induced by activated GPCRs, wherein intracellular calcium flux is measured by the luminescence of aequorin expressed in the cell.

As used herein, the term "binding" refers to the physical association of a molecule (e.g., a ligand such as a musk compound or an antibody) with a receptor (e.g., the OR5A2s of the invention as defined herein). As the term is used herein, binding is "specific" if it occurs with an $EC_{50}$ or a Kd of 1 mM less, generally in the range of 1 mM to 10 nM for example, binding is specific if the $EC_{50}$ or Kd is 1 mM, 500 µM, 100 µM, 10 µM, 9.5 µM, 9 µM, 8.5 µM, 8 µM, 7.5 µM, 7 µM, 6.5 µM, 6 µM, 5.5 µM, 5 µM, 4.5 µM, 4 µM, 3.5 µM, 3 µM, 2.5 µM, 2 µM, 1.5 µM, 1 µM, 750 nM, 500 nM, 250 nM or 100 nM or less.

As used herein, the term "$EC_{50}$" refers to that concentration of a compound at which a given activity, including binding of a musk compound or other ligand and a functional activity of an OR, is 50% of the maximum for that OR activity measurable using the same assay in the absence of compound. Stated differently, the "$EC_{50}$" is the concentration of compound that gives 50% activation, when 100% activation is set at the amount of activity that does not increase with the addition of more agonist.

As used herein, the term "saturation" refers to the concentration of a musk compound at which further increases in ligand concentration fail to increase the binding of ligand or OR-specific signaling activity.

As used herein, the term "increase in binding" refers to an increase of at least 10% in the amount of ligand binding detected in a given assay with a known or suspected modulator of the OR5A2 as defined herein relative to binding detected in an assay lacking that known or suspected modulator.

As used herein, the term "G-Protein coupled receptor," or "GPCR" refers to a membrane-associated polypeptide with 7 alpha helical transmembrane domains. Functional GPCR's associate with a ligand or agonist and also associate with and activate G-proteins. The OR5A2 as defined herein belongs to the family of GPCRs.

As used herein, the term "antibody" is the conventional immunoglobulin molecule, as well as fragments thereof which are also specifically reactive with one of the subject polypeptides. Antibodies can be fragmented using conventional techniques and the fragments screened for utility in the same manner as described herein below for whole antibodies. For example, F(ab)2 fragments can be generated by treating antibody with pepsin. The resulting F(ab)2 fragment can be treated to reduce disulfide bridges to produce Fab fragments. The antibody of the present invention is further intended to include bispecific, single-chain, and chimeric and humanized molecules having affinity for a polypeptide conferred by at least one CDR region of the antibody. In preferred embodiments, the antibody further comprises a label attached thereto and able to be detected, (e.g., the label can be a radioisotope, fluorescent compound, chemiluminescent compound, enzyme, or enzyme co-factor). The antibodies, monoclonal or polyclonal and their hypervariable portion thereof (FAB, FAB", etc.) as well as the hybridoma cell producing the antibodies are a further aspect of the present invention which find a specific industrial application in the field of diagnostics and monitoring of specific diseases, preferably the ones hereafter described. Inhibitors according to the invention include but are not limited to labeled monoclonal or polyclonal antibodies or hypervariable portions of the antibodies.

As used herein, the term "OR constitutive activity" refers to a measurable activity of an olfactory receptor expressed into a cell that occurs spontaneously without addition of a ligand for the said olfactory receptor.

The invention relates to the finding that one or more musk compound(s) are able to activate the specific OR5A2 olfactory receptor present in human nasal epithelium, called the OR5A2 polypeptide as defined herein. The OR5A2/musk compound(s) interaction is useful for screening assays for agents that modulate such an interaction and thus the function of the OR5A2. This OR5A2/musk compound(s) interaction also provides for the identification of modulators, new agonists which could be of interest in industry. Unexpectedly, the OR5A2 olfactory receptor is the only OR that can be activated by all known classes of musk compounds as defined herein.

Assays for the Identification of Agents that Modulate the Activity Of ORs

Agents that modulate the activity of ORs can be identified in a number of ways that take advantage of the interaction of said receptors with musk compounds. For example, the ability to reconstitute OR5A2/musk compound(s) binding either in vitro, on cultured cells or in vivo provides a target for identification of agents that modulate that binding. Modulators of OR/musks binding can then be screened using a binding assay or a functional assay that measures downstream signaling through the said receptor. Both binding assays and functional assays are validated using musk compounds.

Another approach that uses the OR5A2/musk compound(s) interaction more directly to identify agents that modulate OR5A2 function measures changes in OR5A2 downstream signaling induced by candidate agents or candidate modulators. These functional assays can be performed in isolated cell membrane fractions or on cells expressing the receptor on their surfaces.

The following description provides methods for both binding and functional assays based upon the interaction of OR5A2 and one or more musk compound(s).

A. OR Polypeptides

Assays using the interaction of OR polypeptide and musk compounds as defined herein require a source of OR polypeptide. The polynucleotide and polypeptide sequences of human ORs are presented herein in "sequences list". The human OR5A2, is also available at GenBank database accession Nos NM_001001954.1 (SEQ ID N°1), NM_001001954.1:c.515C>T (SEQ ID N°3). The polypeptide sequences are also recorded at accession Nos Q8NGI9, VAR_024097 respectively in the Uniprot database.

One skilled in the art can readily amplify an OR sequence from a sample containing mRNA encoding the protein through basic PCR and molecular cloning techniques using primers or probes designed from the known sequences. Also, since OR genes are intron-less genes, a person skilled in the art can amplify an OR sequence from genomic DNA.

The expression of recombinant polypeptides is well known in the art. Those skilled in the art can readily select vectors and expression control sequences for the expression of OR polypeptides according to the invention in eukaryotic or prokaryotic cells. OR polypeptides are preferably associated with the cell membrane or synthetic liposomes in order to have binding or signaling function. Methods for the preparation of cellular membrane fractions are well known in the art, e.g., the method reported by Hubbard & Cohn, 1975, J. Cell Biol. 64: 461-479, which is incorporated herein by reference. In order to produce membranes comprising OR polypeptides, one can e.g. apply such membrane isolation techniques to cells endogenously or recombinantly expressing one of the OR polypeptide of the invention. Alternatively, OR polypeptides can be integrated into membrane preparations by dilution of detergent solution of the polypeptide (see, e.g., Salamon et al., 1996, Biophys. J. 71:283-294, which is incorporated herein by reference).

B. Musk Compounds

The structure of Musk molecules are well known by a skilled person. In addition, the person skilled in the art may easily derive equivalent musk from said structure and may easily test if said equivalents are able to bind and/or modulate the OR5A2 polypeptide as defined herein. Musk compounds may be isolated from natural samples, or chemically synthesized.

Methods which can be used to quantify said compounds may be, but are not limited to, a) for extraction and purification: solvent extraction, oil extraction, vapor extraction, $CO_2$ supercritical extraction, liquid chromatography, distillation, gas chromatography; b) for quantifying: gas chromatography, liquid chromatography and mass spectrometry. Said methods are well known in the art.

Musk compounds may be used in purified form or used as compositions. The amounts of the musk necessary in a given binding or functional assay according to the invention will vary depending upon the assay. If necessary for a given assay, a musk compound can be labeled by incorporation or addition of radioactive labels as pointed out above.

C. Assays to Identify Modulators of ORs Activity

The discovery that musk compounds from the four currently known structurally diverse groups of chemicals are ligands of the OR5A2 as defined herein, belonging to the class 2 olfactory receptor family permits the development of screening assays to identify agonists and modulators of said OR's activity. The screening assays will have two general approaches.

1) Ligand binding assays, in which cells expressing said OR5A2, membrane extracts from such cells, or immobilized lipid membranes comprising said OR5A2 are exposed to one or more labeled musk compound(s) as defined herein, known to bind said OR5A2 and a candidate compound. Following incubation, the reaction mixture is measured for specific binding of the labeled musk compound(s) to said OR5A2. Compounds that interfere with or displace labeled musk compound(s) from the OR5A2 can be identified as modulators, preferably enhancer of OR5A2 activity. Functional analysis can be performed on positive compounds to determine in which of these categories they fit.

Binding of a compound may be classified into 3 main categories: competitive binding, non-competitive binding and uncompetitive binding. A competitive binding compound resembles a second (reference) compound and binds to the same binding pocket of a target molecule (here receptor). Upon addition, the competitive binding compound displaces said second compound from said target. A non-competitive binding compound does not bind to the same binding pocket of the target molecule as a second (reference) compound but may interact with the effect of said second compound on said target molecule. The second compound is not displaced upon addition of the non-competitive binding compound. An uncompetitive-binding compound binds to the target molecule when a second compound is already bound. Cooperative binding means that a compound facilitates the binding of another compound which may be a reference compound. The cooperative effect is thus seen in the analysis of the Kd of said other compound.

2) Functional assays, in which a signaling activity of OR5A2 as defined herein is measured. For agonist screening, cells expressing said OR5A2 or membranes prepared from them are incubated with a candidate compound, and a signaling activity of said OR5A2 is measured. The assays are validated using one or more musk compound(s) as defined herein, as agonist(s), and the activity induced by compounds that modulate receptor activity is compared to that induced by the musk compound(s). An agonist or partial agonist will have a maximal biological activity corresponding to at least 10% of the maximal activity of the musk compound(s) when the agonist or partial agonist is present at 100 μM or less. and preferably will have 50%, 75%, 100% or more. including 2-fold, 5-fold, 10-fold or more activity than the musk compound(s).

Ligand Binding and Displacement Assays

One can use OR5A2 polypeptide as defined herein expressed in a cell, or isolated membranes containing such OR5A2 polypeptide, along with one or more musk compound(s) as defined herein in order to screen for compounds that enhance the binding of musk compounds to OR polypeptides. When identified in an assay that measures binding or musk compound displacement alone, compounds will have to be subjected to functional testing to determine whether they act as agonists, antagonists or inverse agonists.

For displacement experiments, cells expressing said OR5A2 polypeptide (generally 25,000 cells per assay or 1 to 100 μg of membrane extracts) are incubated in binding buffer (e.g., 50 mM Hepes pH 7.4; 1 mM CaCl2; 0.5% Bovine Serum Albumin (BSA) Fatty Acid-Free; and 0,5 mM MgCl 2) for 1.5 hrs (at, for example, 27° C.) with labeled musk compound in the presence or in the absence of increasing concentrations of a candidate modulator. To validate and calibrate the assay, control competition reactions using increasing concentrations of unlabeled musk can be performed. After incubation, cells are washed extensively, and bound, labeled musk compound is measured as appropriate for the given label (e.g., scintillation counting, enzyme assay, fluorescence, etc.). A decrease of at least 10% in the amount of labeled musk compound bound in the presence of the candidate modulator indicates displacement of binding by the candidate modulator. Candidate modulators are considered to bind specifically in this or other assays described herein if they displace 50% of the labeled musk compound. Alternatively, binding or displacement of binding can be monitored by surface plasmon resonance (SPR). Surface plasmon resonance assays can be used as a quantitative method to measure binding between two molecules by the change in mass near an immobilized sensor caused by the binding or loss of binding of musk compound from the aqueous phase to said OR5A2 polypeptide immobilized in a membrane on the sensor. This change in mass is measured as resonance units versus time after injection or removal of the musk or candidate modulator and is measured using a Biacore Biosensor (Biacore AB). OR5A2 polypeptides as defined herein can be immobilized on a sensor chip (for example, research grade CM5 chip; Biacore AB) in a thin film lipid membrane according to methods described by Salamon et al. (Salamon et al., 1996, Biophys J. 71: 283-294; Salamon et al., 2001, Biophys. J. 80: 1557-1567; Salamon et al., 1999, Trends Biochem. Sci. 24: 213-219, each of which is incorporated herein by reference.). Sarrio et al. demonstrated that SPR can be used to detect ligand binding to the GPCR A(1) adenosine receptor immobilized in a lipid layer on the chip (Sarrio et al., 2000, Mol. Cell. Biol. 20: 5164-5174, incorporated herein by reference). Conditions for musk binding to said OR5A2 in an SPR assay can be fine-tuned by one skilled in the art using the conditions reported by Sarrio et al. as a starting point. SPR can assay for modulators of binding in at least two ways. First, one or more musk compound(s) as defined herein can be pre-bound to immobilized OR5A2 polypeptide as defined herein, followed by injection of the candidate modulator at approximately 10 μl/min flow rate and a concentration ranging from 1 nM to 1000 μM. preferably about 100 μM. Displacement of the bound musk compound(s) can be quantified, permitting detection of modulator binding. Alternatively, the membrane-bound musk compound(s) can be pre-incubated with a candidate modulator and challenged with musk compound(s). A difference in musk binding to said OR5A2 exposed to the modulator relative to that on a chip not pre-exposed to the modulator will demonstrate binding. In either assay, a decrease of 10% or more in the amount of musk compound(s) bound in the presence of candidate modulator, relative to the amount of musk compound(s) bound in the absence of candidate modulator indicates that the candidate modulator inhibits the interaction of said OR5A2 and said musk compound(s). A Biacore system can be plugged to a system identifying candidate modulator such as mass spectrometry, or gas chromatography. Another method of measuring inhibition of binding of musk compounds as defined herein to the OR5A2 receptor as defined herein uses fluorescence resonance energy transfer (FRET). FRET is a quantum mechanical phenomenon that occurs between a fluorescence donor (D) and a fluorescence acceptor (A) in close proximity to each other (usually <100 A of separation) if the emission spectrum of D overlaps with the excitation spectrum of A. The molecules to be tested, e.g., one or more musk compound(s) and an OR5A2 polypeptide, are labeled with a complementary pair of donor and acceptor fluorophores. While close to each other due to the OR5A2/musk compound(s) interaction, fluorescence emitted upon excitation of the donor fluorophore will have a different wavelength from that emitted in response to the excitation wavelength when the molecules are not bound, thus allowing quantification of bound versus unbound polypeptides by measurement of emission intensity at each wavelength. Donor/acceptor pairs of fluorophores with which to label the target molecules are well known in the art.

A variation on FRET uses fluorescence quenching to monitor molecular interactions. One molecule in the interacting pair can be labeled with a fluorophore, and the other with a molecule that quenches the fluorescence of the fluorophore when brought into close apposition with it. A change in fluorescence upon excitation is indicative of a change in the association of the molecules tagged with the fluorophore: quencher pair. Generally, an increase in fluorescence of the labeled OR5A2 polypeptide is indicative that musk compound(s) bearing the quencher has been displaced. For quenching assays, a 10% or greater increase in the intensity of fluorescent emission in samples containing a candidate modulator, relative to samples without the candidate modulator, indicates that the candidate modulator inhibits OR5A2/musk compound(s) interaction.

Bioluminescence Resonance Energy Transfer (BRET) is a system for monitoring intermolecular interactions in vivo. The assay is based on non-radiative energy transfer between fusion proteins containing Renilla luciferase (Rluc) and e.g. Yellow Fluorescent Protein (YPF) or Green Fluorescent Protein (GFP). The BRET signal is generated by the oxidation of a coelenterazine derivative substrate. Said system may apply a cell-permeable and non-toxic coelenterazine derivative substrate DeepBlueCTM (DBC) and a mutant of the Green Fluorescent Protein (GFP) as acceptor. When the donor and acceptor are in close proximity the energy resulting from the catalytic degradation of the DBC is transferred from Rluc to GFP which will then emit fluorescence at its characteristic wavelength. This method allows higher distance between the two tested molecules and is fluorophore-angle independent.

In addition to the surface plasmon resonance, FRET and BRET methods, fluorescence polarization measurement is useful for quantification of musk/receptor binding. The fluorescence polarization value for a fluorescently-tagged molecule depends on the rotational correlation time or tumbling rate. Protein complexes, such as those formed by an OR5A2 associating with one or more fluorescently labeled musk compound(s), have higher polarization values than uncomplexed, labeled musk compound(s). The inclusion of a candidate modulator of the OR5A2/musk compound(s) interaction results in an increase (activator) or a decrease (inhibitor) in fluorescence polarization, relative to a mixture without the candidate modulator, e.g. if the candidate inhibitor disrupts or inhibits the interaction of the OR5A2 with the musk compound(s). Fluorescence polarization is well suited for the identification of small molecules that disrupt the formation of polypeptide or protein complexes. A modulation of 10% or more in fluorescence polarization in samples containing a candidate modulator, relative to fluorescence polarization in a sample lacking the candidate modulator, indicates that the candidate modulator modulates the OR5A2/musk compound(s) interaction.

Another alternative for monitoring OR5A2/musk compound(s) interactions uses a biosensor assay. ICS biosensors have been described by AMBRI (Australian Membrane Biotechnology Research Institute; ambri.com.au). In this technology, the association of molecules such as an OR and a musk compound, is coupled to the closing of gramacidin-facilitated ion channels in suspended membrane bilayers and thus to a measurable change in the admittance (similar to impedance) of the biosensor. This approach is linear over six orders of magnitude of admittance change and is ideally suited for large scale, high throughput screening of small molecule combinatorial libraries. A 10% or greater change (increase or decrease) in admittance in a sample containing a candidate modulator, relative to the admittance of a sample lacking the candidate modulator, indicates that the candidate modulator impacts the interaction of OR5A2 and musk compound(s).

It is important to note that in assays of acid-protein interaction, it is possible that a modulator of the interaction need not necessarily interact directly with the domain(s) of the proteins that physically interact. It is also possible that a modulator will interact at a location removed from the site of acid-protein interaction and cause, for example, a conformational change in the OR5A2 polypeptides. Modulators (inhibitors or agonists) that act in this manner are nonetheless of interest as agents to modulate the activity of OR5A2.

Any of the binding assays described can be used to determine the presence of an agent in a sample, e.g., a tissue sample, that binds to the OR5A2 polypeptide as defined herein, or that affects the binding of one or more musk compound(s) to said OR5A2. To do so, OR5A2 polypeptides are reacted with one or more musk compound(s) or another ligand in the presence or in the absence of the sample, and said musk compound(s) or ligand binding is measured as appropriate for the binding assay being used. A modulation of 10% or more in the binding of said musk compound(s) or other ligand indicates that the sample contains an agent that modulates musk compound or ligand binding to OR5A2 polypeptides.

Proteins Chips

The methods as defined herein may be applied on protein chips. Said protein chip may be, but is not limited to, a glass slide or a nitrocellulose membrane. Array-based methods for protein chips are well known in the art. The protein arrays preferably comprise one or more OR5A2 polypeptides as defined herein or fragments thereof that are responsible for the binding with musk compound such as the TM 2 to 7 central region of said OR polypeptide. The protein chip preferably comprises all variant OR5A2 polypeptides or chimeric polypeptides as defined herein, or fragments thereof that are responsible for the binding with musk compound(s).

Functional Assays of Receptor Activity

A non-exhaustive list of functional assays is detailed in this section:

i. GTPase/GTP Binding Assays:

For GPCRs such as OR polypeptides, a measure of receptor activity is the binding of GTP by cell membranes containing receptors. In the method described by Traynor and Nahorski, 1995, Mol. Pharmacol. 47: 848-854, incorporated herein by reference, one essentially measures G-protein coupling to membranes by measuring the binding of labeled GTP to the membrane. For GTP binding assays, membranes isolated from cells expressing the receptor are incubated in a buffer generally containing 20 mM HEPES, pH 7.4, 100 mM NaCl, and 10 mM MgCl2, 80 pM 35S-GTP⊐S and 3 µM GDP. The assay mixture is incubated for a period of time at a given temperature, for example 60 minutes at 30° C., after which unbound labeled GTP is removed by filtration onto GF/B filters. Bound, labeled GTP is measured by liquid scintillation counting. In order to assay for modulation of musk compound-induced OR5A2 activity, membranes prepared from cells expressing an OR5A2 polypeptide as defined herein are mixed with one or more musk compound(s) as defied herein, and the GTP binding assay is performed in the presence and in the absence of a candidate modulator of OR5A2 activity. A modulation of 10% or more in labeled GTP binding as measured by scintillation counting in an assay of this kind containing the candidate modulator, relative to an assay without the modulator, indicates that the candidate modulator inhibits or activates OR5A2 activity.

A similar GTP-binding assay can be performed without the musk compound(s) to identify compounds that act as agonists. In this case, the musk-compound-stimulated GTP binding is used as a standard. A compound is considered an agonist if it induces at least 50% of the level of GTP binding induced by the musk compound(s) when the compound(s)

is(are) present at 1 mM or less, and preferably will induce a level the same as or higher than that induced by the musk compound(s).

GTPase activity is measured by incubating the membranes containing an OR polypeptide with gamma-32P-GTP. Active GTPase will release the label as inorganic phosphate, which is detected by separation of free inorganic phosphate in a 5% suspension of activated charcoal in 20 mM $H_3PO_4$, followed by scintillation counting. Controls include assays using membranes isolated from cells not expressing OR (mock-transfected), in order to exclude possible non-specific effects of the candidate compound.

In order to assay for the effect of a candidate modulator on OR5A2-regulated GTPase activity, membrane samples are incubated with one or more musk compound(s) as defied herein, with and without the modulator, followed by the GTPase assay. A change (increase or decrease) of 10% or more in the level of GTP binding or GTPase activity relative to samples without modulator is indicative of musk compound modulation by a candidate modulator.

ii. Downstream Pathway Activation Assays:

a. Calcium flux—The Aequorin-based Assay.

The aequorin assay takes advantage of the responsiveness of mitochondrial or cytoplasmic apoaequorin to intracellular calcium release or calcium flux (entrance) induced by the activation of GPCRs (Stables et al., 1997, Anal. Biochem. 252:115-126; Detheux et al., 2000, J. Exp. Med., 192 1501-1508; both of which are incorporated herein by reference). Briefly, OR-expressing clones are transfected to coexpress mitochondrial or cytoplasmic apoaequorin and G-alpha-16 or G-olf. Cells are incubated with 5 μM Coelenterazine H or derivates (Molecular Probes) for 4 hours at room temperature, washed in DMEM-F12 culture medium and resuspended at a concentration of $0.5 \times 10^6$ cells/ml. Cells are then mixed with test agonist peptides and light emission by the aequorin is recorded with a luminometer for 30 sec. Results are expressed as Relative Light Units (RLU). Controls include assays using membranes isolated from cells not expressing C356 (mock-transfected), in order to exclude possible non-specific effects of the candidate compound.

Aequorin activity or intracellular calcium levels are "changed" if light intensity increases or decreases by 10% or more in a sample of cells, expressing an OR polypeptide and treated with a candidate modulator, relative to a sample of cells expressing the OR polypeptide but not treated with the candidate modulator or relative to a sample of cells not expressing the OR polypeptide (mock-transfected cells) but treated with the candidate modulator. When performed in the absence of a musk compound as defined herein, the assay can be used to identify an agonist or inverse agonist of OR5A2 activity. When the assay is performed in the presence of a musk compound as defined herein, it can be used to assay for an enhancer of OR5A2 activity.

1) a Fluo3, Fluo4, Fura2, Calcium3 or Calcium6 based-assay.

Fluorescence-based assays take advantage of calcium fluxes triggered by receptor activation: either calcium entrance through CNG for instance or calcium release from endoplasmic reticulum. Some fluorophores including but not limited to Fluo3, Fluo4 and Fura2 (Molecular Probes) and Calcum3 or Calcium6 kit series (Molecular Device) are known to bind calcium. Such fluorophore-calcium complexes emit fluorescence at specific wavelengths. Thereby, upon activation of a G-protein coupled receptor, calcium released from endoplasmic reticulum or entered through CNG binds to fluorophore leading to specific fluorescence emission. OR-overexpressing cells are incubated for 30 to 60 minutes with a solution of 1 to 8 μM fluorophore at 37° C. After thorough washing with saline buffer, 50 μl of the same buffer is poured into each well containing cells (6 to 1536). Tested agonists are then injected into such loaded cells and activation of an OR is followed by fluorescence measurement.

Intracellular calcium levels are "changed" if fluorescence intensity increases or decreases by 10% or more in a sample of cells, expressing an OR5A2 polypeptide as defined herein and treated with a candidate modulator, relative to a sample of cells expressing an OR5A2 polypeptide but not treated with the candidate modulator or relative to a sample of cells not expressing an OR5A2 polypeptide (mock-transfected cells) but treated with the candidate modulator.

2) Depolarization/hyperpolarization membrane assay (DiBac fluorophore for instance).

The principle of this assay is to follow depolarization of the cell membrane. The anionic probe DiBAC4(3) partitions between intra-and extracellular compartments in a membrane potential-dependent manner. With increasing membrane potential (depolarization), the probe further partitions into the cell resulting in an increase of fluorescence. Conversely, hyperpolarization leads to a decrease of fluorescence due to dye extrusion. The DiBAC4(3) probe is excited with a wavelength of 488 nm, and emits at a wavelength of 540 nm. On the day of the experiment, add the glucose to the assay buffer (saline buffer) to a final concentration of 10 mM and the DiBAC4(3) probe to a final concentration of 5 μM. Maintain the assay buffer at 37° C. Remove the cell culture medium and rinse twice each well containing OR-overexpressing cells with 200 μl of pre-heated assay buffer. Place 180 μl of Assay buffer containing DiBAC4(3) and incubate the cells for 30 min at the appropriate temperature. Cell plates will be ready for assay after these 30 mins. incubation. Collect baseline for 2 mins. prior any addition. Add 20 μl of candidate modulators to the appropriate well and collect the data for an additional 25 mins.

Membrane polarization is "changed" if fluorescence intensity increases or decreases by 10% or more in a sample of cells, expressing an OR5A2 polypeptide as defined herein and treated with a candidate modulator, relative to a sample of cells expressing an OR5A2 polypeptide but not treated with the candidate modulator or relative to a sample of cells not expressing an OR5A2 polypeptide (mock-transfected cells) but treated with the candidate modulator.

3) Melanophore assay. The melanophore assay is a color-based assay. Basically cells used for this assay are derived from skin of the frog Xenopus Laevis. These immortalized cells contain melanosomes, which are organelles containing dark pigment. Activation of endogenous or recombinant GPCR that trigger activation of adenylate cyclase or phospholipase C lead to melanosome dispersion and therefore cell darkening. Alternatively, a GPCR that inhibits adenylate cyclase or phospholipase C leads to cell lightening. Thereby, instead of measuring concentrations of second messenger, one can easily pinpoint hit observing cell coloration change. This color change can easily be quantified on a microplate reader measuring absorbance at 650 nM or by examination on a video imaging system.

b. Adenylate Cyclase Assay:

Assays for adenylate cyclase activity are described by Kenimer & Nirenberg, 1981, Mol. Pharmacol. 20: 585-591, incorporated herein by reference. That assay is a modification of the assay taught by Solomon et al., 1974, Anal. Biochem. 58: 541-548, also incorporated herein by reference. Briefly, 100 μl reactions contain 50 mM Tris-Hcl (pH 7.5), 5 mM MgC12, 20 mM creatine phosphate (disodium salt), 10 units (71 µg of protein) of creatine phosphokinase, 1 mM ⊐-32P-ATP (tetrasodium salt, 2 µCi), 0.5 mM cyclic AMP, G-3H-labeled cyclic AMP (approximately 10,000 cpm), 0.5 mM Ro20-1724, 0.25% ethanol, and 50-200 µg of protein homogenate to be tested (i.e., homogenate from cells expressing or not expressing an OR polypeptide, treated or not treated with carboxylic acid with or without a candidate modulator). Reaction mixtures are generally incubated at 37° C. for 6 minutes. Following incubation, reaction mixtures are deproteinized by the addition of 0.9 ml of cold 6% trichloroacetic acid. Tubes are centrifuged at 1800×g for 20 minutes and each supernatant solution is added to a Dowex AG50W-X4 column. The cAMP fraction from the column is eluted with 4 ml of 0.1 mM imidazole-HCl (pH 7.5) into a counting vial. Assays should be performed in triplicate. Control reactions should also be performed using protein homogenate from cells that do not express an OR polypeptide.

Assays should be performed using cells or extracts of cells expressing an OR5A2 polypeptide as defined herein, treated or not treated with one or more musk compound(s) as defined herein with or without a candidate modulator. Control reactions should be performed using mock-transfected cells, or extracts from them in order to exclude possible non-specific effects of some candidate modulators.

According to the invention. adenylate cyclase activity is "changed" if it increases or decreases by 10% or more in a sample taken from cells treated with a candidate modulator of OR5A2 activity, relative to a similar sample of cells not treated with the candidate modulator or relative to a sample of cells not expressing an OR5A2 polypeptide (mock-transfected cells) but treated with the candidate modulator. Alternatively, a decrease of activity by 10% or more by the candidate modulator of OR5A2 polypeptides in a sample treated with a reference compound may be tested.

c. cAMP Assay:

Intracellular cAMP is measured using a cAMP radioimmunoassay (RIA) or cAMP binding protein according to methods widely known in the art. For example, Horton & Baxendale, 1995, Methods Mol. Biol. 41: 91-105, which is incorporated herein by reference, describes an RIA for cAMP.

A number of kits for the measurement of cAMP are commercially available, such as the High Efficiency Fluorescence Polarization-based homogeneous assay marketed by LJL Biosystems and NEN Life Science Products. Control reactions should be performed using extracts of mock-transfected cells to exclude possible non-specific effects of some candidate modulators.

Assays should be performed using cells or extracts of cells expressing an OR5A2 polypeptide as defined herein, treated or not treated with a musk compound with or without a candidate modulator. Control reactions should be performed using mock-transfected cells, or extracts from them in order to exclude possible non-specific effects of some candidate modulators The level of CAMP is "changed" if the level of cAMP detected in cells, expressing an OR5A2 polypeptide as defined herein and treated with a candidate modulator of OR5A2 activity (or in extracts of such cells), using the RIA-based assay of Horton & Baxendale, 1995, supra, increases or decreases by at least 10% relative to the cAMP level in similar cells not treated with the candidate modulator.

d. Phospholipid breakdown, DAG production and Inositol Triphosphate levels:

Receptors that activate the breakdown of phospholipids can be monitored for changes due to the activity of known or suspected modulators of an OR by monitoring phospholipid breakdown, and the resulting production of second messengers DAG and/or inositol triphosphate (IP3). Methods of measuring each of these are described in Phospholipid Signaling Protocols, edited by Ian M. Bird. Totowa, NJ, Humana Press, 1998, which is incorporated herein by reference. See also Rudolph et al., 1999, J. Biol. Chem. 274: 11824-11831, incorporated herein by reference, which also describes an assay for phosphatidylinositol breakdown. Assays should be performed using cells or extracts of cells expressing an OR5A2 polypeptide as defined herein, treated or not treated with one or more musk compound(s) as defined herein with or without a candidate modulator. Control reactions should be performed using mock-transfected cells, or extracts from them in order to exclude possible non-specific effects of some candidate modulators.

According to the invention, phosphatidylinositol breakdown, and diacylglycerol and/or inositol triphosphate levels are "changed" if they increase or decrease by at least 10% in a sample from cells expressing an OR5A2 polypeptide and treated with a candidate modulator in the presence or in the absence of one or more musk compound(s), relative to the level observed in a sample from cells expressing a carboxylic polypeptide that is not treated with the candidate modulator.

e. PKC activation assays:

Growth factor receptor tyrosine kinases tend to signal via a pathway involving activation of Protein Kinase C (PKC), which is a family of phospholipid-and calcium-activated protein kinases. PKC activation ultimately results in the transcription of an array of proto-oncogene transcription factor-encoding genes, including c-fos, c-myc and c-jun, proteases, protease inhibitors, including collagenase type I and plasminogen activator inhibitor, and adhesion molecules, including intracellular adhesion molecule I (ICAM I). Assays designed to detect increases in gene products induced by PKC can be used to monitor PKC activation and thereby receptor activity. In addition, activity of receptors that signal via PKC can be monitored through the use of reporter gene constructs driven by the control sequences of genes activated by PKC activation. This type of reporter gene-based assay is discussed in more detail below.

For a more direct measure of PKC activity, the method of Kikkawa et al., 1982, J. Biol. Chem. 257: 13341, incorporated herein by reference, can be used. This assay measures phosphorylation of a PKC substrate peptide, which is subsequently separated by binding to phosphocellulose paper. This PKC assay system can be used to measure activity of purified kinase, or the activity in crude cellular extracts. Protein kinase C sample can be diluted in 20 mM HEPES/2 mM DTT immediately prior to assay.

The substrate for the assay is the peptide Ac-FKKSFKL-NH2 (SEQ ID N°5), derived from the myristoylated alanine-rich protein kinase C substrate protein (MARCKS). The Km of the enzyme for this peptide is approximately 50 µM. Other basic, protein kinase C-selective peptides known in the art can also be used, at a concentration of at least 2-3 times their Km. Cofactors required for the assay include calcium, magnesium, ATP, phosphatidylserine and diacylglycerol. Depending upon the intent of the user, the assay can be performed to determine the amount of PKC present (activating conditions) or the amount of active PCK present (non-activating conditions). For most purposes according to the invention, non-activating conditions will be used, such that the PKC that is active in the sample when it is isolated is measured, rather than measuring the PKC that can be activated. For non-activating conditions, calcium is omitted in the assay in favor of EGTA.

The assay is performed in a mixture containing 20 mM HEPES, pH 7.4, 1-2 mM DTT, 5 mM MgC12, 100 µM ATP, ~1 µCi ⁻ -32P-ATP, 100 µg/ml peptide substrate (~100 µM), 140 µM/3.8 µM phosphatidylserine/diacylglycerol membranes, and 100 µM calcium (or most preferably 500 µM EGTA). 48 µl of sample, diluted in 20 mM HEPES, pH 7.4, 2 mM DTT is used in a final reaction volume of 80 µl. Reactions are performed at 30° C. for 5-10 minutes, followed by addition of 25 µl of a solution containing 100 mM ATP and 100 mM EDTA with a pH value of 8.0, which stops the reactions.

After the reaction is stopped, a portion (85 µl) of each reaction is spotted onto a Whatman P81 cellulose phosphate filter, followed by washes: four times 500 ml of 0.4% phosphoric acid, (5-10 min. per wash); and a final wash in 500 ml 95% EtOH, for 2-5 min. Bound radioactivity is measured by scintillation counting. Specific activity (cpm/nmol) of the labeled ATP is determined by spotting a sample of the reaction onto P81 paper and counting without washing. Units of PKC activity, defined as nmol phosphate transferred per min, are calculated as follows:

The activity, in UNITS (nmol/min) is:

$$= \frac{(\text{cpm on paper}) \times (105 \ \mu l \text{ total}/85 \ \mu l \text{ spotted})}{(\text{assay time, min})(\text{specific activity of } ATP \text{ cpm/nmol})}.$$

An alternative assay can be performed using a Protein Kinase C Assay Kit sold by Pan Vera (Cat. #P2747). Assays are performed on extracts from cells expressing an OR5A2 polypeptide as defined herein, treated or not treated with one or more musk compound(s) as defined herein with or without a candidate modulator. Control reactions should be performed using mock-transfected cells, or extracts from them in order to exclude possible non-specific effects of some candidate modulators.

According to the invention, PKC activity is "changed" by a candidate modulator when the units of PKC measured by either assay described above increase or decrease by at least 10%, in extracts from cells expressing an OR5A2 polypeptide and treated with a candidate modulator, relative to a reaction performed on a similar sample from cells not treated with a candidate modulator.

f. PKA activation assays

PKA activity can be assayed using any of several kits available commercially, for example from molecular device IMAP PKA assay kit, or from promega ProFluor PKA assay kit.

Assays should be performed using cells or extracts of cells expressing an OR5A2 polypeptide as defined herein, treated or not treated with one or more musk compound(s) as defined herein with or without a candidate modulator. Control reactions should be performed using mock-transfected cells, or extracts from them in order to exclude possible non-specific effects of some candidate modulators PKA activity is "changed" if the level of activity is increased or decreased by 10% or more in a sample from cells. expressing an OR polypeptide, treated with a candidate modulator relative to PKA kinase activity in a sample from similar cells not treated with the candidate modulator.

g. Kinase assays:

MAP kinase activity can be assayed using any of several kits available commercially, for example, the p38 MAP Kinase assay kit sold by New England Biolabs (Cat #9820) or the FlashPlate™ MAP Kinase assays sold by Perkin-Elmer Life Sciences.

Assays should be performed using cells or extracts of cells expressing an OR5A2 polypeptide as defined herein, treated or not treated with one or more musk compound(s) as defined herein with or without a candidate modulator. Control reactions should be performed using mock-transfected cells, or extracts from them in order to exclude possible non-specific effects of some candidate modulators MAP Kinase activity is "changed" if the level of activity is increased or decreased by 10% or more in a sample from cells, expressing an OR5A2 polypeptide as defined herein, treated with a candidate modulator relative to MAP kinase activity in a sample from similar cells not treated with the candidate modulator.

Direct assays for tyrosine kinase activity using known synthetic or natural tyrosine kinase substrates and labeled phosphate are well known, as are similar assays for other types of kinases (e.g., Ser/Thr kinases). Kinase assays can be performed with both purified kinases and crude extracts prepared from cells expressing an OR5A2 polypeptide as defined herein, treated with or without a musk compound, with or without a candidate modulator. Control reactions should be performed using mock-transfected cells, or extracts from them in order to exclude possible non-specific effects of some candidate modulators. Substrates can be either full length protein or synthetic peptides representing the substrate. Pinna & Ruzzene (1996, Biochem. Biophys. Acta 1314: 191-225, incorporated herein by reference) list a number of phosphorylation substrate sites useful for measuring kinase activities. A number of kinase substrate peptides are commercially available. One that is particularly useful is the "Src-related peptide." (RRLIEDAEYAARG (SEQ ID N°6); available from Sigma #A7433), which is a substrate for many receptor and nonreceptor tyrosine kinases. Because the assay described below requires binding of peptide substrates to filters, the peptide substrates should have a net positive charge to facilitate binding. Generally, peptide substrates should have at least 2 basic residues and a free amino terminus. Reactions generally use a peptide concentration of 0.7-1.5 mM.

Assays are generally carried out in a 25 µl volume comprising 5 µl of 5× kinase buffer (5 mg/mL BSA, 150 mM Tris-Cl (pH 7.5), 100 mM MgC12; depending upon the exact kinase assayed for, $MnCl_2$ can be used in place of or in addition to the $MgCl_2$), 5 µl of 1.0 mM ATP (0.2 mM final concentration), gamma-32P-ATP (100-500 cpm/pmol), 3 µl of 10 mM peptide substrate (1.2 mM final concentration), cell extract containing kinase to be tested (cell extracts used for kinase assays should contain a phosphatase inhibitor (e.g. 0.1-1 mM sodium orthovanadate)), and $H_2O$ to 25 µl. Reactions are performed at 30° C., and are initiated by the addition of the cell extract.

Kinase reactions are performed for 30 seconds to about 30 minutes, followed by the addition of 45 µl of ice-cold 10% trichloroacetic acid (TCA). Samples are spinned for 2 minutes in a microcentrifuge, and 35 µl of the supernatant is spotted onto Whatman P81 cellulose phosphate filter circles. The filters are washed three times with 500 ml cold 0.5% phosphoric acid, followed by one wash with 200 ml of acetone at room temperature for 5 minutes. Filters are dried and incorporated $^{32}P$ is measured by scintillation counting. The specific activity of ATP in the kinase reaction (e.g., in cpm/pmol) is determined by spotting a small sample (2-5 µl) of the reaction onto a P81 filter circle and counting directly, without washing. Counts per minute obtained in the kinase reaction (minus blank) are then divided by the specific activity to determine the moles of phosphate transferred in the reaction. Assays should be performed using cells or extracts of cells expressing an OR5A2 polypeptide as defined herein, treated or not treated with a musk compound with or without a candidate modulator. Control reactions should be performed using mock-transfected cells, or extracts from them in order to exclude possible non-specific effects of some candidate modulators.

Tyrosine kinase activity is "changed" if the level of kinase activity is increased or decreased by 10% or more in a sample from cells, expressing an OR5A2 polypeptide, treated with a candidate modulator relative to kinase activity in a sample from similar cells not treated with the candidate modulator.

h. Transcriptional reporters for downstream pathway activation:

The intracellular signal initiated by binding of a modulator to a receptor, e.g., the OR5A2 polypeptide as defined herein, sets in motion a cascade of intracellular events, the ultimate consequence of which is a rapid and detectable change in the transcription and/or translation of one or more genes. The activity of the receptor can therefore be monitored by measuring the expression of a reporter gene driven by control sequences responsive to OR5A2 activation.

As used herein "promoter" refers to the transcriptional control elements necessary for receptor-mediated regulation of gene expression, including not only the basal promoter, but also any enhancers or transcription-factor binding sites necessary for receptor-regulated expression. By selecting promoters that are responsive to the intracellular signals resulting from agonist binding, and operatively linking the selected promoters to reporter genes whose transcription, translation or ultimate activity is readily detectable and measurable, the transcription based reporter assay provides a rapid indication of whether a given receptor is activated.

Reporter genes such as luciferase, Chloramphenicol Acetyl Transferase (CAT), Green Fluorescent Protein (GFP), beta-lactamase or beta-galactosidase are well known in the art, as are assays for the detection of their products. Genes particularly well suited for monitoring receptor activity are the "immediate early" genes. which are rapidly induced, generally within minutes of contact between the receptor and the effector protein or ligand. The induction of immediate early gene transcription does not require the synthesis of new regulatory proteins. In addition to rapid responsiveness to ligand binding, characteristics of preferred genes useful to make reporter constructs include: low or undetectable expression in quiescent cells; induction that is transient and independent of new protein synthesis; subsequent shut-off of transcription requires new protein synthesis; and mRNAs transcribed from these genes have a short half-life. It is preferred, but not necessary that a transcriptional control element have all of these properties for it to be useful.

In order to assay OR5A2 activity with a musk-responsive transcriptional reporter construct, cells that stably express an OR5A2 polypeptide as defined herein are stably transfected with the reporter construct. To screen for agonists, untreated cells are exposed to candidate modulators, or exposed to one or more musk compound(s) as defined herein, and expression of the reporter is measured. The musk compound-treated cultures serve as a standard for the level of transcription induced by a known agonist. An increase of at least 10% in reporter expression in the presence of a candidate modulator compared to reporter expression in the absence of any modulator indicates that the candidate is a modulator of OR5A2 activity. An agonist will induce at least as much, and preferably the same amount or more reporter expression than the musk compound(s). Partial agonists may activate the receptor less compared to the musk. This approach can also be used to screen for inverse agonists where cells express an OR5A2 polypeptide as defined herein at levels such that there is an elevated basal activity of the reporter in the absence of musk compound(s) or other agonists. A decrease in reporter activity of 10% or more in the presence of a candidate modulator, relative to its absence, indicates that the compound is an inverse agonist.

To screen for an enhancer, the cells expressing an OR5A2 polypeptide as defined herein and carrying the reporter construct are exposed to one or more musk compound(s) (or another agonist) in the presence and absence of a candidate modulator. An increase of 10% or more in reporter expression in the presence of candidate modulator, relative to the absence of the candidate modulator, indicates that the candidate is an enhancer of OR5A2 activity. Controls for transcription assays include cells not expressing an OR5A2 polypeptide as defined herein but carrying the reporter construct, as well as cells with a promoter less reporter construct. Compounds that are identified as modulators of OR5A2-regulated transcription should also be analyzed to determine whether they affect transcription driven by other regulatory sequences and by other receptors, in order to determine the specificity and spectrum of their activity.

The transcriptional reporter assay, and most cell-based assays, are well suited for screening chemical libraries of chemical compounds for those that modulate OR5A2 activity. The libraries can be, for example, libraries from natural sources, e.g., plants, animals, bacteria, etc.

Candidate Modulators Useful According to the Invention

Candidate modulators can be screened from large libraries of synthetic or natural compounds. Numerous means are currently used for random and directed synthesis of various kinds of compounds. Synthetic compound libraries are commercially available from a number of companies including, for example, Maybridge Chemical Co. (Trevillet, Cornwall, UK), Comgenex (Princeton, NJ), Brandon Associates (Merrimack, NH), and Microsource (New Milford, CT). A rare chemical library is available from Aldrich (Milwaukee, WI). Combinatorial libraries of small organic molecules are available and can be prepared. Alternatively, libraries of natural compounds in the form of bacterial, fungal, plant and animal extracts are available from e.g., Pan Laboratories (Bothell, WA) or MycoSearch (NC), or are readily produceable by methods well known in the art. Additionally, natural and synthetically produced libraries and compounds are readily modified through conventional chemical, physical, and biochemical means.

EXAMPLES

Experimental Procedures

Cell Culture and Cell Line Generation

HEK293T-RTP1A1/RTP2 cells were maintained in minimal essential medium (EMEM, Lonza) containing 10% fetal bovine serum (M10). These cells were generated by transfecting HEK293T with an expression vector containing the sequences of the chaperone proteins RTP1A1 and RTP2 and a resistance gene to puromycin, using Lipofectamine 2000. The recombinant cell population, used in these experiments, was selected by adding 10 µg/ml of puromycin into the culture medium and subsequently subcloned (WO 2014/191047 A1).

Odorant Molecule Dilution

Odorant molecules were diluted at a concentration of 1 mole/liter (M) into dimethyl sulfoxide (DMSO) to generate stock solutions.

For screening experiments, stock solutions of odorant molecules were diluted in EMEM disposed in 96-well plates. Plates containing the tested compounds (1 compound/well) at a concentration of 2 mM, at a concentration of 632 µM and at a concentration of 200 µM were prepared.

For concentration-response analysis, serial dilutions of the tested molecules were prepared from stock solutions in EMEM plated into 96-well plates.

Luciferase Assay

For the initial deorphanisation screening and dose-response analysis, a Luciferase-based gene reporter assay (Promega, Leiden, The Nederlands) was used. Briefly, cells were platted on Poly-D-lysine-coated 96-well and transfected with a plasmid containing the CRE-luciferase and a plasmid containing the olfactory receptor. Sixteen hours after transfection, the culture medium was replaced by serum-free EMEM containing the tested compounds at a determined concentration. After four hours of incubation at 37° C. degree, cells were lysed and processed for luminescence measurement. Luminescene emission was recorded. Results were expressed as luciferase activity (Relative Fluorescence Unit (RLU)) or as percentage of the response induced by 10 µM of the adenylate cyclase activator Forskolin. An empty plasmid is used as negative control.

Example 1: Screening of Odorant Molecule Libraries

Odorant compound libraries containing musks and other types of compounds were used to identify activators of the OR of the invention. The deorphanisation campaign was performed on OR of the invention with a series of 891 odorant compounds. Musks from the four structurally different groups were included in the 891 tested odorants (Table1).

Each compound was tested at 3 different concentrations (1 mM, 316 µM, 100 µM). The different compounds of the tested libraries were disposed at the same concentration into 96 well plates (1 molecule/well) containing cells expressing the OR of the invention. The activity of the tested compounds was measured using the luciferase activity as explained above. The median luciferase activity induced by the tested compounds and the associated standard deviation were determined. Putatively active compounds (hits) were defined as compounds inducing a luciferase activity higher or equal to the median +2 standard deviations.

Figure 5:
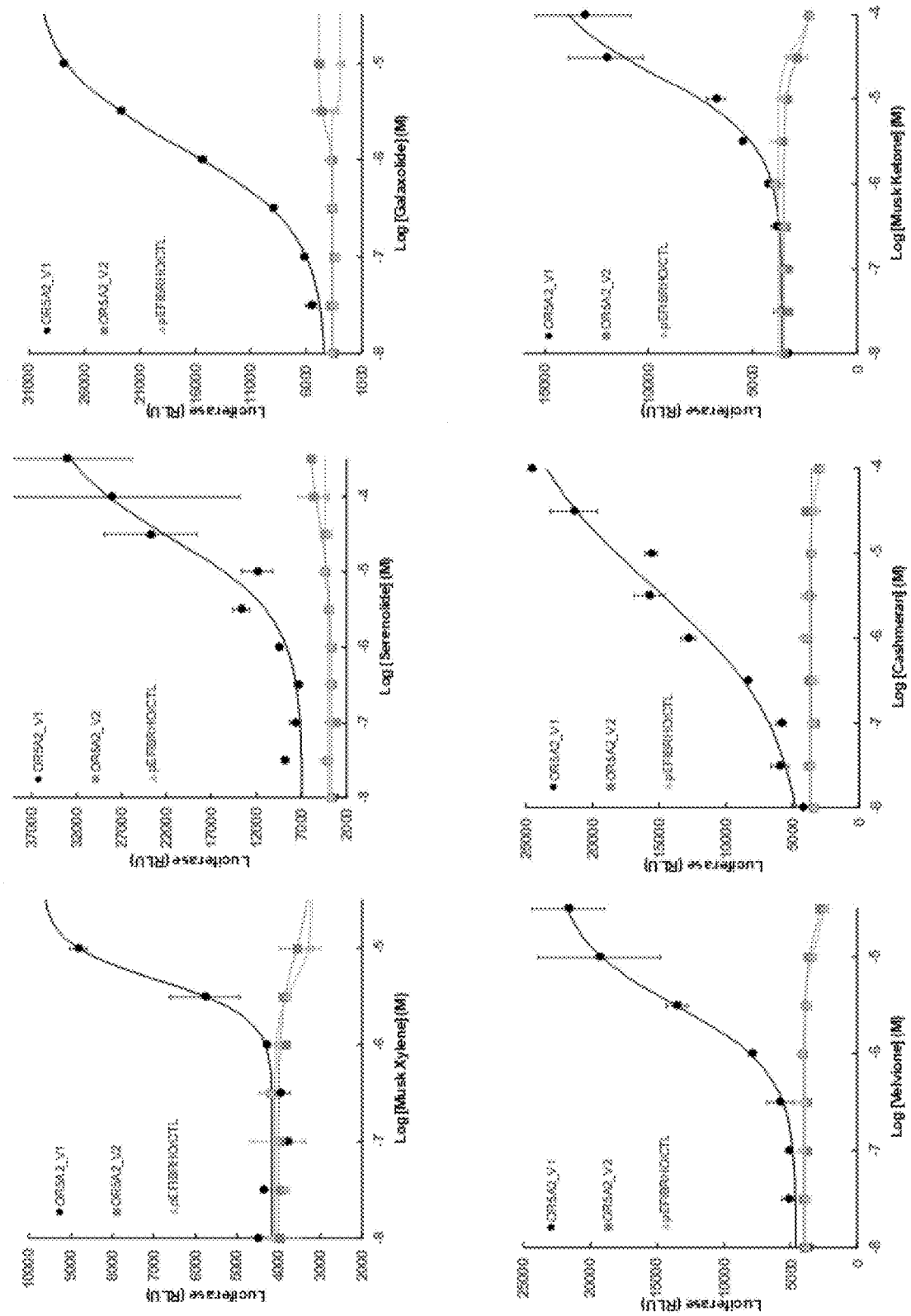
FIG. 5: Concentration-response analysis of the OR of the invention (i.e. OR5A2 variant_1), OR5A2 variant_2, and empty vector pEFIBRHO with different activators corresponding to 6 different musks representative of the four structurally diverse groups of musk (Musk Xylene, Serenolide, Galaxolide®, Velvione, Cashmeran, Musk Ketone). Only OR5A2 variant_1 shows dose response curves to the different musk tested.

In these experimental conditions, the tested OR (corresponding to the OR of the invention, namely: OR5A2, in particular OR5A2_variant 1) was therefore found to respond specifically and exclusively to different musks: serenolide, ethylene brassylate and malaxone. Table 1 summarizes the complete list of odorant compounds tested for the deorphanization of the OR of the invention. The results clearly show that, among the 891 tested compounds, the OR of the invention is only activated by macrocyclic musks, polycyclic musks, nitromusks and linear musks. This result is all the more surprising since OR5A2 was previously excluded as a musk-specific receptor by 2 different publications (Shirasu et al. 2014 *Neuron* 81, 165-78; FIG. 5F supplemental, Sato-Akuhara N et al. 2016 *J Neurosci.* 36(16), 4482-91).

Example 2: Concentration-Response Analyses of Musk Ligand-OR Interactions

Figure 1B:
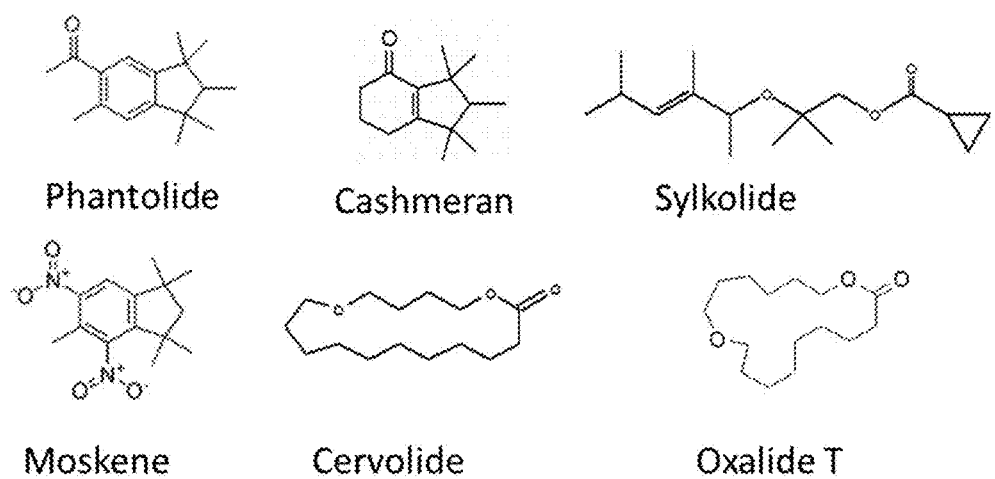
FIG. 1B. Structure of the different musk used in the concentration-response analysis (FIG. 1A).
Figure 2A:
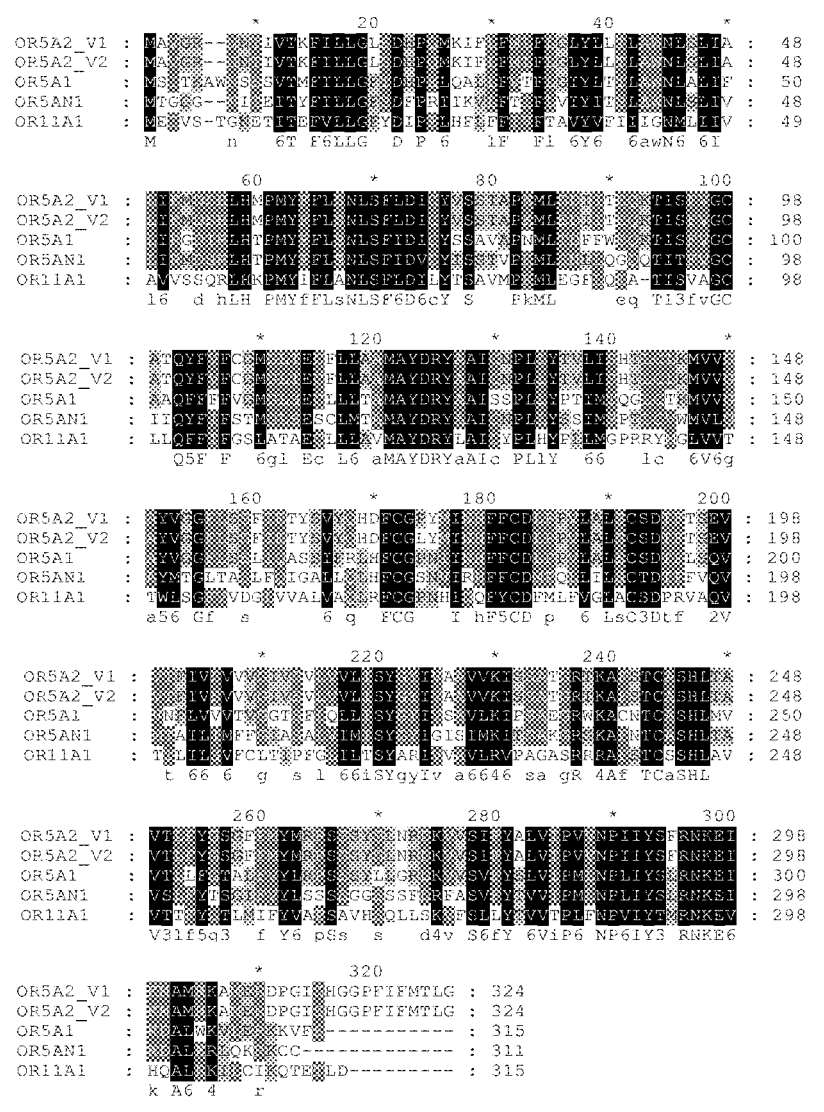

In order to validate the aforementioned hits, concentration-response analyses using the luciferase-based reporter assay were achieved using semi-logarithmic serial dilutions of hit molecules, from 1 mM to 316 nM, on OR5A2_variant 1. In these analyses we also included ORs previously described as musk-specific receptors OR5AN1 (SEQ ID n° 7) (WO 2015/020158 A1, Shirasu et al. 2014 Neuron 81, 165-78, Sato-Akuhara N et al. 2016 J Neurosci. 36(16), 4482-91) and OR11A1 (SEQ ID n° 8) (WO 2016/201152 A1). By phylogenic analysis, we found that the most similar OR gene to OR5A2 was OR5A1 (SEQ ID n° 9) with 71% nucleic acid identity and 67% amino acid identity (FIGS. 2A-B). Therefore, OR5A1 was included in the analyses. 35 musk compounds from the four structurally different chemical groups previously described were tested in concentration-response analyses (Table 2). In each experiment, an empty vector was used as negative control (pEFIBRHO). Representative concentration-response curves using musk compounds are given in FIG. 1A. FIG. 1B shows their structures. Full results including the calculated EC50 are given in Table 2; "non active" represent negative experiments, no activation after testing.

Figure 7A:
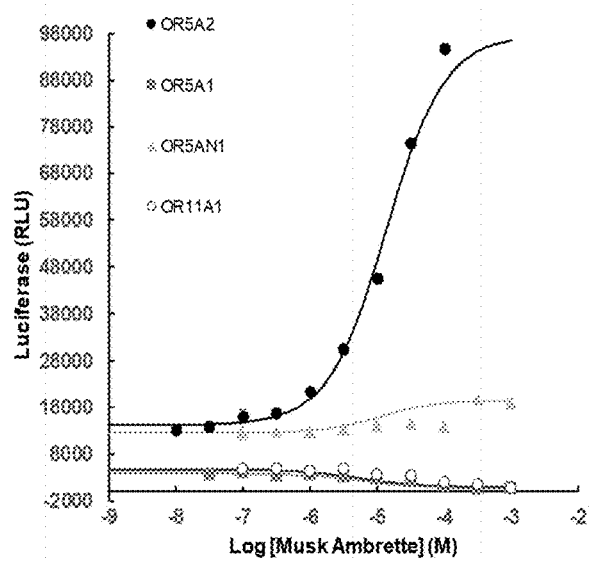
FIGS. 7A-B: Dose response curves of Musk Ambrette (FIG. 7A) and Moskene (FIG. 7B) on receptors OR5A2, OR5A1, OR5AN1, and OR11A1.
Figure 7B:
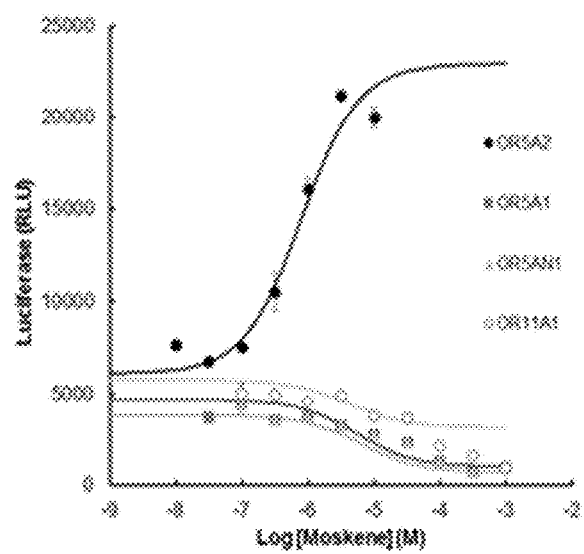
Figure 9A:
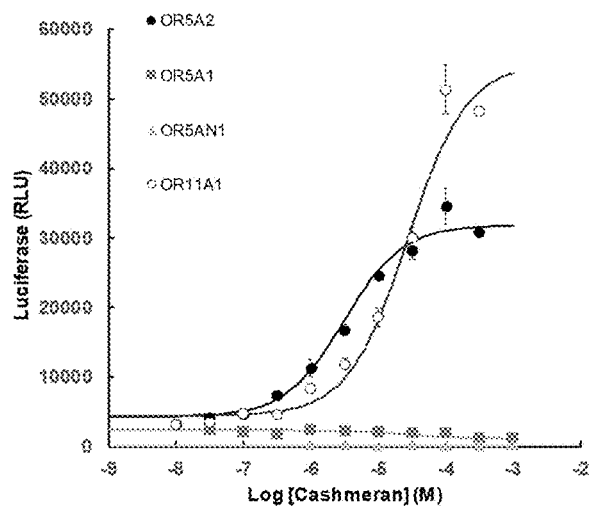
FIGS. 9A-C: Dose response curves of Cashmeran (FIG. 9A), Fixal (FIG. 9B) and Galaxolide® (FIG. 9C) on receptors OR5A2, OR5A1, OR5AN1 and OR11A1.
Figure 9B:
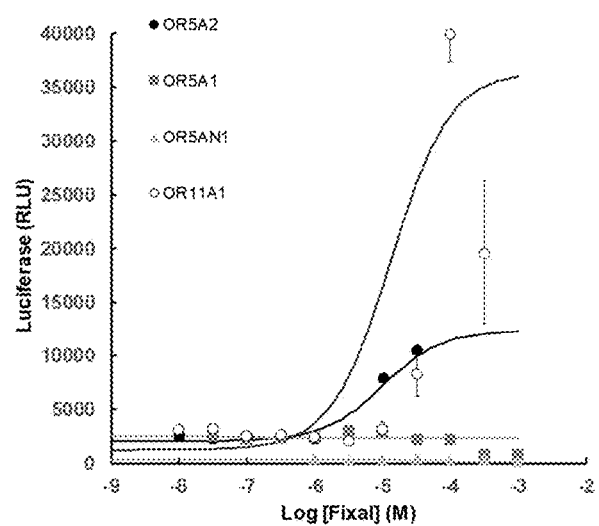
Figure 9C:
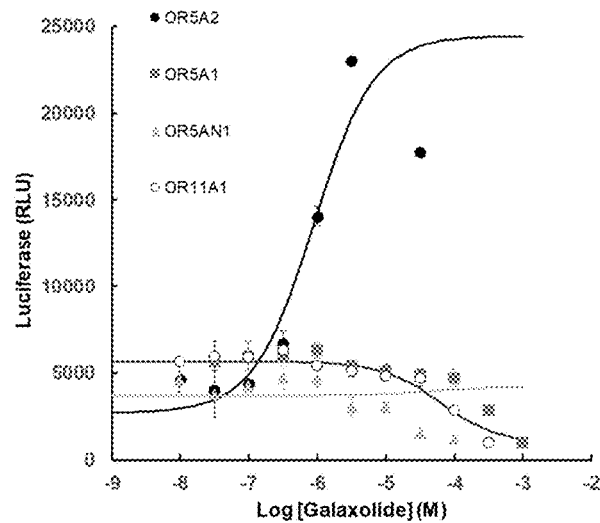

As examples, concentration-response curves of Musk Ambrette (FIG. 7A) and Moskene (FIG. 7B) on receptors OR5A2, OR5A1, OR5AN1, and OR11A1 are illustrated in FIGS. 7A-B. Concentration-response curves of Sylkolide (FIG. 8A) and Serenolide (FIG. 8B) on receptors OR5A2, OR5A1, OR5AN1 and OR11A1 are shown in FIGS. 8A-B. Concentration-response curves of Cashmeran (FIG. 9A), Fixal (FIG. 9B) and Galaxolide® (FIG. 9C) on receptors OR5A2, OR5A1, OR5AN1 and OR11A1 are shown in FIGS. 9A-C. Concentration-response curves of Ethylene Brassylate (FIG. 10A), Ambrettolide (FIG. 10B) and Cervolide (FIG. 10C) on receptors OR5A2, OR5A1, OR5AN1 and OR11A1 are shown in FIGS. 10A-C.

It was observed that OR of the invention (namely OR5A2) is activated by musk compounds belonging to the 4 groups of chemicals described formerly. OR5A1, the closest paralog of OR5A2, was not activated by any of the musk compounds tested. Moreover, musk-specific ORs (OR5AN1 and OR11A1) respond mainly to nitromusks and macrocyclic musks or polycyclic musks and nitromusks respectively (Tables 2). None of the musk compounds tested was able to activate exclusively ORSAN1. Furthermore, our results indicate that the OR of the invention (namely OR5A2) is the only OR activated by the linear musk family, known to be more environment friendly.

The OR of the invention is therefore involved in the perception of all types of musks and constitutes a valuable candidate receptor for identifying a compound that activates, mimics, blocks, inhibits, modulates and/or enhances the perception of musk fragrances.

Example 3: Dose-Responses Analysis of OR11A1 and OR5A1 Specific Ligands-OR Interaction.

Figure 3A:
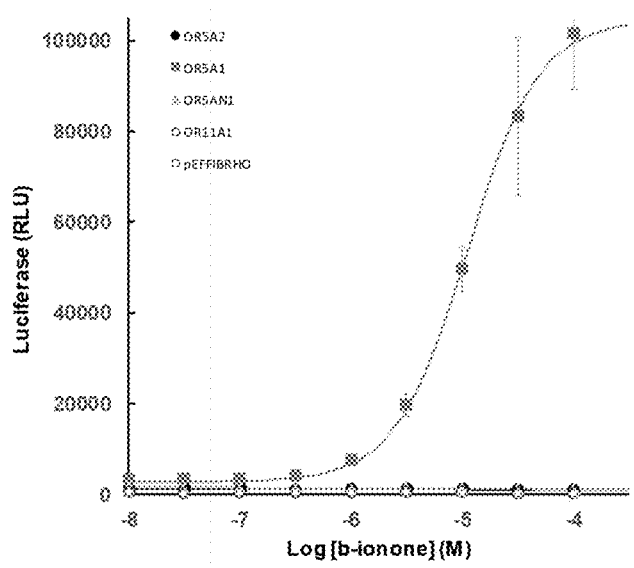
FIG. 3A. Concentration-response analysis of the OR of the invention (i.e. OR5A2 as defined herein), OR5AN1, OR11A1 and OR5A1 with Beta-ionone the described activator of OR5A1. pEFIBRHO corresponds to the empty vector and is used as control. Results indicate that Beta-ionone is able to activate OR5A1 only.
Figure 3B:
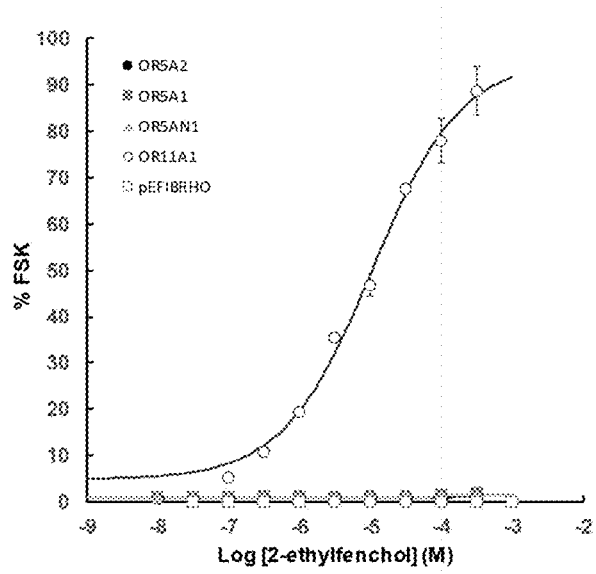
FIG. 3B. Concentration-response analysis of the OR of the invention (i.e. OR5A2 as defined herein), OR5AN1, OR11A1 and OR5A1 with ethyl-fenchol the described activator of OR11A1. pEFIBRHO corresponds to the empty vector and is used as control. Results indicate that ethyl-fenchol is able to activate OR11A1 only.

Amino acids sequences alignment shows 67% identity between OR5A1 and OR5A2, 58% with OR5AN1 and 41% with OR11A1 (FIGS. 2A-B). To further address the question of how well paralogy predicts functionality and selectivity, we compared the response of these ORs to beta-ionone and 2-ethyl fenchol, the two well-known agonists of OR5A1 and OR11A1 respectively (Jaeger et al., 2013; Adipietro et al., 2012). These compounds were tested in concentration-response analysis in luciferase assays, as described previously. In each experiment, an empty vector was used as negative control (pEFIBRHO). Representative concentration-response curves are given in FIGS. 3A-B.

It was observed that OR5A1, the closest paralog of OR5A2, and OR11A1 are both activated by their own cognate agonist. On the contrary, in these experimental conditions, OR of the invention (namely OR5A2) as well as OR5AN1 are stimulated neither by beta-ionone nor by 2 ethyl-fenchol, both showing concentration-response curves similar to the empty vector.

Altogether, these results indicate that OR5A1 and OR5A2, although members of the same subfamily, show different agonist specificity (beta-ionone vs musk) indicating that amino acids similarity doesn't robustly predict OR selectivity and functionality among paralogs.

Example 4: Dose-Response Analysis of Ligand-OR Haplotypes Interaction

OR genes are highly variable, with many alleles resulting in differences in smell perception from person to person. These differences can be attributed to genetic variations like, for example, nucleotide polymorphisms. Using the HORDE database (The Human Olfactory Data Explorer, genome.weizmann.ac.il/horde), we found that 5 protein variants (haplotypes) of OR of the invention (namely OR5A2, OR5A2 variant_1) were identified in the population. The most frequent haplotype, present at a frequency of 79, 72%, was used in the previous examples (OR5A2-variant_1; SEQ ID NO.1) and is sensitive to musk compounds. The second haplotype, present at 16,59%, encodes a proline to leucine substitution at the position 172 (P172L, OR5A2_variant 2; SEQ ID NO.3). Together, the 2 haplotypes are expressed in more than 96% of the population. Amino acids alignment of the 2 haplotypes are represented in FIG. 4.

To test if the substitution could impact the musk sensitivity, luciferase assays were performed as described previously after transfection of both OR5A2 variants. Cells were treated with semi-logarithmic serial dilutions of musk compounds from the four structurally different groups described earlier. In each experiment, an empty vector was used as negative control (pEFIBRHO). Representative concentration-response curves are given in FIG. 5.

These experimental results indicate that OR5A2_variant 2 is not activated by musk compounds (musk xylene, serenolide, galaxolide®, velvione, cashmeran, musk ketone), unlike the other haplotype of the receptor of the invention. In these experiments, OR5A2_variant 1 shows concentration-response curves similar to those obtained in example 2. Overall, these observations clearly suggest that the haplotype with the substitution in position 172 (P172L) loses its ability to be activated by musk compounds. This observation could explain why different studies have, so far, excluded the OR of invention as a musk receptor (Shirasu et al. 2014 Neuron 81, 165-78; FIG. 5F supplemental, Sato-Akuhara N et al. 2016 J Neurosci. 36(16), 4482-91).

Figure 6A:
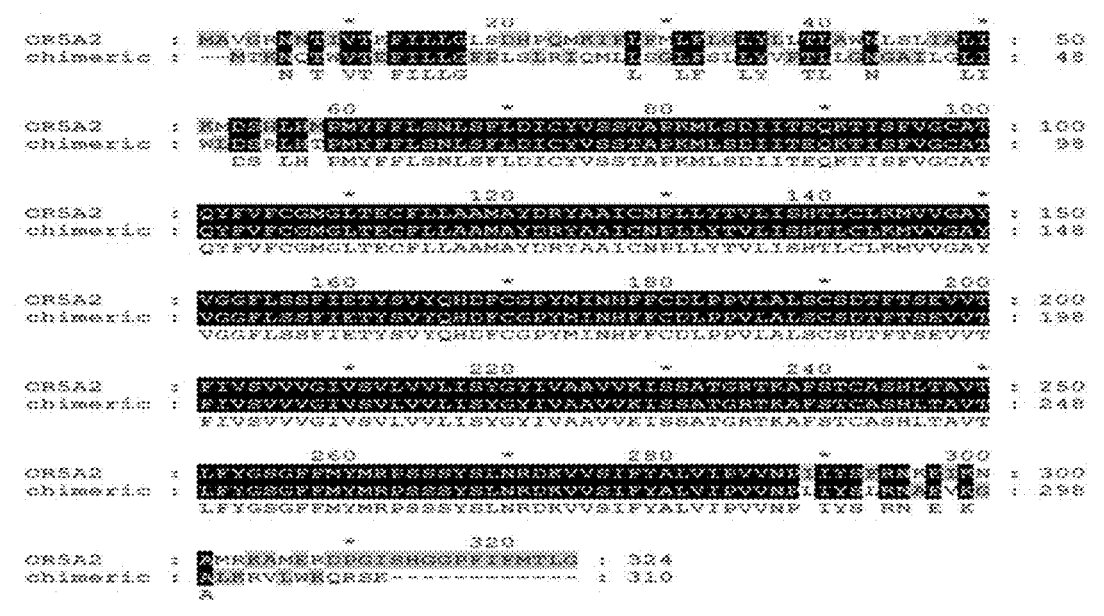
Figure 6C:
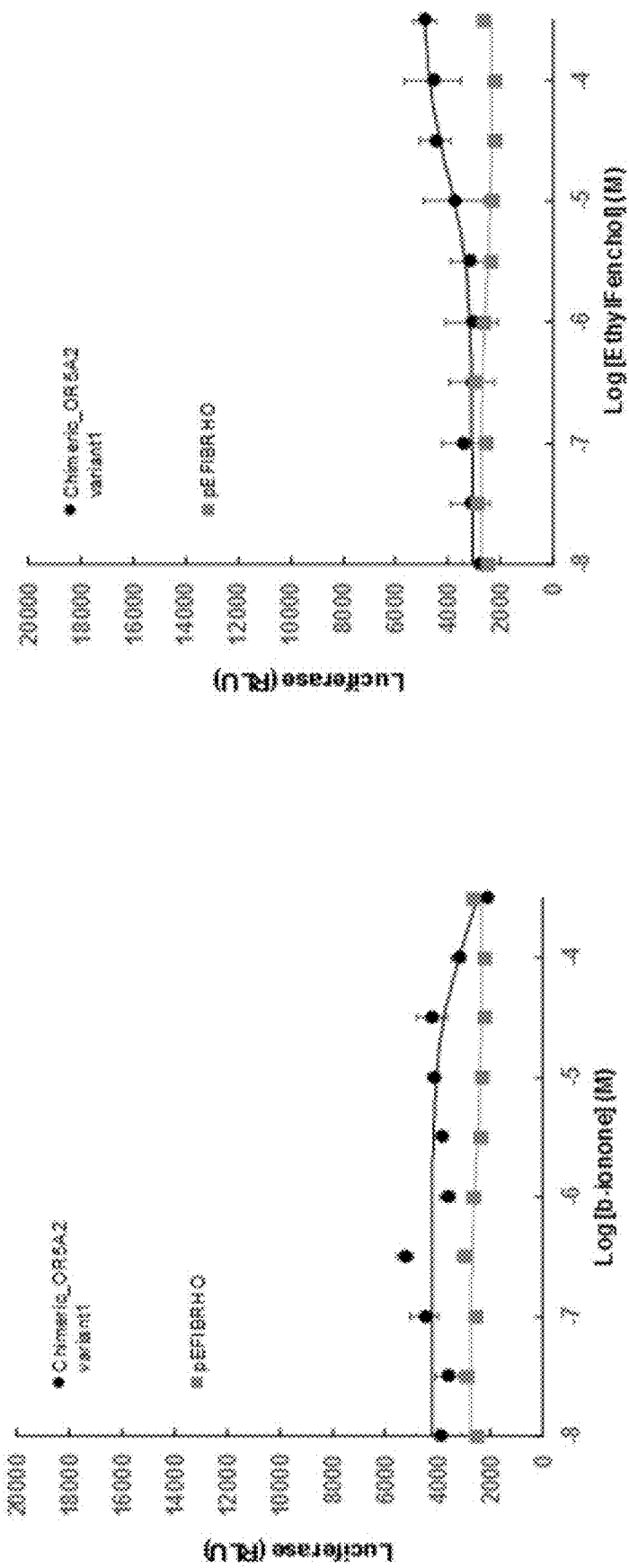
FIG. 6C. Concentration-response analysis of the chimeric OR5A2_variant 1 with Beta-ionone and ethyl-fenchol the described activators of OR5A1 and OR11A1. pEFIBRHO corresponds to the empty vector and is used as control. Results indicate that Beta-ionone and ethyl-fenchol are not able to activate the chimeric OR5A2_variant 1. The chimeric OR5A2_variant 1 (cf. SEQ ID NO:10) has the same specificity than the OR of invention.

Example 5: Dose-Response Analysis of Ligand-Chimeric OR5A2 Variant 1 Interaction In 1998, Krautwurst and collaborators have provided a model system for the study of ligand specificity and structure-function relationships for olfactory receptors (Krautwurst et al., 1998 Cell 95, 917-26). They showed that ligand recognition by olfactory receptors was largely imparted by the protein region going from transmembrane domain 2 (TM2) to transmembrane domain 7 (TM7). Based on their publication, a chimeric OR5A2_variant 1 olfactory receptor was created containing the TM2-TM7 amino acid sequence of OR5A2_variant 1 flanked by the N-teminal and C-terminal sequence of the olfactory receptor OR2A5 (cf. SEQ ID NO: 12). This chimeric OR5A2_variant 1 receptor shared 86 percent identity with the native OR5A2_variant 1 receptor (FIG. 6A and SEQ ID NO: 10).

To test if the amino acids substitution could impact the musk sensitivity, and specificity and to validate the Krautwurst's model, luciferase assays were performed as described previously after transfection of the chimeric OR5A2_variant 1. Cells were treated with semi-logarithmic serial dilutions of musk compounds from the four structurally different groups described earlier.

In each experiment, an empty vector was used as negative control (pEFIBRHO). Moreover, these cells were treated with beta-ionone and 2 ethyl-fenchol, 2 compounds that are not able to activate the originating OR5A2 receptor (cf. FIGS. 2A-B). Representative concentration-response curves are given in FIGS. 6B-C.

Altogether, these results indicate that a chimeric OR5A2_variant 1, although sharing only 86% identity, responds to all types of musks tested. Additionally, the chimeric OR5A2_variant 1 is not activated by beta-ionone or 2 ethyl-fenchol indicating that this chimeric receptor has the same specificity than the OR5A2 receptor and represents a valuable candidate receptor for the identification of compounds that activates, mimics, blocks, inhibits, modulates and/or enhances the perception of musk fragrances.

TABLE 1 complete list of odorant molecules tested on the OR of the invention:

| | | | |
|---|---|---|---|
| VANILLIN #1 | CEDROXYDE | DIMETHYL | GUAIYL |
| VANILLIN #2 | CEDRYL | OCTENONE | ACETATE |
| FENCHONE (+) | ACETATE | DIMETHYL | HELVETOLIDE |
| ROSE OXIDE (−) | LIQUID | PHENYL | HEPTAL- |
| 2,3- | CETALOX | ETHYL | ACTONE |
| DIMETHYL- | CETONAL | CARBINOL | GAMMA |
| PYRAZINE | CETONE V | DI- | HERBAVERT |
| ACETAL CD | CINNAMYL | MYRCETOL | HERCOLYN |
| ACETAL R | CINNAMATE | DIONE | DE |
| ACETATE PA | DISTILLED | DIPENTENE | HEXENOL-2- |
| ACETOIN | CITRAL | DODECAL- | TRANS |
| ACETYL | DIMETHYL | ACTONE | HEXENYL |
| CARYO- | ACETAL | DELTA | ACETATE |
| PHYLLENE | CITRONELLYL | DODECAL- | CIS & TRANS |
| ADOXAL | ISOBUTYRATE | ACTONE | HEXENYL-3- |
| ALCOHOL C 6 | CITRONELLYL | GAMMA | CIS |
| HEXYLIC | OXYACET- | ELINTAAL | BENZOATE |
| ALDEHYDE | ALDEHYDE | ETHYL | HEXENYL-3- |
| C 9 | CITRONELLYL | BENZOATE | CIS |
| ISONONYLIC | PROPIONATE | ETHYL | BUTYRATE |
| ALLYL | CLARITONE | CAPRYLATE | HEXENYL- |
| CAPROATE | CLONAL | ETHYL | 3-CIS |
| AMBRINOL | CONIFERAN | CINNAMATE | HEXENOATE |
| AMYL | CORANOL | ETHYL | HEXENYL-3- |
| BENZOATE | COUMAREX I MOD | ISOAMYL KETONE | CIS ISOBUTYRATE |
| AMYL | CYCLE- | ETHYL | HEXYL |
| PHENYL | MONE A | LINALOOL | BENZOATE |
| ACETATE | CYCLO- | ETHYL | HEXYL |
| APHERMATE | GALBANATE | LINALYL | BUTYRATE |
| AURANTIOL | CYCLOHEXYL | ACETATE | HEXYL |
| PURE | ETHYL | ETHYL | PROPIONATE |
| BENZYL | ACETATE CYCLOHEXYL | METHYL-2- BUTYRATE | HYDRA- TROPIC |

TABLE 1-continued complete list of odorant molecules tested on the OR of the invention:

- ACETONE
- BENZYL BENZOATE
- BENZYL BUTYRATE
- BENZYL ISOBUTYRATE
- BENZYL METHYL ETHER
- BENZYL PHENYL ACETATE
- BERRYFLOR
- BISABOLENE
- BOISIRIS
- BORNYL ACETATE
- LIQUID BUTYL ACETATE
- BUTYL HYDROXY TOLUENE
- CASSIONE
- FIRMENICH CEDRENE WASHED
- ISOPROPYL MYRISTATE
- ISOPROPYL QUINOLINE
- ISOPULEGOL
- JASMOL-ACTONE
- JASMONE CIS
- JASMONYL
- JASMO-PYRANE
- FORTE T
- KOHINOOL
- LAITONE
- LEAF ACETAL
- LIFFAROME GIV
- LIME OXIDE
- LIMETOL
- LINALOOL OXIDE
- LINALYL CINNAMATE
- LINALYL FORMATE
- LINALYL ISOBUTYRATE
- LINALYL PROPIONATE
- MAGNOLAN
- MALTYL ISOBUTYRATE
- MENTHANYL ACETATE
- METHYL CAMOMILLE
- METHYL CINNAMIC ALDEHYDE
- METHYL DIPHENYL ETHER
- METHYL HEPTENONE PURE
- METHYL LINOLEATE
- METHYL PHENYL ACETATE
- SALICYLATE BENZYL
- CYMENE PARA
- DECAL-ACTONE DELTA
- DECAL-ACTONE GAMMA
- DECATONE
- DECENAL-4-TRANS
- DELTA-3 CARENE
- DIBENZYL ETHER
- DIHYDRO AMBRATE
- DIHYDRO LINALOOL
- DIHYDRO TERPINEOL
- DIMETHYL ANTHRANILATE
- DIMETHYL BENZYL CARBINOL
- DIMETHYL BENZYL CARBINYL BUTYRATE
- NEROLIONE
- NERYL ACETATE HC
- NON-ADIENOL-2,6
- NOPYL ACETATE
- OCTA-LACTONE GAMMA
- ONCIDAL
- ORIVONE
- OXY-OCTALINE FORMATE
- PARSOL 1789
- PEOMOSA
- PERANAT
- PHENOXY ETHYL ALCOHOL
- PHENYL ETHYL FORMATE
- PHENYL ETHYL PHENYL ACETATE
- PHENYL ETHYL ISOVALERATE
- PHENYL ETHYL SALICYLATE CRYSTALS
- PHENYL PROPYL ACETATE
- PHENYL PROPYL ALCOHOL
- PINOACETALDEHYDE
- POIRENATE
- PRENYL ACETATE
- PROPYL DIANTILIS
- RADJANOL SUPER
- ETHYL OENANTHATE
- ETHYL PELARGONATE
- ETHYL PROPIONATE
- ETHYL SALICYLATE
- FARNESENE
- FENCHONE ALPHA
- FLORAMAT
- FLOROPAL
- FOLENOX
- FOLIONE
- FOLROSIA
- FRESKOMENTHE
- GALBANONE PURE
- GERANYL ACETONE
- GERANYL ISOBUTYRATE
- GRISALVA
- TETRAHYDRO CITRAL
- TRIACETIN
- TRIETHYL CITRATE
- VELOUTONE
- VERDALIA
- VERDANTIOL
- VERN-ALDEHYDE
- VERTOFIX COEUR
- VETIVERYL ACETATE
- VETYNAL
- VIOLIFF
- VIRIDINE
- AQUANTRAAL (FLEURANTIOL)
- ARBOROMA
- AVALONE
- CARYOPHYLLENE ALCOHOL
- CISTULAC CORNOLINE
- DECYL ACETATE
- ETHYL 2-PHENYL-BUTYRATE
- INONYL FORMATE
- INONYL PROPIONATE
- MEVANTRAAL
- OCTYL ACETATE
- PRENYL BENZOATE
- PROPYLIDENE PHTHALIDE
- FLEURANIL
- UNDECATRIENE
- ALDEHYDE DIMETHYL ACETAL
- HYDROXY-CITRONELLAL DIMETHYL ACETAL
- INDOFLOR
- INDOLENE
- IRALIA PURE
- IRONE F
- ISO JASMONE FR
- ISOAMYL BUTYRATE
- ISOBORNYL ISOBUTYRATE
- ISOBUTYL ISOBUTYRATE
- ISOBUTYL PHENYL ACETATE
- ISOBUTYL SALICYLATE
- ISOCYCLO-CITRAL
- ISONONANOL
- ISONONANYL ACETATE
- PURE ISOPENTYRATE
- ISOPROPYL ALCOHOL
- CANTHOXAL
- LILIAL
- MEFRANAL
- CARYOPHYLLENE HYDROGEN SULPHIDE
- METHANETHIOL
- BENZYL MERCAPTAN
- 3-MERCAPTO-2-METHYL-1-BUTANOL
- 3-MERCAPTO-3-METHYL-1-HEXANOL
- 2-MERCAPTO-ACETIC ACID
- DIMETHYL SULPHIDE
- DIALLYL SULPHIDE
- 1-BUTYLAMINE
- TRIMETHYLAMINE
- 1,5-DIAMINO-PENTANE
- INDOLE
- SKATOLE
- 3-METHYL-2-HEXENOIC ACID*
- 3-HYDROXY-3-METHYL-HEXANOIC ACID
- (E),(E)-2,4-DECADIENAL
- GEOSMIN
- AMMONIA
- ZINARINE
- MILK LACTONE 2067
- MUSCONE
- MYRALDYL ACETATE
- NEROLIDOL EXTRA
- NEROLIDOL SYNTHETIC
- NEROLIDYLE
- AMBROFIX
- ANAPEAR
- ANJERUK
- AZURONE
- BELAMBRE
- BENZYL CINNAMATE
- BENZYL SALICYLATE
- BETA-PINENE
- BOURGEONAL
- CAMONAL
- CIS-3-HEXENYL ACETATE
- CIS-3-HEXENYL SALICYLATE
- CIS-3-HEXENYL CITRAL
- COSMONE
- CYPRISATE
- DIHEXYL FUMARATE
- DIHYDRO-FARNESAL
- DIHYDRO-MYRCENOL
- DIHYDRO-MYRCENYL ACETATE
- DUPICAL
- ETHYLENE GLYCOL MONOPHENOXYACETATE
- FARNESOL
- FLORIDILE
- FLORYMOSS
- Γ-UNDECA-LACTONE
- GEORGYWOOD
- GERANODYLE
- HELIOTROPIN
- ISOBUTAVAN
- ISORALDEINE
- LIMONENE
- METHYL 10-UNDECYLENATE
- HELIONAL
- L-CARVONE
- D-CARVONE
- 1-NONANOL
- INDOCLEAR
- PHENYL-ACETIC ACID
- BORNEOL
- Δ-UNDECAL-ACTONE
- PIVACYCLENE
- NEO-CASPIRENE
- BUCCOXIME
- LABIENOXIME
- ETHYL HEXANOATE
- ETHYL
- RHUBOFIX
- RHUBOFLOR
- ROSAPHEN
- RUM ACETAL
- SCENTENAL
- STYRALLYL PROPIONATE
- SYVERTAL
- TANGERINOL
- TERPINENE GAMMA
- TERPINOLENE
- METHYL CINNAMATE
- METHYL DIHYDRO-JASMONATE
- METHYL SALICYLATE
- METHYL UNDECA-NOATE
- MUSK R1
- NECTARYL
- NIRVANOLIDE
- OPALAL
- PANDANOL
- PARADIS-AMIDE
- P-CRESYL METHYL ETHER
- PEONILE
- PEPPERWOOD
- PHARAONE
- POMAROSE
- RADJANOL
- ROSSITOL
- SERENOLIDE
- SINODOR
- SPIRO-GALBANONE
- STEMONE
- SUPER MUGUET
- TANAISONE
- A-TERPINYL ACETATE
- TETRA-HYDRO-LINALYL ACETATE
- THIBETOLIDE
- TONKAROSE
- TRIDEC-2-ENE NITRILE
- TRIMOFIX
- ULTRAVANIL
- UNDECANAL
- UNDECANOIC ACID
- UNDECANOL
- DIETHYL MALONATE
- ETHYL ACETO-ACETATE
- HEXYL ACETATE
- ISOAMYL ACETATE
- B-PHENOXY-ETHYLISO-BUTYRATE
- RASPBERRY KETONE
- ETHYL BUTYRATE
- CIS-3-HEXENYL PROPIONATE
- CIS-3-HEXENYL TIGLATE
- CITRONELLOL
- LINALOOL
- MENTHONE
- UNDECA-VERTOL
- VERDYL ACETATE
- VERDYL PROPIONATE
- YARA-YARA
- TONALIDE
- GALAXOLIDE ®
- THIBETOLIDE
- MUSK KETONE
- MUSK XYLENE
- CASHMERAN
- AMBRETOLIDE
- ETHYLENE BRASSYLATE
- HABANOLIDE
- VELVIONE
- EXALTOLIDE
- MUSK MC4
- MUSCENONE
- HEXADECANOLIDE
- CYCLO-PENTADECANONE
- MUSK R1
- CERVOLIDE
- TRASEOLIDE
- NIRVANOLIDE
- MOXALONE
- FREESIOL
- FLOROSA
- HYDROXY-CITRONELLAL
- NELLAL
- CYCLAMEN-ALDEHYDE
- LYRAL
- MAJANTOL
- MAYOL
- SILVIAL
- FLOR-HYDRAL
- CITRO-NELLYL NITRILE
- GERANYL NITRILE
- HYPO-LEM LEMONILE
- MYRCENYL ACETATE
- A-TERPINYL ISO-BUTYRATE METHYL
- PAMPLE-MOUSSE
- 1-CYCLO-HEXYL-ETHANOL
- 1-CYCLO-HEXYLETHYL ACETATE
- 1-CYCLO-HEXYLETHYL BUTYRATE
- 1-CYCLO-HEXYLETHYL PROPIONATE
- 10-UNDECENAL
- 10-UNDECENOL
- 10-UNDECYLENIC ACID
- ARGARBOIS
- ALDEHYDE MNA
- MUSK FURNISAL
- EMPETAL
- SUPER MUGUET
- GERANIOL
- GERANYL ACETATE
- CITRONELLYL ACETATE
- NEROL
- PHENYL-ETHANOL
- PHENYL ETHYL ACETATE
- TETRA-HYDRO-GERANIOL
- TETRA-HYDRO-LINALOOL
- BENZO-PHENONE
- DIPHENYL OXIDE
- ROSE OXIDE
- 9-DECEN-1-OL
- DIMETHYL BENZYL CARBINYL ACETATE
- MEFROSOL
- ETHYL SAFRANATE
- PIVAROSE
- ANTHER
- HINDINOL
- POLYSANTOL
- SANDALORE
- EBANOL
- OSYROL
- JAVANOL
- ISOBORNYL-CYCLO-HEXANOL
- CALONE
- MARENIL
- MELONAL
- FLORALOZONE
- MACEAL
- PHELL-ANDRENE
- SAFRALEINE
- ETHYL-VANILLIN

TABLE 1-continued complete list of odorant molecules tested on the OR of the invention:

METHYL PHENYL GLYCIDATE
ETHYL PHENYL GLYCIDATE
NON-ALACTONE
OCTAHYDRO-COUMARIN
A-DAMASCONE
B-DAMASCONE
Δ-DAMASCONE
DAM-ASCENONE
MANZANATE
APPLINAL
ORTHOLATE
ALLYL AMYL GLYCOLATE
ALLYL CYCLO-HEXYL-PROPIONATE
ALLYL HEPTANOATE
FRUITATE
FRUTONILE
HERBANATE
METHYL LAITONE
ETHYL LAITONE
GIVESCONE
PLICATONE
TERPINEN-4-OL
THUJONE
THYMOL
METHYL BENZOATE
α-IONONE
β-IONONE
α-ISO-METHYL-IONONE
α-IRONE
DIHYDRO-β-IONONE
VIOLET NITRILE
ROSYRANE
CIS-3-HEXENYL TIGLATE
PELARGENE
METHYL TUBERATE
DISPIRONE
ANIS-ALDEHYDE
ANISIC ALCOHOL
ANISIC NITRILE
α-TERPINEOL
BENZYL ALCOHOL
NEROLIN
METHYL NAPHTHYL KETONE
HYDRA-TROPIC ALDEHYDE
PEAR ESTER
AMBER KETAL
AMBERMAX
CEDRAMBER
KARANAL
AMBRO-CENIDE
AMBERCORE
MET-AMBRATE
OKOUMAL
SPIR-AMBRENE
CIS-3-HEXENOL
2,6-NONADIENAL
METHYL OCTYNE CARBONATE
STYRRALLYL ACETATE
DYNASCONE RESEDA BODY
LIGUSTRAL
VERDORA-CINE
CHRYS-ANTHAL
BEAU-VERTATE
PETIOLE
VERDILYN
PHENYL-ACET-ALDEHYDE
GARDAMIDE
VETHYMINE
CITRONELLAL
GARDO-CYCLENE
ROSACETOL
CEDROL
METHYL CEDRYL KETONE
FELVINONE
AZARBRE
BOIS-AMBRENE
TIMBEROL
KEPHALIS
KOAVONE
AMBORYL ACETATE
ISO-LONG-IFOLANONE
CYCLISONE
ISOAMBOIS
PTBCHA
PTBCHA HIGH CIS
EVERNYL
ISOBUTYL-QUINOLENE
TETRAHYDRO NAPHTHOL
O-CRESOL
PROPENYL-GUAETHOL
2-COUMARONE
ACET-ALDEHDYE
ACET-
RHUBA-FURAN
THIO-TERPINEOL
NOOT-KATONE
ALICATE
DECANAL
FRESCILE
LINALYL ACETATE
MANDARINE ALDEHYDE
VETIKOL ACETATE
9-DECENAL
UNDECENE-2-NITRILE
EUGENOL
METHYL-ISOEUGENOL
BENZYL-ISOEUGENOL FORTE
DIHYDRO-EUGENOL
METHYL DIANTILIS CINNAMIC ALCOHOL
CINNAM-ALDEHYDE
CINNAMYL NITRILE
CUMIN-ALDEHYDE
CUMIN NITRILE
ANETHOLE
DIHYDRO-ANETHOLE
TOSCANOL
METHYL-CHAVICOL
AMYL 2-FUROATE
AMYL HEXANOATE
ISOAMYL LAURATE
AMYL OCTANOATE
ISOAMYL OCTANOATE
ISOAMYL SALICYLATE
ISOAMYL ISO-VALERATE
ANISYL ACETATE
BENZ-ALDEHYDE
BENZOIC ACID
ISOBORNEOL
2-BUTANONE
ISOBUTYL ACETO-ACETATE
ISOBUTYL ALCOHOL
LSOBUTYL BENZOATE
BUTYL BUTYRIL-ACETATE,
MALTOL
ETHYL-MALTOL
LEVISTAMEL
COUMARIN
PARA-METHYL-ACETO-PHENONE
PARA-METHOXY-ACETO-PHENONE
METHYL EPI-JASMONATE
AMYL CINNAMIC ALDEHYDE
HEXYL CINNAMIC ALDEHYDE
DIHYDROISO-JASMONATE
BENZYL ACETATE
BENZYL PROPIONATE
DIHYDRO-JASMONE
JESSATE
QUINTONE
JASMATONE
HEPTONE
JASMA-CYCLENE
ISOBORNYL ACETATE
CAMPHOR
CARVACROL
1,8-CINEOLE
CISTULATE
CRESS-ANTHER
HERBOXANE
D-LIMONENE
MENTHOL
4-METHYL-ANISOLE
□-METHYL-BENZYL ALCOHOL
METHYL BUTYRATE
METHYL 2-FUROATE
METHYL LAURATE
METHYL 2-METHYL-BUTYRATE
METHYL 3-(METHYL-THIO) PROPIONATE
METHYL B-NAPHTHYL KETONE
METHYL PHENYL-ACETATE
METHYL ISOVALERATE
2-METHYL-PENTANOIC ACID
□-NONAL-ACTONE
PROPYLENE GLYCOL ACETAL
FLORO-CYCLENE
METHYL ANTHRANIL-ATE
CALYXOL
GYRANE
HEXYL SALICYLATE
AMYL SALICYLATE
GLYCOL-IERRAL
FLORANE
GERANYL BENZOATE
2,3-HEPTANE-DIONE
4-HEPTANONE
□-6-HEXADECEN-LACTONE
HEXANAL
HEXANOIC ACID
TRANS-2-HEXENAL, NATURAL
CIS-3-HEXEN-1-OL
HEXYL OCTANOATE
LAURIC ACID
LAURIC ALDEHYDE
(R)-(+)-LIMONENE
MALTOL
L-MENTHOL
L-MENTHONE
METHYL ACETATE
METHYL P-ANISATE
4-METHYL-ANISOLE
ALDEHYDE, 50 WT. % SOLUTION IN ETHANOL
ANIMONIUM UULFIDE
3-METHYL-1-BUTANOL
ISOAMYL BENZOATE
□-ARNYL-CINNAN-ALDEHYDE
ISOAMYL CINNAMATE
□-AMYL-CINNAMYL ALCOHOL
ISOAMYL FORMATE
OCTYL ISOBUTYRATE
OCTYL PROPIONATE
OLEIC ACID
□-PENTADEC-ALACTONE
2,3-PENTANE-DIONE
2,3-PENTANE-DIONE, NATURAL
4-PENTENOIC ACID
PHENETHYL CINNAMATE
PHENETHYL 2-FUROATE
PHENOXY-ACETIC ACID
1-PHENYL-3-METHYL-3-PENTANOL
2-PHENYL-PROPION-ALDEHYDE
(1S)-(−)-□-PINENE
(1S)-(−)-□-PINENE
PIPERINE
PIPERONAL, NATURAL
PRPIONO-ALDEHYDE
1-PROPANOL
P-LSOPROPYL-BENZYL ALCOHOL
ISOPROPYL BUTYRATE
PROPYL ISO-BUTYRATE
PROPYL HEXANOATE
LSOPULEGYL ACETATE
METHYL PYRUV-ALDEHYDE
SALICYL-ALDEHYDE
□-TERPINEOL
TETRA-HYDRO-FURFURYL ALCOHOL
NATURAL BUTYL FORMATE
BUTYL LAURATE
BUTYL LEVULINATE
□-LSO-BUTYLPHEN-ETHYL ALCOHOL, NATURAL
ISOBUTYL PROPIONATE
BUTYL 10-UNDECENO-ATE
ISOBUTYR-ALDEHYDE
BUTYRIC ACID
LSOBUTYRIC ACID
TRIBUTYRIN (+)-CAMPHENE
4-CARVO-MEN-THENOL, NATURAL
D-CARVONE
CINNAM-ALDEHYDE
CINNAMYL ACETATE
VANILLIN (SIGMA)
2-ACETYL-PYRAZINE
BUTYL-AMINE
2-LSOBUTYL-3-METHOXY-PYRAZINE
2-ISOBUTYL-THIAZOLE
2,2'-(DITHIO-DIMETHYL-ENE) DIFURAN
ETHYL TRANS-2, CIS-4-DECA-DIENOATE
2-ETHYL-3,5-DIMETHYL-PYRAZINE
5-ETHYL-3-HYDROXY-4-METHYL-2(5H)-FURANONE
2-ETHYL-3-METHYL-PYRAZINE
P-ETHYL-PHENOL
FURFURYL METHYL SULFIDE
2-FURYL METHYL KETONE
TRANS-2-HEPTENAL
3,4-HEXANE-DIONE
3-HEXENOIC
SUCCINATE ETHYL
ETHYL ACRYLATE
ETHYL P-ANISATE
ETHYL ISOBUTYRATE
ETHYL MYRISTATE
ETHYL NONANOATE
ETHYL PALMITATE
ETHYL PYRUVATE
ETHYL TIGLATE
ETHYL VALERATE
ETHYL ISOVALERATE
EUCALYPTOL
EUGENOL
LSOEUGENOL METHYL EUGENOL
METHYL ISOEUGENOL
FENCHYL ALCOHOL
FURFURYL ACETATE
GERANIUM OIL
PHENE-THYLAMINE
2-PHENYL-2-BUTENAL
1-PHENYL-1,2-PROPANE-DIONE
STYRENE
TETRA-HYDRO-4-RNETHYL-2-(2.METHYL-2-PROPEN-1-YL) PYRAN
UNDECANOIC ACID
2,6-XYLENOL
2-ACETYL-PYRIDINE
CIS-4-DECENAL
4,5-DIHYDRO-3(H)THIO-PHENONE
2,4-DIMETHYL-5-ACETYL-THIAZOLE
3,5-DIMETHYL-1,2-CYCLO-PENTADIONE
TRIMETHYL DISULFIDE
ETHYL 2-MERCAPTO-PROPIONATE
FURFURYL 3-METHYL-BUTANOATE
1-FURFURYL PYRROLE
CIS-4-

TABLE 1-continued complete list of odorant molecules tested on the OR of the invention:

NONYL ACETATE
OCTANOIC ACID
4-HEXEN-3-ONE
HEXYL TRANS-2-BUTENOATE
⊐-NONAL-ACTONE
4-(METHYL-THIO)-2-BUTANONE
SAFRANAL
FENCHYL ACETATE
3-ETHYL-PYRIDINE
FURFURYL OCTANOATE
2-HEPTYL-FURAN
2-ISOPROPYL-5-METHYL-2-HEXENAL
3-OCTEN-2-OOE
3-PENTEN-2-ONE
2-UNDECENAL
ETHYL 3-HYDROXY-BUTYRATE
ISOBUTYL TRANS-2-BUTENOATE
2-METHOXY-3-ISOBUTYL-PYRAZINE
3-(METHYL-THIO)-1-HEXANOL
HEXYL PHENYL-ACETATE
2-ISOPROPYL-PHENOL
4-METHYL-PENTANOIC ACID
1-BUTANE-THIOL
ETHYL TRANS-2-
THYMOL
P-TOLYL ACETATE
P-TOLYL PHENYL-ACETATE
UNDECANAL
VALER-ALDEHYDE
VALERIC ACID
ETHYL UNDECANO-ATE
2-, 3-; AND 10-MERCAPTO-PINANE
2-METHYL-BUTYL ISOVALERATE
1,9-NONANE-DITHIOL
1,8-OCTANE-DITHIOL
OCTYL 2-FUROATE
PROPYL MERCAPTAN
PYRROLIDINE 3,5,5-TRIMETHYL-HEXANAL
3-ACETYL-2,5-DIMETHY-ITHIOPHENE
1,3 BUTANE-DITHIOL
CYCLO-HEXANE-CARBOCYLIC ACID
3-DECEN-2-ONE
3-HEPTANOL
⊐-TERPINENE
1,3-PROPANE-DITHIOL
2,5-XYLENOL
4-(METHYL-THIO) BUTANOL
D-XYLOSE
2-ACETYL-5-METHYL-FURAN
THIAZOLE
ACID
HEXYL ISO-BUTYRATE
4-HYDROXY-2,5-DIMETHYL-3(2H)-FURANONE
P-MENTHA-8-THIOL-3-ONE
2-MERCAPTO-PROPIONIC ACID
2-METHOXY-3-METHYL-PYRAZINE
3-METHYL-CROTONIC ACID
2-METHYL-3-FUR-ANTHIOL
1-METHYL-NAPHTHAL-ENE
TRANS-2-METHYL-2-PENTENOIC ACID
5-METHYL-2-PHENYL-2-HEXENAL
4-METHYL-2-PHENYL-2-PENTENAL
METHYL PROPYL DISULFIDE
4-METHYL-5-THIAZOLT-ETHANOL ACETATE
ISOPENTYL-AMINE
2-METHYL-BUTYL ACETATE
3-METHYL-2-BUTEN-1-OL
4-PROPYL-PHENOL
4-ALLYL-2,6-DIMETHOXY-
HEPTENAL
4-HYDROXY-BUTANOIC ACID LACTONE
⊐-UNDECAL-ACTONE
2-METHOXY-PYRAZINE
5H-5-METHYL-6,7-DIHYDRO-CYCLOPENTA-[B]PYRAZINE
2-METHYL-PYRAZINE
2-NAPH-THALENE-THIOL
5,6,7,8-TETRA-HYDROQUIN-OXALINE
2-ACETYL-3,5(OR 6)-DIMETHYL-PYRAZINE
3-BUTYL-IDENE-PHTHALIDE
ETHYL TRANS-3-HEXENOATE
HEPTANOIC ACID
4-HYDROXY-BENZ-ALDEHYDE
SYRING-ALDEHYDE
CITRO-NELLYL TIGLATE
DIACETIN
ISOBUTYL TIGLATE
HEXYL TIGLATE
METHYL TIGLATE
FURFURYL BUTYRATE
FURFUTYL HEPTENOATE
METHYL STEARATE
BUTENOATE
ETHYL MALTOL
ETHYL 2-METHYL-PENTANOATE
ETHYL STEARATE
BENZENE-THIOL
DI-HYDRO⊐⊐-IONONE
PHENETHYL 2-METHYL-BUTYRATE
4,5-DIMETHYL-3-HYDROXY-2,5-DIHYDRO-FURAN-2-ONE
PHENOL
2,5-DI-METHYL-4-RNETHOXY-3(2H) FURANONE
1-ETHYL-HEXYL TIGLATE
ISOPROPYL 2-METHYL-BUTYRATE
METHYL 2-METHYL-PENT-ANOATE
METHYL NICOTINATE
METHYL 3-NONENOATE
METHYL TRANS-2-OCTENOATE
METHYL SORBATE
ANISYL PHENYL-ACETATE
L/-MENTHYL LACTATE
VANILLIN ISO-BUTYRATE
MENTHAL-ACTONE
OCTA-HYDRO-COUMARIN
2-PENTANE-THIOL
2-ACETYL-2-THIAZOLINE
3-CARENE
ISOPROPYL DISULFIDE
1,4-DITHIANE
ETHYL METHYL SULFIDE
2,6-DI-METHYL-THIOPHENOL
2-PENTYL BUTYRATE
METHYL DECANOATE
METHYL (P-TOLYLOXY) ACETATE
FENCHONE (−)
3-METHYL-3-PENTANOL
ACETO-VANILLONE
2-BUTANOL
ETHYL (±)-2-HYDROXY-CAPROATE
⊐-BROMO-STYRENE, MIXTURE OF ISOMERS
TRIDECANAL
TETRAHYDRO MYRCENOL
DIETHYL PHTALATE
GALAXOLIDE
1,4 BUTANE-DITHIOL

TABLE 2 complete list of musk compounds tested on the OR of the invention, OR5A1, OR5AN1, OR11A1
(Non Active represents negative experiments, no activation after testing)

| Name | Organoletic properties | Structure | Class | OR5A2 | OR5A1 | OR5AN1 | OR11A1 |
|---|---|---|---|---|---|---|---|
| Moskene | sweet musk ambrette ketone powdery dry | | Nitro Musk | −5.73 | Non Active | Non Active | Non Active |

TABLE 2-continued complete list of musk compounds tested on the OR of the invention, OR5A1, OR5AN1, OR11A1
(Non Active represents negative experiments, no activation after testing)

| Name | Organoletic properties | Structure | Class | OR5A2 | OR5A1 | OR5AN1 | OR11A1 |
|---|---|---|---|---|---|---|---|
| Musk ketone | fatty musk soapy dry powdery | | Nitro Musk | −3.97 | Non Active | −6.54 | Non Active |
| Musk xylol | fatty dry sweet soapy musk | | Nitro Musk | −5.73 | Non Active | −6.18 | −5.73 |
| Musk ambrette | musty sweet ambrette seed | | Nitro Musk | −5.06 | Non Active | −3.16 | Non Active |
| Ethylene brassylate | powdery sweet floral ambrette musk woody | | Polycyclic | −4.31 | Non Active | −4.18 | Non Active |
| Thibetolide = Exaltolide | musk animal powdery natural fruity | | Polycyclic | −4.36 | Non Active | −4.06 | Non Active |
| 1,16-Hexadecalactone | sweet musk balsam amber animal | | Polycyclic | −4.39 | Non Active | −3.49 | Non Active |

TABLE 2-continued complete list of musk compounds tested on the OR of the invention, OR5A1, OR5AN1, OR11A1
(Non Active represents negative experiments, no activation after testing)

| Name | Organoletic properties | Structure | Class | OR5A2 | OR5A1 | OR5AN1 | OR11A1 |
|---|---|---|---|---|---|---|---|
| Exaltenone | musk animal natural | | Polycyclic | −4.81 | Non Active | −5.73 | Non Active |
| Globanone (Animusk) | musk floral | | Polycyclic | −5.4 | Non Active | −5.65 | Non Active |
| Musk R1 | sweet oily incense musk amber animal | | Polycyclic | −4.72 | Non Active | −4.02 | Non Active |
| Velvione | dry powdery musk amber civet | | Polycyclic | −4.54 | Non Active | −4.31 | Non Active |
| Cyclopentadecanone | powdery musk animal natural greasy | | Polycyclic | 6 | Non Active | −4.95 | Non Active |
| Muscone | sweet musk animal powdery fatty natural | | Polycyclic | −5.25 | Non Active | −5.37 | Non Active |

TABLE 2-continued complete list of musk compounds tested on the OR of the invention, OR5A1, OR5AN1, OR11A1
(Non Active represents negative experiments, no activation after testing)

| Name | Organoletic properties | Structure | Class | OR5A2 | OR5A1 | OR5AN1 | OR11A1 |
|---|---|---|---|---|---|---|---|
| Civetone | clean musk dry animal sweet | | Polycyclic | −5.29 | Non Active | −5.325 | Non Active |
| Musk MC4 | sweet clean waxy musk animal | | Polycyclic | −4.42 | Non Active | −4.12 | Non Active |
| Cervolide | musk woody sweet brassylate fruity | | Polycyclic | −4.52 | Non Active | −4.13 | Non Active |
| ω-6-Hexadecen-lactone | sweet soapy musk amber fruity berry | | Polycyclic | −5.17 | Non Active | −4.68 | Non Active |
| nirvanolide | intense musky, fruity, powdery odor with lactonic nuances | | Polycyclic | −4.71 | Non Active | −3.38 | Non Active |
| Isoambrettolide | sweet musk ambrette fruity waxy | | Polycyclic | −4.72 | Non Active | Non Active | Non Active |

TABLE 2-continued complete list of musk compounds tested on the OR of the invention, OR5A1, OR5AN1, OR11A1
(Non Active represents negative experiments, no activation after testing)

| Name | Organoletic properties | Structure | Class | OR5A2 | OR5A1 | OR5AN1 | OR11A1 |
|---|---|---|---|---|---|---|---|
| Habanolide | musk | | Polycyclic | −4.79 | Non Active | −4.18 | Non Active |
| Musk 77 | musk-like note | | Polycyclic | −5.29 | Non Active | Non Active | −5.04 |
| Oxalide T | | | Polycyclic | −5.08 | Non Active | −4.49 | Non Active |
| Crysolide | animal musk cedar ambergris woody | | Polycyclic | −4.65 | Non Active | −3.92 | Non Active |
| Tonalide ® | strong sweet amber fruity musk powdery | | Polycyclic | −6.12 | Non Active | Non Active | −4.74 |
| Phantolide | strong sweet musk amber powdery dry fruity | | Polycyclic | −5.34 | Non Active | Non Active | −5.12 |
| Cashmeran | rich spicy musk woody clean | | Polycyclic | −4.75 | Non Active | Non Active | −4.67 |

TABLE 2-continued complete list of musk compounds tested on the OR of the invention, OR5A1, OR5AN1, OR11A1
(Non Active represents negative experiments, no activation after testing)

| Name | Organoletic properties | Structure | Class | OR5A2 | OR5A1 | OR5AN1 | OR11A1 |
|---|---|---|---|---|---|---|---|
| Galaxolide ® | strong diffusive sweet floral musk | | Polycyclic | −5.98 | Non Active | Non Active | Non Active |
| Traseolide | dry sweet amber musk herbal creamy | | Polycyclic | −5.71 | Non Active | Non Active | −5.15 |
| Moxalone | Moxalone ® is a musk fragrance ingredient by Givaudan | | Polycyclic | −4.53 | Non Active | −3.51 | Non Active |
| Vernolide | sweet intense musk ambrette macrocyclic | | Polycyclic | −5.17 | Non Active | Non Active | −4.81 |
| Fixal | powerful, very natural-warm, musk-like odor notes | | Polycyclic | −4.99 | Non Active | Non Active | −5.05 |
| Cyclopentenyl propionate musk | sweet musk | | Linear | −4.55 | Non Active | Non Active | Non Active |
| serenolide | musk | | Linear | −4.66 | Non Active | Non Active | Non Active |

TABLE 2-continued complete list of musk compounds tested on the OR of the invention, OR5A1, OR5AN1, OR11A1
(Non Active represents negative experiments, no activation after testing)

| Name | Organoletic properties | Structure | Class | OR5A2 | OR5A1 | OR5AN1 | OR11A1 |
|------|------------------------|-----------|-------|-------|-------|--------|--------|
| Sylkolide | Sylkolide ™ is a musk by Givaudan | | Linear | −4.75 | Non Active | Non Active | Non Active |
| Helvetolide | musky, ambrette, pear | | Linear | −3.86 | Non Active | Non Active | Non Active |

```
SEQ ID No 1; OR5A2_variant 1 P172; OR5A2
Nucleotide Sequence
ATGGCTGTAGGAAGGAACAACACAATTGTGACAAAATTCATTCTCCTGGGACTTTCAGACCATCCTCAAA

TGAAGATTTTCCTTTTCATGTTATTTCTGGGGCTCTACCTCCTGACGTTGGCCTGGAACTTAAGCCTCAT

TGCCCTCATTAAGATGGACTCTCACCTGCACATGCCCATGTACTTCTTCCTCAGTAACCTGTCCTTCCTG

GACATCTGCTATGTGTCCTCCACCGCCCCTAAGATGCTGTCTGACATCATCACAGAGCAGAAAACCATTT

CCTTTGTTGGCTGTGCCACTCAGTACTTTGTCTTCTGTGGGATGGGGCTGACTGAATGCTTTCTCCTGGC

AGCTATGGCCTATGACCGGTATGCTGCAATCTGCAACCCCTTGCTTTACACAGTCCTCATATCCCATACA

CTTTGTTTAAAGATGGTGGTTGGCGCCTATGGGGTGGATTCCTTAGTTCTTTCATTGAAACATACTCTG

TCTATCAGCATGATTTCTGTGGGCCCTATATGATCAACCACTTTTTCTGTGACCTCCCTCCAGTCCTGGC

TCTGTCCTGCTCTGATACCTTCACCAGCGAGGTGGTGACCTTCATAGTCAGTGTTGTCGTTGGAATAGTG

TCTGTGCTAGTGGTCCTCATCTCTTATGGTTACATTGTTGCTGCTGTTGTGAAGATCAGCTCAGCTACAG

GTAGGACAAAGGCCTTCAGCACTTGTGCCTCTCACCTGACTGCTGTGACCCTCTTCTATGGTTCTGGATT

CTTCATGTACATGCGACCCAGTTCCAGCTACTCCCTAAACAGGGACAAGGTGGTGTCCATATTCTATGCC

TTGGTGATCCCCGTGGTGAATCCCATCATCTACAGTTTTAGGAATAAGGAGATTAAAAATGCCATGAGGA

AAGCCATGGAAAGGGACCCCGGGATTTCTCACGGTGGACCATTCATTTTTATGACCTTGGGCTAA

SEQ ID No 2; OR5A2_variant 1 P172; OR5A2
Translation
MAVGRNNTIVTKFILLGLSDHPQMKIFLFMLFLGLYLLTLAWNLSLIALIKMDSHLHMPMYFFLSNLSFL

DICYVSSTAPKMLSDIITEQKTISFVGCATQYFVFCGMGLTECFLLAAMAYDRYAAICNPLLYTVLISHT

LCLKMVVGAYVGGFLSSFIETYSVYQHDFCGPYMINHFFCDLPPVLALSCSDTFTSEVVTFIVSVVVGIV

SVLVVLISYGYIVAAVVKISSATGRTKAFSTCASHLTAVTLFYGSGFFMYMRPSSSYSLNRDKVVSIFYA

LVIPVVNPIIYSFRNKEIKNAMRKAMERDPGISHGGPFIFMTLG

SEQ ID No 3; OR5A2_variant 2 P172L
Nucleotide Sequence
ATGGCTGTAGGAAGGAACAACACAATTGTGACAAAATTCATTCTCCTGGGACTTTCAGACCATCCTCAAA

TGAAGATTTTCCTTTTCATGTTATTTCTGGGGCTCTACCTCCTGACGTTGGCCTGGAACTTAAGCCTCAT

TGCCCTCATTAAGATGGACTCTCACCTGCACATGCCCATGTACTTCTTCCTCAGTAACCTGTCCTTCCTG

GACATCTGCTATGTGTCCTCCACCGCCCCTAAGATGCTGTCTGACATCATCACAGAGCAGAAAACCATTT

CCTTTGTTGGCTGTGCCACTCAGTACTTTGTCTTCTGTGGGATGGGGCTGACTGAATGCTTTCTCCTGGC

AGCTATGGCCTATGACCGGTATGCTGCAATCTGCAACCCCTTGCTTTACACAGTCCTCATATCCCATACA
```

```
CTTTGTTTAAAGATGGTGGTTGGCGCCTATGTGGGTGGATTCCTTAGTTCTTTCATTGAAACATACTCTG

TCTATCAGCATGATTTCTGTGGGCTCTATATGATCAACCACTTTTTCTGTGACCTCCCTCCAGTCCTGGC

TCTGTCCTGCTCTGATACCTTCACCAGCGAGGTGGTGACCTTCATAGTCAGTGTTGTCGTTGGAATAGTG

TCTGTGCTAGTGGTCCTCATCTCTTATGGTTACATTGTTGCTGCTGTTGTGAAGATCAGCTCAGCTACAG

GTAGGACAAAGGCCTTCAGCACTTGTGCCTCTCACCTGACTGCTGTGACCCTCTTCTATGGTTCTGGATT

CTTCATGTACATGCGACCCAGTTCCAGCTACTCCCTAAACAGGGACAAGGTGGTGTCCATATTCTATGCC

TTGGTGATCCCCGTGGTGAATCCCATCATCTACAGTTTTAGGAATAAGGAGATTAAAAATGCCATGAGGA

AAGCCATGGAAAGGGACCCCGGGATTTCTCACGGTGGACCATTCATTTTTATGACCTTGGGCTAA
```

SEQ ID No 4; OR5A2_variant 2 P172L
Translation
MAVGRNNTIVTKFILLGLSDHPQMKIFLFMLFLGLYLLTLAWNLSLIALIKMDSHLHMPMYFFLSNLSFL

DICYVSSTAPKMLSDIITEQKTISFVGCATQYFVFCGMGLTECFLLAAMAYDRYAAICNPLLYTVLISHT

LCLKMVVGAYVGGFLSSFIETYSVYQHDFCGLYMINHFFCDLPPVLALSCSDTFTSEVVTFIVSVVVGIV

SVLVVLISYGYIVAAVVKISSATGRTKAFSTCASHLTAVTLFYGSGFFMYMRPSSSYSLNRDKVVSIFYA

LVIPVVNPIIYSFRNKEIKNAMRKAMERDPGISHGGPFIFMTLG

SEQ ID No 5
Ac-FKKSFKL-NH2

SEQ ID No 6
RRLIEDAEYAARG

SEQ ID No 7; OR5AN1
MTGGGNITEITYFILLGFSDFPRIIKVLFTIFLVIYITSLAWNLSLIVLIRMDSHLHTPMYFFLSNLSFIDVCYI

SSTVPKMLSNLLQGQQTITFVGCIIQYFIFSTMGLSESCLMTAMAYDRYAAICNPLLYSSIMSPTLCVWMVLGAY

MTGLTASLFQIGALLQLHFCGSNVIRHFFCDMPQLLILSCTDTFFVQVMTAILTMFFGIASALVIMISYGYIGIS

IMKITSAKGRSKAFNTCASHLTAVSLFYTSGIFVYLSSSSGGSSSFDRFASVFYTVVIPMLNPLIYSLRNKEIKD

ALKRLQKRKCC

SEQ ID No 8; OR11A1
MEIVSTGNETITEFVLLGFYDIPELHFLFFIVFTAVYVFIIIGNMLIIVAVVSSQRLHKPMYIFLANLSFLDILY

TSAVMPKMLEGFLQEATISVAGCLLQFFIFGSLATAECLLLAVMAYDRYLAICYPLHYPLLMGPRRYMGLVVTTW

LSGFVVDGLVVALVAQLRFCGPNHIDQFYCDFMLFVGLACSDPRVAQVTTLILSVFCLTIPFGLILTSYARIVVA

VLRVPAGASRRRAFSTCSSHLAVVTTFYGTLMIFYVAPSAVHSQLLSKVFSLLYTVVTPLFNPVIYTMRNKEVHQ

ALRKILCIKQTETLD

SEQ ID No 9; OR5A1
MSITKAWNSSSVTMFILLGFTDHPELQALLFVTFLGIYLTTLAWNLALIFLIRGDTHLHTPMYFFLSNLSFIDIC

YSSAVAPNMLTDFFWEQKTISFVGCAAQFFFFVGMGLSECLLLTAMAYDRYAAISSPLLYPTIMTQGLCTRMVVG

AYVGGFLSSLIQASSIFRLHFCGPNIINHFFCDLPPVLALSCSDTFLSQVVNFLVVVTVGGTSFLQLLISYGYIV

SAVLKIPSAEGRWKACNTCASHLMVVTLLFGTALFVYLRPSSSYLLGRDKVVSVFYSLVIPMLNPLIYSLRNKEI

KDALWKVLERKKVFS

SEQ ID No 10; chimeric OR5A2_variant 1
MTKNQTWVTEFILLGFPLSLRIQMLLSGLFSLLYVFTLLGNGAILGLIWLDSRLHTPMYFFLSNLSFLDICYVSS

TAPKMLSDIITEQKTISFVGCATQYFVFCGMGLTECFLLAAMAYDRYAAICNPLLYTVLISHTLCLKMVVGAYVG

GFLSSFIETYSVYQHDFCGPYMINHFFCDLPPVLALSCSDTFTSEVVTFIVSVVVGIVSVLVVLISYGYIVAAVV

KISSATGRTKAFSTCASHLTAVTLFYGSGFFMYMRPSSSYSLNRDKVVSIFYALVIPVVNPLIYSLRNAEVKGAL

KRVLWKQRSK

-continued

SEQ ID NOo 11; TM2-TM7 region of OR5A2
PMYFFLSNLSFLDICYVSSTAPKMLSDIITEQKTISFVGCATQYFVFCGMGLTECFLLAAMAYDRYAAICNPLLY

TVLISHTLCLKMVVGAYVGGFLSSFIETYSVYQHDFCGPYMINHFFCDLPPVLALSCSDTFTSEVVTFIVSVVVG

IVSVLVVLISYGYIVAAVVKISSATGRTKAFSTCASHLTAVTLFYGSGFFMYMRPSSSYSLNRDKVVSIFYALVI

PVV

SEQ ID NOo 12; OR2A5
MTKNQTWVTEFILLGFPLSLRIQMLLSGLFSLLYVFTLLGNGAILGLIWLDSRLHTPMYFFLSHLAIIDISYASN

NVPKMLTNLGLNKRKTISFVPCTMQTFLYMAFAHTECLILVMMSYDRYMAVCHPLQYSVIMRWGVCTVLAVTSWA

CGSLLALVHVVLILRLPFCGPHEINHFFCEILSVLKLACADTWLNQVVIFASSVFILVGPLCLVLVSYSRILAAI

LRIQSGEGRRKAFSTCSSHLCMVGLFFGSTIVMYMAPKSRHPEEQQKVLSLFYSLFNPMLNPLIYSLRNAEVKGA

LKRVLWKQRSK

What is claimed is:

1. A method of identifying an agent or a sample comprising one or more agent(s) that interfere with the binding between musk compounds selected from nitromusks, polycyclic musks, macrocyclic musks, linear musks, and alicyclic musks, and an OR5A2 receptor able to interact with said musk compounds and transduce an odorant signal, said method comprising:
   a) contacting an OR5A2 polypeptide comprising the amino acid sequence of SEQ ID NO: 2 or a polypeptide having an amino acid sequence of at least 95% amino acid sequence identity to SEQ ID NO: 2, with the proviso that said polypeptide has a proline at position 172 of said polypeptide having an amino acid sequence of at least 95% amino acid sequence identity to SEQ ID NO: 2, with said agent or sample;
   b) measuring a signaling activity of said OR5A2 polypeptide in the presence of said agent or sample; and
   c) comparing the activity measured in the presence of said agent or sample to the activity measured in a reaction in which said OR5A2 polypeptide is contacted with one or more said musk compound(s) at its/their $EC_{50}$, wherein said agent or sample is identified as an agent or a sample, that modulates the activity of said OR5A2 receptor when the amount of the activity measured in the presence of the agent or sample is at least 10% of the amount induced by said musk compound(s) at its/their $EC_{50}$.

2. A method of identifying an agent or a sample comprising one or more agent(s) that interfere with the binding between musk compounds selected from nitromusks, polycyclic musks, macrocyclic musks, linear musks, and alicyclic musks, and an OR5A2 receptor able to interact with said musk compounds and transduce an odorant signal, said method comprising:
   a) contacting an OR5A2 polypeptide with one or more said musk compound(s) in the presence and in the absence of an agent or sample;
   b) measuring a signaling activity of said OR5A2 polypeptide, and
   c) comparing the amount of said activity measured in a reaction containing said OR5A2 polypeptide and said musk compound(s) without the agent or sample to the amount of said activity measured in a reaction containing said OR5A2 polypeptide, said musk compound(s) and said agent or sample, wherein a change in the activity in the presence of the agent or sample relative to the activity in the absence of the agent or sample, identifies said agent or sample as an agent or sample, that modulates the activity of said OR5A2 receptor;
   wherein the one or more agents modulate the activity of said OR5A2 polypeptide comprising the amino acid sequence of SEQ ID NO: 2 or a polypeptide having an amino acid sequence of at least 95% amino acid sequence identity to SEQ ID NO: 2, with the proviso that said polypeptide has a proline at position 172 of said polypeptide having an amino acid sequence of at least 95% amino acid sequence identity to SEQ ID NO: 2.

3. The method according to claim 2, wherein an increase in the activity in the presence of said agent or sample relative to the activity in the absence of said agent or sample identifies said agent or sample as an agent or sample that increases the activity of the OR5A2 receptor.

4. The method according to claim 2, wherein a decrease in the activity in the presence of said agent or sample relative to the activity in the absence of said agent or sample identifies said agent or sample as an agent or a sample that decreases the activity of the OR5A2 receptor.

5. A method of identifying an agent or a sample comprising one or more agent(s) that interfere with the binding between musk compounds selected from nitromusks, polycyclic musks, macrocyclic musks, linear musks, and alicyclic musks, and an OR5A2 receptor able to interact with said musk compounds and transduce an odorant signal, said method comprising:
   a) contacting an OR5A2 polypeptide with an agent or sample;
   b) measuring the binding of said agent or sample to said OR5A2 polypeptide; and
   c) comparing the binding of said agent or sample to the binding of said OR5A2 polypeptide to one or more said musk compound(s) at its/their $EC_{50}$, wherein said agent or sample is identified as an agent or a sample that modulates the activity of the OR5A2 receptor when the amount of the binding of said agent or sample is at least 10% of the amount binding of said musk compound(s) present at its/their $EC_{50}$;
   wherein the one or more agents modulate the activity of the OR5A2 polypeptide comprising the amino acid sequence of SEQ ID NO: 2 or a polypeptide having an amino acid sequence of at least 95% amino acid sequence identity to SEQ ID NO: 2, with the proviso that said polypeptide has a proline at position 172 of said polypeptide having an amino acid sequence of at least 95% amino acid sequence identity to SEQ ID NO: 2.

6. A method of identifying an agent or a sample comprising one or more agent(s) that interfere with the binding between musk compounds selected from nitromusks, polycyclic musks, macrocyclic musks, linear musks, and alicyclic musks, and an OR5A2 receptor able to interact with said musk compounds and transduce an odorant signal, said method comprising:
   a) contacting an OR5A2 polypeptide with said musk compound(s) in the presence and absence of an agent or sample under conditions permitting the binding of said musk compound(s) to said OR5A2 polypeptide;
   b) measuring the binding of said OR5A2 polypeptide to said musk compound(s), wherein a modulation in binding in the presence of the agent or sample, relative to the binding in the absence of the agent or sample, identifies said agent or sample as an agent or a sample that modulates the interaction between one or more said musk compound(s) and the OR5A2 receptor;
   wherein the one or more agents modulate the interaction between one or more said musk compound(s) and the OR5A2 polypeptide comprising the amino acid sequence of SEQ ID NO: 2 or a polypeptide having an amino acid sequence of at least 95% amino acid sequence identity to SEQ ID NO: 2, with the proviso that said polypeptide has a proline at position 172 of said polypeptide having an amino acid sequence of at least 95% amino acid sequence identity to SEQ ID NO: 2.

7. The method according to claim 6, wherein an increase in the binding in the presence of said agent or sample relative to the binding in the absence of said agent or sample identifies said agent or sample as an agent or sample that increases the binding of the OR5A2 receptor.

8. The method according to claim 6, wherein a decrease in the binding in the presence of said agent or sample relative to the binding in the absence of said agent or sample identifies said agent or sample as an agent or a sample that decreases the binding of the OR5A2 receptor.

9. The method according to claim 1, wherein the one or more musk compound(s) is detectably labeled.

10. The method according to claim 1, wherein the contacting is performed in, or on a cell expressing said OR5A2 polypeptide.

11. The method according to claim 1, wherein the measuring is performed using a method selected from label displacement, surface plasmon resonance, fluorescence resonance energy transfer, fluorescence quenching, and fluorescence polarization.

12. The method according to claim 1, wherein the step of measuring a signaling activity of the OR5A2 receptor comprises detecting a change in the level of a second messenger.

13. The method according to claim 1, wherein measuring the signaling activity comprises using a fluorescence or luminescence assay, or assay comprising an automated fluorometric or luminescent reader.

14. The method of claim 1, wherein the OR5A2 polypeptide consists of the amino acid sequence of SEQ ID NO: 2 or a polypeptide sequence having at least 96%, 97%, 98%, 99% or higher, including 100% amino acid sequence identity to SEQ ID NO: 2, with the proviso that said polypeptide has a proline at position 172 of said polypeptide having an amino acid sequence identity of at least 96%, 97%, 98%, 99% or higher, including 100% amino acid sequence identity to SEQ ID NO: 2.

15. The method according to claim 9, wherein the one or more musk compound(s) is detectably labeled with a moiety selected from the group consisting of a radioisotope, a fluorophore, and a quencher of fluorescence.

16. The method according to claim 10, wherein said cell is selected from the group consisting of Human embryonic kidney cells (HEK293), Chinese hamster cells (CHO), Monkey cells (COS), primary olfactory cells, Xenopus cells, insect cells, yeast, and bacteria.

17. The method according to claim 13, wherein the fluorescence or luminescence assay comprises using $Ca^{2+}$ sensitive fluorophores selected from the group consisting of fluo3, Fluo4, Fura-2, Ca3 kit, Ca6 kit, and aequorin.

18. A chimeric receptor comprising the amino acid sequence of SEQ ID NO: 10, which comprises the transmembrane domains 2 to 7 of an OR5A2 receptor having the amino acid sequence of SEQ ID NO: 11, inserted in the back-bone of an OR2A5 receptor having the amino acid sequence of SEQ ID NO: 12.

\* \* \* \* \*